US012612954B2

(12) United States Patent
Zhang et al.

(10) Patent No.: US 12,612,954 B2
(45) Date of Patent: Apr. 28, 2026

(54) MULTI-SPEED PLANETARY TRANSMISSION

(71) Applicant: Allison Transmission, Inc.,
Indianapolis, IN (US)

(72) Inventors: Shuo Zhang, Whitestown, IN (US);
Isaac Mock, Martinsville, IN (US)

(73) Assignee: Allison Transmission, Inc.,
Indianapolis, IN (US)

( * ) Notice: Subject to any disclaimer, the term of this
patent is extended or adjusted under 35
U.S.C. 154(b) by 0 days.

(21) Appl. No.: 18/777,158

(22) Filed: Jul. 18, 2024

(65) Prior Publication Data

US 2026/0022757 A1    Jan. 22, 2026

(51) Int. Cl.
*F16H 3/00*        (2006.01)
*F16H 3/44*        (2006.01)
*F16H 57/00*       (2012.01)
*F16H 57/02*       (2012.01)

(52) U.S. Cl.
CPC ....... *F16H 3/006* (2013.01); *F16H 2003/445*
(2013.01); *F16H 2057/005* (2013.01); *F16H*
*2057/02008* (2013.01); *F16H 2057/02047*
(2013.01); *F16H 2200/2015* (2013.01); *F16H*
*2200/2048* (2013.01)

(58) Field of Classification Search
CPC ..... F16H 2200/2015; F16H 2200/2017; F16H
2200/2043–2061; F16H 2057/005; F16H
2057/02008; F16H 2057/02047
See application file for complete search history.

(56) References Cited

U.S. PATENT DOCUMENTS

| | | | |
|---|---|---|---|
| 3,016,769 A | 1/1962 | Christenson et al. | |
| 3,031,901 A | 5/1962 | Simpson | |
| 3,147,643 A | 9/1964 | Christenson et al. | |
| 3,410,157 A | 11/1968 | Livezey | |
| 4,004,473 A | 1/1977 | Pearce et al. | |
| 4,041,807 A | 8/1977 | Herr | |
| 4,090,415 A | 5/1978 | Gorrell et al. | |
| 4,228,697 A | * 10/1980 | Miller ...................... F16H 3/66 |
| | | | 475/276 |
| 4,589,294 A | 5/1986 | Keenan et al. | |
| 4,742,733 A | 5/1988 | Schreiner | |
| 4,754,665 A | 7/1988 | Vandervoort | |

(Continued)

FOREIGN PATENT DOCUMENTS

| | | | |
|---|---|---|---|
| CN | 103195903 A | * | 7/2013 |
| CN | 205298433 U | | 6/2016 |

(Continued)

OTHER PUBLICATIONS

Eaton Fuller Heavy-Duty Transmissions TRDR0800 EN-US; Driver
Instructions; Jun. 2014.

(Continued)

*Primary Examiner* — James J Taylor, II

(57) ABSTRACT

A multi-speed transmission including a plurality of planetary
gearsets and a plurality of selective couplers is disclosed.
The multi-speed transmission may include a retarder includ-
ing a retarder housing, a rotor positioned in the retarder
housing and fixedly coupled to a portion of the plurality of
planetary gearsets, and a stator positioned in the retarder
housing and fixedly coupled to at least one stationary
member.

19 Claims, 21 Drawing Sheets

(56) References Cited

U.S. PATENT DOCUMENTS

| | | |
|---|---|---|
| 4,777,837 A | 10/1988 | Lehle |
| 4,873,880 A | 10/1989 | Amedei et al. |
| 4,964,313 A | 10/1990 | Davis |
| 5,063,793 A | 11/1991 | Mcaskill |
| 5,161,423 A | 11/1992 | Ore |
| 5,557,978 A | 9/1996 | Mcaskill |
| 6,158,541 A | 12/2000 | Tabata et al. |
| 6,190,280 B1 | 2/2001 | Horsch |
| 6,491,599 B1 | 12/2002 | Schmidt |
| 6,620,070 B2 | 9/2003 | Nerstad et al. |
| 6,629,470 B2 | 10/2003 | Brancolini |
| 6,960,149 B2 | 11/2005 | Ziemer |
| 7,217,211 B2 | 5/2007 | Klemen et al. |
| 7,252,617 B2 | 8/2007 | Shim et al. |
| 7,267,630 B2 | 9/2007 | Tabata et al. |
| 7,311,635 B2 | 12/2007 | Klemen |
| 7,645,208 B2 | 1/2010 | Kamm et al. |
| 7,739,021 B2 | 6/2010 | Wegeng et al. |
| 7,824,303 B2 | 11/2010 | Wittkopp et al. |
| 8,100,034 B2 | 1/2012 | Gitt |
| 8,206,257 B2 | 6/2012 | Gumpoltsberger et al. |
| 8,360,925 B2 | 1/2013 | Kraynev et al. |
| 8,388,488 B2 | 3/2013 | Phillips et al. |
| 8,398,524 B2 | 3/2013 | Kraynev et al. |
| 8,425,367 B2 | 4/2013 | Phillips et al. |
| 8,506,443 B2 | 8/2013 | Seo et al. |
| 8,561,493 B2 | 10/2013 | Hoffmann |
| 8,596,157 B2 | 12/2013 | Vu |
| 8,651,996 B2 | 2/2014 | Mellet et al. |
| 8,715,128 B2 | 5/2014 | Kempf et al. |
| 8,777,797 B2 | 7/2014 | Mellet et al. |
| 8,789,433 B2 | 7/2014 | Jerwick et al. |
| 8,795,128 B2 | 8/2014 | Mellet et al. |
| 8,827,862 B2 | 9/2014 | Koch et al. |
| 9,518,639 B2 | 12/2016 | Lee et al. |
| 9,523,412 B2 | 12/2016 | Lee et al. |
| 9,541,170 B2 | 1/2017 | Cho et al. |
| 9,562,462 B2 | 2/2017 | Etchason |
| 9,625,007 B2 | 4/2017 | Long et al. |
| 9,657,815 B2 | 5/2017 | Lee et al. |
| 9,784,339 B2 | 10/2017 | Park et al. |
| 9,816,590 B2 | 11/2017 | Lee et al. |
| 9,869,377 B1 | 1/2018 | Burchett et al. |
| 9,879,761 B2 | 1/2018 | Vu |
| 9,890,833 B2 | 2/2018 | Lee et al. |
| 9,927,008 B1 | 3/2018 | Burchett et al. |
| 10,047,832 B2 | 8/2018 | Kim et al. |
| 10,072,735 B2 | 9/2018 | Crafton et al. |
| 10,156,283 B2 | 12/2018 | Raszkowski et al. |
| 10,161,486 B2 | 12/2018 | Irving et al. |
| 10,221,922 B2 | 3/2019 | Haupt et al. |
| 10,260,599 B2 | 4/2019 | Richardson et al. |
| 10,295,031 B2 | 5/2019 | Lee et al. |
| 10,302,173 B2 | 5/2019 | Tryon et al. |
| 10,302,175 B2 | 5/2019 | Kwon et al. |
| 10,316,940 B2 | 6/2019 | Crafton |
| 10,323,722 B2 | 6/2019 | Schoolcraft et al. |
| 10,330,180 B2 | 6/2019 | Hwang et al. |
| 10,352,403 B2 | 7/2019 | Beck et al. |
| 10,352,407 B2 | 7/2019 | Horen et al. |
| 10,393,230 B2 | 8/2019 | Bulgrien |
| 10,428,909 B2 | 10/2019 | Beck et al. |
| 10,436,289 B2 | 10/2019 | Kim |
| 10,451,147 B2 | 10/2019 | Foster et al. |
| 10,451,150 B2 * | 10/2019 | Kim ........................ F16H 3/666 |
| 10,465,778 B2 | 11/2019 | Kwon et al. |
| 10,487,920 B2 | 11/2019 | Hwang et al. |
| 10,533,644 B2 | 1/2020 | Kim et al. |
| 10,544,853 B2 | 1/2020 | Kim et al. |
| 10,584,772 B2 | 3/2020 | Dersj et al. |
| 10,794,454 B1 | 10/2020 | Kim et al. |
| 10,975,960 B2 | 4/2021 | Rietdorf et al. |
| 11,788,608 B2 | 10/2023 | Patel et al. |
| 12,000,464 B1 * | 6/2024 | Mock ...................... F16H 57/02 |
| 2008/0103015 A1 | 5/2008 | Seo |

| | | |
|---|---|---|
| 2010/0257952 A1 | 10/2010 | Rieger et al. |
| 2013/0217534 A1 | 8/2013 | Kirchhoffer |
| 2014/0364269 A1 | 12/2014 | Kaltenbach |
| 2016/0109004 A1 | 4/2016 | Schoolcraft |
| 2016/0169349 A1 | 6/2016 | Park et al. |
| 2018/0031096 A1 | 2/2018 | Blattner et al. |
| 2018/0073609 A1 | 3/2018 | Yoshino et al. |
| 2018/0087625 A1 | 3/2018 | Crafton |
| 2018/0259065 A1 | 9/2018 | Fujii et al. |
| 2019/0078661 A1 | 3/2019 | Asaoka et al. |
| 2019/0128387 A1 | 5/2019 | Kim et al. |
| 2019/0195319 A1 | 6/2019 | Kim et al. |
| 2020/0072321 A1 | 3/2020 | Kim et al. |
| 2020/0079206 A1 | 3/2020 | Ziemer et al. |
| 2020/0182333 A1 | 6/2020 | Mellet et al. |
| 2023/0088352 A1 | 3/2023 | Patel et al. |
| 2023/0115225 A1 | 4/2023 | Patel et al. |
| 2023/0407944 A1 | 12/2023 | Patel et al. |

FOREIGN PATENT DOCUMENTS

| | | | | | |
|---|---|---|---|---|---|
| CN | 106838154 A | * | 6/2017 | ............... | F16H 3/66 |
| CN | 105546062 B | | 2/2018 | | |
| CN | 214036721 U | | 8/2021 | | |
| CN | 214197126 U | | 9/2021 | | |
| CN | 113108032 B | | 4/2022 | | |
| CN | 116816884 A | * | 9/2023 | ............... | F16H 3/66 |
| CN | 116838756 A | * | 10/2023 | ............... | F16H 3/66 |
| DE | 102009047268 A1 | | 6/2011 | | |
| EP | 0083337 B1 | | 3/1987 | | |
| FR | 2233892 A5 | | 1/1975 | | |
| FR | 2706010 A1 | | 12/1994 | | |
| SE | 527108 C2 | | 12/2005 | | |
| WO | 2018104020 A1 | | 6/2018 | | |
| WO | 2023079886 A1 | | 5/2023 | | |

OTHER PUBLICATIONS

Apakidze, Timur; Saturation Dive: Ford 10 Speed Transmission Power Flow; TTAC; Dec. 23, 2014.

GM; Holy Shift! A Look inside GM's new 10-Speed Automatic; May 11, 2016.

Sherman, Don; Honda's Revived Inventiveness Delivers New 10-Speed Automatic; Mar. 10, 2017.

Lieberman, Jonny; Mercedes-Benz Unimog U4000 First Drive; The Actual Ultimate Driving Machine: Are Life-Changing Experiences Supposed to be This Much Fun?; Mar. 26, 2013.

Sportage(AL); General Description; www.kiatechinfo.com; Jan. 28, 2011.

Eaton Fuller Heavy-Duty Transmissions TRDR0800; Driver Instructions; Sep. 2007.

MCI Service Information; Transmission Retarder Operation—How Does it Work?; Apr. 2003.

Setiawan, Yuhanes Dedy et al.; A Mathematical Model of Multi-Speed Transmissions in Electric Vehicles in the Presence of Gear-Shifting; IEEE Transactions on Vehicular Technology; 2017.

Ruan, Jiageng; Development of Continuously Variable Transmission and Multi-Speed Dual-Clutch Transmission for Pure Electric Vehicle; Feb. 8, 2018.

Morozov, Alexei et al.; Design of a Modular Swift-shift Multi-speed Transmission with Double Dual Clutches for Electric Vehicles; EVS29 Symposium; Jun. 2016.

Morozov, Alexei et al.; Design and Gear Shift Control of a Modular Swift-Shift Multi-Speed Transmission for Evs; European Battery, Hybrid and Fuel Cell Electric Vehicle Congress; Dec. 2015.

Levai, Dr. Zoltan; Structure and Analysis of Planetary Gear Trains; Jnl. Mechanisms; vol. 3, pp. 131-148; Feb. 9, 1968.

Fan, Yi; Study on the Transmission Characteristics of the Multi-gear Multi-degree-of-freedom Hybrid Planetary Gear Automatic Transmission Based on the Line Method; IOP Conference Series Earth and Environmental Science 512; Jun. 2020.

Fan, Yi; Design of a Planetary Gear Mechanism of A Seven-speed Automatic Transmission Based on the Lever Method; Journal of Physics Conference Series 1449; Jan. 2020.

(56) References Cited

OTHER PUBLICATIONS

Xu, Xiangyang et al.; Automatic Enumeration of Feasible Configuration for the Dedicated Hybrid Transmission With Multi-Degree-of-Freedom and Multiplanetary Gear Set; Journal of Mechanical Design 141; Feb. 2019.

* cited by examiner

800

| CLUTCH TABLE | | | | | | | | | |
|---|---|---|---|---|---|---|---|---|---|
| CLUTCH NAME: | | | C1 | C2 | C3 | C4 | C5 | C6 | C7 |
| RANGE | RATIO | STEP | | | | | | | |
| R4 | -0.610 | | | X | | | | | X |
| R3 | -2.421 | 0.25 | | | X | | | X | |
| R2 | -5.552 | 0.44 | | | X | X | | | |
| R1 | -10.591 | 0.52 | | | X | | | | X |
| F1 | 6.949 | | X | | | | | | X |
| F2 | 4.696 | 1.48 | X | | | X | | | |
| F3 | 3.296 | 1.42 | X | | | | | X | |
| F4 | 2.213 | 1.49 | X | | | X | | | |
| F5 | 1.529 | 1.45 | X | | X | | | | |
| F6 | 1.000 | 1.53 | X | X | | | | | |
| F7 | 0.764 | 1.31 | | X | X | | | | |
| F8 | 0.672 | 1.14 | | X | | X | | | |
| F9 | 0.379 | 1.77 | | X | | | | X | |

802

| CLUTCH TABLE | | | | | | | | | |
|---|---|---|---|---|---|---|---|---|---|
| CLUTCH NAME: | | | C1 | C2 | C3 | C4 | C5 | C6 | C7 |
| RANGE | RATIO | STEP | | | | | | | |
| R4 | -0.640 | | | X | | | | | X |
| R3 | -2.421 | 0.26 | | | X | | | X | |
| R2 | -5.552 | 0.44 | | | X | | X | | |
| R1 | -10.841 | 0.51 | | | X | | | | X |
| F1 | 7.061 | | X | | | | | | X |
| F2 | 4.696 | 1.50 | X | | | | X | | |
| F3 | 3.296 | 1.42 | X | | | | | X | |
| F4 | 2.213 | 1.49 | X | | | X | | | |
| F5 | 1.529 | 1.45 | X | | X | | | | |
| F6 | 1.000 | 1.53 | X | X | | | | | |
| F7 | 0.764 | 1.31 | | X | X | | | | |
| F8 | 0.672 | 1.14 | | X | | X | | | |
| F9 | 0.379 | 1.77 | | X | | | | X | |

804

| CLUTCH TABLE | | | | | | | | | |
|---|---|---|---|---|---|---|---|---|---|
| CLUTCH NAME: | | | C1 | C2 | C3 | C4 | C5 | C6 | C7 |
| RANGE | RATIO | STEP | | | | | | | |
| R4 | -0.820 | | | X | | | | | X |
| R3 | -2.851 | 0.29 | | | X | | | X | |
| R2 | -5.552 | 0.51 | | | X | | X | | |
| R1 | -12.325 | 0.45 | | | X | | | | X |
| F1 | 7.725 | | X | | | | | | X |
| F2 | 4.696 | 1.65 | X | | | | X | | |
| F3 | 3.488 | 1.35 | X | | | | | X | |
| F4 | 2.213 | 1.58 | X | | | X | | | |
| F5 | 1.529 | 1.45 | X | | X | | | | |
| F6 | 1.000 | 1.53 | X | X | | | | | |
| F7 | 0.764 | 1.31 | | X | X | | | | |
| F8 | 0.672 | 1.14 | | X | | X | | | |
| F9 | 0.327 | 2.06 | | X | | | | X | |

806

| CLUTCH TABLE | | | | | | | | | |
|---|---|---|---|---|---|---|---|---|---|
| CLUTCH NAME: | | | C1 | C2 | C3 | C4 | C5 | C6 | C7 |
| RANGE | RATIO | STEP | | | | | | | |
| R4 | -0.583 | | | X | | | | X | |
| R3 | -3.542 | 0.16 | | | X | | | | X |
| R2 | -5.552 | 0.64 | | | X | | X | | |
| R1 | -10.366 | 0.54 | | | X | | | X | |
| F1 | 6.848 | | X | | | | | X | |
| F2 | 4.696 | 1.46 | X | | | | X | | |
| F3 | 3.797 | 1.24 | X | | | | | | X |
| F4 | 2.213 | 1.72 | X | | | X | | | |
| F5 | 1.529 | 1.45 | X | | X | | | | |
| F6 | 1.000 | 1.53 | X | X | | | | | |
| F7 | 0.764 | 1.31 | | X | X | | | | |
| F8 | 0.672 | 1.14 | | X | | X | | | |
| F9 | 0.243 | 2.76 | | X | | | | | X |

808

| CLUTCH TABLE | | | | | | | | | | |
|---|---|---|---|---|---|---|---|---|---|---|
| CLUTCH NAME: | | | C1 | C2 | C3 | C4 | C5 | C6 | C7 |
| RANGE | RATIO | STEP | | | | | | | |
| R4 | -0.609 | | | X | | | | X | |
| R3 | -2.329 | 0.26 | | | X | | | | X |
| R2 | -5.552 | 0.42 | | | X | | X | | |
| R1 | -10.588 | 0.52 | | | X | | | X | |
| F1 | 6.948 | | X | | | | | X | |
| F2 | 4.696 | 1.48 | X | | | | X | | |
| F3 | 3.254 | 1.44 | X | | | | | | X |
| F4 | 2.213 | 1.47 | X | | | X | | | |
| F5 | 1.529 | 1.45 | X | | X | | | | |
| F6 | 1.000 | 1.53 | X | X | | | | | |
| F7 | 0.764 | 1.31 | | X | X | | | | |
| F8 | 0.672 | 1.14 | | X | | X | | | |
| F9 | 0.390 | 1.72 | | X | | | | | X |

810

| CLUTCH TABLE | | | | | | | | | |
|---|---|---|---|---|---|---|---|---|---|
| CLUTCH NAME: | | | C1 | C2 | C3 | C4 | C5 | C6 | C7 |
| RANGE | RATIO | STEP | | | | | | | |
| R4 | -0.609 | | | X | | | | X | |
| R3 | -2.329 | 0.26 | | | X | | | | X |
| R2 | -5.552 | 0.42 | | | X | | X | | |
| R1 | -10.588 | 0.52 | | | X | | | X | |
| F1 | 6.948 | | X | | | | | X | |
| F2 | 4.696 | 1.48 | X | | | | X | | |
| F3 | 3.254 | 1.44 | X | | | | | | X |
| F4 | 2.213 | 1.47 | X | | | X | | | |
| F5 | 1.529 | 1.45 | X | | X | | | | |
| F6 | 1.000 | 1.53 | X | X | | | | | |
| F7 | 0.764 | 1.31 | | X | X | | | | |
| F8 | 0.672 | 1.14 | | X | | X | | | |
| F9 | 0.390 | 1.72 | | X | | | | | X |

MULTI-SPEED PLANETARY TRANSMISSION

FIELD OF THE DISCLOSURE

The present disclosure relates to a multi-speed transmission and in particular to a multi-speed transmission including a plurality of planetary gearsets and a plurality of selective couplers to achieve a plurality of forward speed ratios and reverse speed ratios.

BACKGROUND OF THE DISCLOSURE

Multi-speed transmissions use a plurality of planetary gearsets, selective couplers, interconnectors, and additional elements to achieve a plurality of forward and reverse speed ratios. Exemplary multi-speed transmissions are disclosed in US Published Patent Application No. 2016/0047440, Ser. No. 14/457,592, titled MULTI-SPEED TRANSMISSION, filed Aug. 12, 2014, the entire disclosure of which is expressly incorporated by reference herein.

SUMMARY

The present disclosure provides a multi-speed transmission including a plurality of planetary gearsets. In embodiments, the multi-speed transmission includes a first plurality of planetary gearsets in a first housing and a second plurality of planetary gearsets in a second housing. The first housing may be coupled to the second housing with the second plurality of planetary gearsets operatively coupled to the first plurality of planetary gearsets.

In an exemplary embodiment of the present disclosure a transmission is provided. The transmission comprising: at least one stationary member; an input member rotatable relative to the at least one stationary member; a plurality of planetary gearsets operatively coupled to the input member; and an output member operatively coupled to the input member through the plurality of planetary gearsets and rotatable relative to the at least one stationary member. Each of the plurality of planetary gearsets including a first gearset component, a second gearset component, and a third gearset component. The plurality of planetary gearsets including a first planetary gearset, a second planetary gearset, a third planetary gearset, a fourth planetary gearset, and a fifth planetary gearset. The input member is fixedly coupled to the first gearset component of the first planetary gearset. The output member is fixedly coupled to the second gearset component of the third planetary gearset, the first gearset component of the fourth planetary gearset, and the first gearset component of the fifth planetary gearset. The transmission further comprising a first interconnector which fixedly couples the second gearset component of the second planetary gearset, the third gearset component of the third planetary gearset, the second gearset component of the fourth planetary gearset, and the third gearset component of the fifth planetary gearset together; a second interconnector which fixedly couples the second gearset component of the first planetary gearset to the third gearset component of the second planetary gearset; a third interconnector which fixedly couples the first gearset component of the second planetary gearset and the first gearset component of the third planetary gearset together; a plurality of selective couplers; and a retarder. The plurality of selective couplers including: a first selective coupler which, when engaged, fixedly couples the first gearset component of the first planetary gearset to the first gearset component of the second planetary gearset and the first gearset component of the third planetary gearset; a second selective coupler which, when engaged, fixedly couples the first gearset component of the first planetary gearset to the second gearset component of the second planetary gearset, the third gearset component of the third planetary gearset, the second gearset component of the fourth planetary gearset, and the third gearset component of the fifth planetary gearset; a third selective coupler which, when engaged, fixedly couples the third gearset component of the first planetary gearset to the at least one stationary member; a fourth selective coupler which, when engaged, fixedly couples the second gearset component of the first planetary gearset and the third gearset component of the second planetary gearset to the at least one stationary member; a fifth selective coupler which, when engaged, fixedly couples the second gearset component of the second planetary gearset, the third gearset component of the third planetary gearset, the second gearset component of the fourth planetary gearset, and the third gearset component of the fifth planetary gearset to the at least one stationary member; a sixth selective coupler which, when engaged, fixedly couples the third gearset component of the fourth planetary gearset to the at least one stationary member; and a seventh selective coupler which, when engaged, fixedly couples the second gearset component of the fifth planetary gearset to the at least one stationary member. The retarder including a retarder housing, a rotor fixedly coupled to the second gearset component of the third planetary gearset, the first gearset component of the fourth planetary gearset, and the first gearset component of the fifth planetary gearset and positioned in the retarder housing, and a stator positioned in the retarder housing and fixedly coupled to the at least one stationary member.

In an example thereof, the transmission further comprises a fluid control system in fluid communication with an interior of the retarder housing of the retarder to control an amount of fluid in the interior of the retarder housing. In a variation thereof, the fluid control system controls the amount of fluid in the interior of the retarder housing to a first amount in response to a first input from an accelerator input and to a second amount in response to a second input from a brake input, the second amount being more than the first amount.

In another example thereof, the at least one stationary member includes a housing. The housing having a first end and a second end, wherein the input member is accessible proximate the first end of the housing; the output member is accessible proximate the second end of the housing; the first planetary gearset is positioned between the first end of the housing and the second planetary gearset; the second planetary gearset is positioned between the first planetary gearset and the third planetary gearset; the third planetary gearset is positioned between the second planetary gearset and the fourth planetary gearset; the fourth planetary gearset is positioned between the third planetary gearset and the fifth planetary gearset; and the fifth planetary gearset is positioned between the fourth planetary gearset and the second end of the housing.

In a further example thereof, each of the first planetary gearset, the second planetary gearset, the third planetary gearset, the fourth planetary gearset, and the fifth planetary gearset is a simple planetary gearset. In a variation thereof, the first gearset component of the first planetary gearset is a first sun gear, the first gearset component of the second planetary gearset is a second sun gear, the first gearset component of the third planetary gearset is a third sun gear, the first gearset component of the fourth planetary gearset is a fourth sun gear, the first gearset component of the fifth planetary gearset is a fifth sun gear, the second gearset component of the first planetary gearset is a first planet carrier, the second gearset component of the second planetary gearset is a second planet carrier, the second gearset component of the third planetary gearset is a third planet carrier, the second gearset component of the fourth planetary gearset is a fourth planet carrier, the second gearset component of the fifth planetary gearset is a fifth planet carrier, the third gearset component of the first planetary gearset is a first ring gear, the third gearset component of the second planetary gearset is a second ring gear, the third gearset component of the third planetary gearset is a third ring gear, the third gearset component of the fourth planetary gearset is a fourth ring gear, and the third gearset component of the fifth planetary gearset is a fifth ring gear.

In another exemplary embodiment of the present disclosure a transmission is provided. The transmission comprising at least one stationary member including a first housing having a first interior and second housing having a second interior, the second housing being removably coupled to the first housing; an input member rotatable relative to the at least one stationary member; a plurality of planetary gearsets operatively coupled to the input member; and an output member operatively coupled to the input member through the plurality of planetary gearsets and rotatable relative to the at least one stationary member. Each of the plurality of planetary gearsets including a first gearset component, a second gearset component, and a third gearset component. The plurality of planetary gearsets including a first planetary gearset, a second planetary gearset, a third planetary gearset, a fourth planetary gearset, and a fifth planetary gearset. The input member is fixedly coupled to the first gearset component of the first planetary gearset. The first planetary gearset, the second planetary gearset, and the third planetary gearset being received in the first interior of the first housing and the fourth planetary gearset and the fifth planetary gearset being received in the second interior of the second housing. The output member is fixedly coupled to the second gearset component of the third planetary gearset, the first gearset component of the fourth planetary gearset, and first gearset component of the fifth planetary gearset. The transmission further comprising a first interconnector including a first portion which fixedly couples the second gearset component of the second planetary gearset and the third gearset component of the third planetary gearset and a second portion which fixedly couples the second gearset component of the fourth planetary gearset and the third gearset component of the fifth planetary gearset together, the first portion of the first interconnector being removably coupled to the second portion of the first interconnector; a second interconnector which fixedly couples the second gearset component of the first planetary gearset to the third gearset component of the second planetary gearset; a third interconnector which fixedly couples the first gearset component of the second planetary gearset and the first gearset component of the third planetary gearset together; and a plurality of selective couplers. The plurality of selective couplers including: a first selective coupler which, when engaged, fixedly couples the first gearset component of the first planetary gearset to the first gearset component of the second planetary gearset and the first gearset component of the third planetary gearset, the first selective coupler being positioned in the first interior of the first housing; a second selective coupler which, when engaged, fixedly couples the first gearset component of the first planetary gearset to the second gearset component of the second planetary gearset, the third gearset component of the third planetary gearset, the second gearset component of the third planetary gearset, the second gearset component of the fourth planetary gearset, and the third gearset component of the fifth planetary gearset; a third selective coupler which, when engaged, fixedly couples the third gearset component of the first planetary gearset to the at least one stationary member, the third selective coupler being positioned in the first interior of the first housing; a fourth selective coupler which, when engaged, fixedly couples the second gearset component of the first planetary gearset and the third gearset component of the second planetary gearset to the at least one stationary member, the fourth selective coupler being positioned in the first interior of the first housing; a fifth selective coupler which, when engaged, fixedly couples the second gearset component of the second planetary gearset, the third gearset component of the third planetary gearset, the second gearset component of the fourth planetary gearset, and the third gearset component of the fifth planetary gearset to the at least one stationary member; a sixth selective coupler which, when engaged, fixedly couples the third gearset component of the fourth planetary gearset to the at least one stationary member, the sixth selective coupler being positioned in the second interior of the second housing; and a seventh selective coupler which, when engaged, fixedly couples the second gearset component of the fifth planetary gearset to the at least one stationary member, the seventh selective coupler being positioned in the second interior of the second housing.

In an example thereof, the input member is accessible proximate a first end of the first housing opposite a second end of the first housing proximate a first end of the second housing; the output member is accessible proximate a second end of the second housing opposite the first end of the second housing proximate the first housing; the first planetary gearset is positioned between the first end of the first housing and the second planetary gearset; the second planetary gearset is positioned between the first planetary gearset and the third planetary gearset; the third planetary gearset is positioned between the second planetary gearset and the fourth planetary gearset; the fourth planetary gearset is positioned between the third planetary gearset and the fifth planetary gearset; and the fifth planetary gearset is positioned between the fourth planetary gearset and the second end of the second housing.

In another example thereof, each of the first planetary gearset, the second planetary gearset, the third planetary gearset, the fourth planetary gearset, and the fifth planetary gearset is a simple planetary gearset. In a variation thereof, the first gearset component of the first planetary gearset is a first sun gear, the first gearset component of the second planetary gearset is a second sun gear, the first gearset component of the third planetary gearset is a third sun gear, the first gearset component of the fourth planetary gearset is a fourth sun gear, the first gearset component of the fifth planetary gearset is a fifth sun gear, the second gearset component of the first planetary gearset is a first planet carrier, the second gearset component of the second planetary gearset is a second planet carrier, the second gearset component of the third planetary gearset is a third planet carrier, the second gearset component of the fourth planetary gearset is a fourth planet carrier, the second gearset component of the fifth planetary gearset is a fifth planet carrier, the third gearset component of the first planetary gearset is a first ring gear, the third gearset component of the second planetary gearset is a second ring gear, the third gearset component of the third planetary gearset is a third ring gear, the third gearset component of the fourth planetary gearset is a fourth ring gear, and the third gearset component of the fifth planetary gearset is a fifth ring gear.

In a further exemplary embodiment of the present disclosure a transmission is provided. The transmission comprising at least one stationary member; an input member rotatable relative to the at least one stationary member; a plurality of planetary gearsets operatively coupled to the input member; and an output member operatively coupled to the input member through the plurality of planetary gearsets and rotatable relative to the at least one stationary member. Each of the plurality of planetary gearsets including a first gearset component, a second gearset component, and a third gearset component. The plurality of planetary gearsets including a first planetary gearset, a second planetary gearset, a third planetary gearset, a fourth planetary gearset, and a fifth planetary gearset. The input member is fixedly coupled to the first gearset component of the first planetary gearset. The output member is fixedly coupled to the second gearset component of the third planetary gearset, the first gearset component of the fourth planetary gearset, and the third gearset component of the fifth planetary gearset. The transmission further comprising a first interconnector which fixedly couples the second gearset component of the second planetary gearset, the third gearset component of the third planetary gearset, and the second gearset component of the fourth planetary gearset together; a second interconnector which fixedly couples the second gearset component of the first planetary gearset to the third gearset component of the second planetary gearset; a third interconnector which fixedly couples the first gearset component of the second planetary gearset to the first gearset component of the third planetary gearset; a fourth interconnector which fixedly couples the third gearset component of the fourth planetary gearset to the first gearset component of the fifth planetary gearset; and a plurality of selective couplers, wherein the plurality of selective couplers include a first number of clutches and a second number of brakes, wherein the second number is more than twice the first number.

In an example thereof, the first number is two and the second number is five.

In another example thereof, the plurality of selective couplers includes: a first selective coupler which, when engaged, fixedly couples the first gearset component of the first planetary gearset to the first gearset component of the second planetary gearset and the first gearset component of the third planetary gearset; a second selective coupler which, when engaged, fixedly couples the first gearset component of the first planetary gearset to the second gearset component of the second planetary gearset, the third gearset component of the third planetary gearset and the second gearset component of the fourth planetary gearset; a third selective coupler which, when engaged, fixedly couples the third gearset component of the first planetary gearset to the at least one stationary member; a fourth selective coupler which, when engaged, fixedly couples the second gearset component of the first planetary gearset and the third gearset component of the second planetary gearset to the at least one stationary member; a fifth selective coupler which, when engaged, fixedly couples the second gearset component of the second planetary gearset, the third gearset component of the third planetary gearset, and the second gearset component of the fourth planetary gearset to the at least one stationary member; a sixth selective coupler which, when engaged, fixedly couples the third gearset component of the fourth planetary gearset and the first gearset component of the fifth planetary gearset to the at least one stationary member; and a seventh selective coupler which, when engaged, fixedly couples the second gearset component of the fifth planetary gearset to the at least one stationary member. In a variation thereof, the transmission further comprising a retarder including a retarder housing, a rotor fixedly coupled to the second gearset component of the third planetary gearset, the first gearset component of the fourth planetary gearset, and the third gearset component of the fifth planetary gearset and positioned in the retarder housing, and a stator positioned in the retarder housing and fixedly coupled to the at least one stationary member. In another variation thereof, the transmission further comprising a fluid control system in fluid communication with an interior of the retarder housing of the retarder to control an amount of fluid in the interior of the retarder housing. In a further variation thereof, the fluid control system controls the amount of fluid in the interior of the retarder housing to a first amount in response to a first input from an accelerator input and to a second amount in response to a second input from a brake input, the second amount being more than the first amount.

In yet another example thereof, the at least one stationary member includes a housing. The housing having a first end and a second end, wherein the input member is accessible proximate the first end of the housing; the output member is accessible proximate the second end of the housing; the first planetary gearset is positioned between the first end of the housing and the second planetary gearset; the second planetary gearset is positioned between the first planetary gearset and the third planetary gearset; the third planetary gearset is positioned between the second planetary gearset and the fourth planetary gearset; the fourth planetary gearset is positioned between the third planetary gearset and the fifth planetary gearset; and the fifth planetary gearset is positioned between the fourth planetary gearset and the second end of the housing.

In still another example thereof, each of the first planetary gearset, the second planetary gearset, the third planetary gearset, the fourth planetary gearset, and the fifth planetary gearset is a simple planetary gearset. In a variation thereof, the first gearset component of the first planetary gearset is a first sun gear, the first gearset component of the second planetary gearset is a second sun gear, the first gearset component of the third planetary gearset is a third sun gear, the first gearset component of the fourth planetary gearset is a fourth sun gear, the first gearset component of the fifth planetary gearset is a fifth sun gear, the second gearset component of the first planetary gearset is a first planet carrier, the second gearset component of the second planetary gearset is a second planet carrier, the second gearset component of the third planetary gearset is a third planet carrier, the second gearset component of the fourth planetary gearset is a fourth planet carrier, the second gearset component of the fifth planetary gearset is a fifth planet carrier, the third gearset component of the first planetary gearset is a first ring gear, the third gearset component of the second planetary gearset is a second ring gear, the third gearset component of the third planetary gearset is a third ring gear, the third gearset component of the fourth planetary gearset is a fourth ring gear, and the third gearset component of the fifth planetary gearset is a fifth ring gear.

In a further still exemplary embodiment of the present disclosure a transmission is provided. The transmission comprising at least one stationary member; an input member rotatable relative to the at least one stationary member; and a plurality of planetary gearsets operatively coupled to the input member. The plurality of planetary gearsets including a first planetary gearset, a second planetary gearset, and a third planetary gearset wherein each of the first planetary gearset, the second planetary gearset, and the third planetary gearset includes a first gearset component, a second gearset component, and a third gearset component. The plurality of planetary gearsets further including a fourth planetary gearset. The fourth planetary gearset includes a first fourth planetary gearset sun gear, a second fourth planetary gearset sun gear, a planet carrier, a plurality of stepped planet gears, and a ring gear. Each of the plurality of stepped planet gears having a stepped planet gear first gear intermeshed with the first fourth planetary gearset sun gear and the ring gear and a stepped planet gear second gear intermeshed with the second fourth planetary gearset sun gear. The input member is fixedly coupled to the first gearset component of the first planetary gearset. The transmission further comprising an output member operatively coupled to the input member through the plurality of planetary gearsets and rotatable relative to the at least one stationary member. The output member is fixedly coupled to the second gearset component of the third planetary gearset and to the fourth planetary gearset. The transmission further comprising a first interconnector which fixedly couples the second gearset component of the second planetary gearset, the third gearset component of the third planetary gearset, and the planet carrier of the fourth planetary gearset together; a second interconnector which fixedly couples the second gearset component of the first planetary gearset to the third gearset component of the second planetary gearset; a third interconnector which fixedly couples the first gearset component of the second planetary gearset to the first gearset component of the third planetary gearset; and a plurality of selective couplers. The plurality of selective couplers includes a first number of clutches and a second number of brakes, wherein the second number is more than the first number.

In an example thereof, the output member is further fixedly coupled to the first fourth planetary gearset sun gear.

In another example thereof, the first number is two and the second number is five.

In still another example thereof, the plurality of selective couplers includes: a first selective coupler which, when engaged, fixedly couples the first gearset component of the first planetary gearset to the first gearset component of the second planetary gearset and the first gearset component of the third planetary gearset; a second selective coupler which, when engaged, fixedly couples the first gearset component of the first planetary gearset to the second gearset component of the second planetary gearset, the third gearset component of the third planetary gearset, and the planet carrier of the fourth planetary gearset; a third selective coupler which, when engaged, fixedly couples the third gearset component of the first planetary gearset to the at least one stationary member; a fourth selective coupler which, when engaged, fixedly couples the second gearset component of the first planetary gearset and the third gearset component of the second planetary gearset to the at least one stationary member; a fifth selective coupler which, when engaged, fixedly couples the second gearset component of the second planetary gearset, the third gearset component of the third planetary gearset, and the planet carrier of the fourth planetary gearset to the at least one stationary member; a sixth selective coupler which, when engaged, fixedly couples the ring gear of the fourth planetary gearset to the at least one stationary member; and a seventh selective coupler which, when engaged, fixedly couples the second fourth planetary gearset sun gear to the at least one stationary member. A variation thereof, the transmission further comprising a retarder including a retarder housing, a rotor fixedly coupled to the second gearset component of the third planetary gearset and the first fourth planetary gearset sun gear and positioned in the retarder housing, and a stator positioned in the retarder housing and fixedly coupled to the at least one stationary member. In a further variation thereof, the transmission further comprising a fluid control system in fluid communication with an interior of the retarder housing of the retarder to control an amount of fluid in the interior of the retarder housing. In yet a further variation thereof, the fluid control system controls the amount of fluid in the interior of the retarder housing to a first amount in response to a first input from an accelerator input and to a second amount in response to a second input from a brake input, the second amount being more than the first amount.

In another still example thereof, the at least one stationary member includes a housing. The housing having a first end and a second end, wherein the input member is accessible proximate the first end of the housing; the output member is accessible proximate the second end of the housing; the first planetary gearset is positioned between the first end of the housing and the second planetary gearset; the second planetary gearset is positioned between the first planetary gearset and the third planetary gearset; the third planetary gearset is positioned between the second planetary gearset and the fourth planetary gearset; and the fourth planetary gearset is positioned between the third planetary gearset and the second end of the housing.

In yet still another example thereof, each of the first planetary gearset, the second planetary gearset, and the third planetary gearset is a simple planetary gearset. In a variation thereof, the first gearset component of the first planetary gearset is a first sun gear, the first gearset component of the second planetary gearset is a second sun gear, the first gearset component of the third planetary gearset is a third sun gear, the second gearset component of the first planetary gearset is a first planet carrier, the second gearset component of the second planetary gearset is a second planet carrier, the second gearset component of the third planetary gearset is a third planet carrier, the third gearset component of the first planetary gearset is a first ring gear, the third gearset component of the second planetary gearset is a second ring gear, and the third gearset component of the third planetary gearset is a third ring gear.

In a further still example thereof, the stepped planet gear first gear has a first diameter and the stepped planet gear second gear has a second diameter, the second diameter being different than the first diameter. In a variation thereof, the first diameter is larger than the second diameter.

In yet another exemplary embodiment of the present disclosure a transmission is provided. The transmission comprising at least one stationary member; an input member rotatable relative to the at least one stationary member; and a plurality of planetary gearsets operatively coupled to the input member. The plurality of planetary gearsets including a first planetary gearset, a second planetary gearset, and a third planetary gearset wherein each of the first planetary gearset, the second planetary gearset, and the third planetary gearset includes a first gearset component, a second gearset component, and a third gearset component. The plurality of planetary gearsets further including a fourth planetary gearset. The fourth planetary gearset includes a sun gear, a planet carrier, a plurality of stepped planet gears, and a plurality of ring gears, the plurality of ring gears including a first fourth planetary gearset ring gear and a second fourth planetary gearset ring gear. Each of the plurality of stepped planet gears having a stepped planet gear first gear intermeshed with the sun gear and the first fourth planetary gearset ring gear and a stepped planet gear second gear intermeshed with the second fourth planetary gearset ring gear. The input member is fixedly coupled to the first gearset component of the first planetary gearset. The transmission further comprising an output member operatively coupled to the input member through the plurality of planetary gearsets and rotatable relative to the at least one stationary member. The output member is fixedly coupled to the second gearset component of the third planetary gearset and to the fourth planetary gearset. The transmission further comprising a first interconnector which fixedly couples the second gearset component of the second planetary gearset, the third gearset component of the third planetary gearset, and the first fourth planetary gearset ring gear of the fourth planetary gearset together; a second interconnector which fixedly couples the second gearset component of the first planetary gearset to the third gearset component of the second planetary gearset; a third interconnector which fixedly couples the first gearset component of the second planetary gearset to the first gearset component of the third planetary gearset; and a plurality of selective couplers. The plurality of selective couplers include a first number of clutches and a second number of brakes, wherein the second number is more than the first number.

In an example thereof, the output member is further fixedly coupled to the sun gear of the fourth planetary gearset.

In another example thereof, the first number is two and the second number is five.

In a further example thereof, the plurality of selective couplers includes: a first selective coupler which, when engaged, fixedly couples the first gearset component of the first planetary gearset to the first gearset component of the second planetary gearset and the first gearset component of the third planetary gearset; a second selective coupler which, when engaged, fixedly couples the first gearset component of the first planetary gearset to the second gearset component of the second planetary gearset, the third gearset component of the third planetary gearset, and the first fourth planetary gearset ring gear of the fourth planetary gearset; a third selective coupler which, when engaged, fixedly couples the third gearset component of the first planetary gearset to the at least one stationary member; a fourth selective coupler which, when engaged, fixedly couples the second gearset component of the first planetary gearset and the third gearset component of the second planetary gearset to the at least one stationary member; a fifth selective coupler which, when engaged, fixedly couples the second gearset component of the second planetary gearset, the third gearset component of the third planetary gearset, and the first fourth planetary gearset ring gear of the fourth planetary gearset to the at least one stationary member; a sixth selective coupler which, when engaged, fixedly couples the second fourth planetary gearset ring gear of the fourth planetary gearset to the at least one stationary member; and a seventh selective coupler which, when engaged, fixedly couples the planet carrier of the fourth planetary gearset to the at least one stationary member. In a variation thereof, the transmission further comprising a retarder including a retarder housing, a rotor fixedly coupled to the second gearset component of the third planetary gearset and the sun gear of the fourth planetary gearset and positioned in the retarder housing, and a stator positioned in the retarder housing and fixedly coupled to the at least one stationary member. In a further variation thereof, the transmission further comprising a fluid control system in fluid communication with an interior of the retarder housing of the retarder to control an amount of fluid in the interior of the retarder housing. In still another variation thereof, the fluid control system controls the amount of fluid in the interior of the retarder housing to a first amount in response to a first input from an accelerator input and to a second amount in response to a second input from a brake input, the second amount being more than the first amount.

In yet a further still example thereof, the at least one stationary member includes a housing. The housing having a first end and a second end, wherein the input member is accessible proximate the first end of the housing; the output member is accessible proximate the second end of the housing; the first planetary gearset is positioned between the first end of the housing and the second planetary gearset; the second planetary gearset is positioned between the first planetary gearset and the third planetary gearset; the third planetary gearset is positioned between the second planetary gearset and the fourth planetary gearset; and the fourth planetary gearset is positioned between the third planetary gearset and the second end of the housing.

In another still example thereof, each of the first planetary gearset, the second planetary gearset, and the third planetary gearset is a simple planetary gearset. In a variation thereof, the first gearset component of the first planetary gearset is a first sun gear, the first gearset component of the second planetary gearset is a second sun gear, the first gearset component of the third planetary gearset is a third sun gear, the second gearset component of the first planetary gearset is a first planet carrier, the second gearset component of the second planetary gearset is a second planet carrier, the second gearset component of the third planetary gearset is a third planet carrier, the third gearset component of the first planetary gearset is a first ring gear, the third gearset component of the second planetary gearset is a second ring gear, and the third gearset component of the third planetary gearset is a third ring gear.

In yet still a further example thereof, the stepped planet gear first gear has a first diameter and the stepped planet gear second gear has a second diameter, the second diameter being different than the first diameter. In a variation thereof, the first diameter is smaller than the second diameter.

In yet still another exemplary embodiment of the present disclosure a transmission is provided. The transmission comprising at least one stationary member; an input member rotatable relative to the at least one stationary member; and a plurality of planetary gearsets operatively coupled to the input member. The plurality of planetary gearsets including a first planetary gearset, a second planetary gearset, and a third planetary gearset wherein each of the first planetary gearset, the second planetary gearset, and the third planetary gearset includes a first gearset component, a second gearset component, and a third gearset component. The plurality of planetary gearsets further including a fourth planetary gearset. The fourth planetary gearset includes a sun gear, a planet carrier, a first plurality of planet gears, a second plurality of planet gears, and a plurality of ring gears. The plurality of ring gears including a first fourth planetary gearset ring gear and a second fourth planetary gearset ring gear. Each of the plurality of first plurality of planet gears is intermeshed with a respective one of the second plurality of planet gears. The first plurality of planet gears are further intermeshed with the sun gear and the second fourth planetary gearset ring gear. The second plurality of planet gears are further intermeshed with the first fourth planetary gearset ring gear. The input member is fixedly coupled to the first gearset component of the first planetary gearset. The transmission further comprising an output member operatively coupled to the input member through the plurality of planetary gearsets and rotatable relative to the at least one stationary member. The output member is fixedly coupled to the second gearset component of the third planetary gearset and to the fourth planetary gearset. The transmission further comprising a first interconnector which fixedly couples the second gearset component of the second planetary gearset, the third gearset component of the third planetary gearset, and the planet carrier of the fourth planetary gearset together; a second interconnector which fixedly couples the second gearset component of the first planetary gearset to the third gearset component of the second planetary gearset; a third interconnector which fixedly couples the first gearset component of the second planetary gearset to the first gearset component of the third planetary gearset; and a plurality of selective couplers, wherein the plurality of selective couplers include a first number of clutches and a second number of brakes, wherein the second number is more than the first number.

In an example thereof, the output member is further fixedly coupled to the sun gear of the fourth planetary gearset.

In another example thereof, the first number is two and the second number is five.

In still another example thereof, the plurality of selective couplers includes: a first selective coupler which, when engaged, fixedly couples the first gearset component of the first planetary gearset to the first gearset component of the second planetary gearset and the first gearset component of the third planetary gearset; a second selective coupler which, when engaged, fixedly couples the first gearset component of the first planetary gearset to the second gearset component of the second planetary gearset, the third gearset component of the third planetary gearset, and the planet carrier of the fourth planetary gearset; a third selective coupler which, when engaged, fixedly couples the third gearset component of the first planetary gearset to the at least one stationary member; a fourth selective coupler which, when engaged, fixedly couples the second gearset component of the first planetary gearset and the third gearset component of the second planetary gearset to the at least one stationary member; a fifth selective coupler which, when engaged, fixedly couples the second gearset component of the second planetary gearset, the third gearset component of the third planetary gearset, and the planet carrier of the fourth planetary gearset to the at least one stationary member; a sixth selective coupler which, when engaged, fixedly couples the first fourth planetary gearset ring gear of the fourth planetary gearset to the at least one stationary member; and a seventh selective coupler which, when engaged, fixedly couples the second fourth planetary gearset ring gear of the fourth planetary gearset to the at least one stationary member. In a variation thereof, the transmission further comprising a retarder including a retarder housing, a rotor fixedly coupled to the second gearset component of the third planetary gearset and the sun gear of the fourth planetary gearset and positioned in the retarder housing, and a stator positioned in the retarder housing and fixedly coupled to the at least one stationary member. In another variation thereof, the transmission further comprising a fluid control system in fluid communication with an interior of the retarder housing of the retarder to control an amount of fluid in the interior of the retarder housing. In still another variation thereof, the fluid control system controls the amount of fluid in the interior of the retarder housing to a first amount in response to a first input from an accelerator input and to a second amount in response to a second input from a brake input, the second amount being more than the first amount.

In yet a further example thereof, the at least one stationary member includes a housing. The housing having a first end and a second end, wherein the input member is accessible proximate the first end of the housing; the output member is accessible proximate the second end of the housing; the first planetary gearset is positioned between the first end of the housing and the second planetary gearset; the second planetary gearset is positioned between the first planetary gearset and the third planetary gearset; the third planetary gearset is positioned between the second planetary gearset and the fourth planetary gearset; and the fourth planetary gearset is positioned between the third planetary gearset and the second end of the housing.

In still a further example thereof, each of the first planetary gearset, the second planetary gearset, and the third planetary gearset is a simple planetary gearset. In a variation thereof, the first gearset component of the first planetary gearset is a first sun gear, the first gearset component of the second planetary gearset is a second sun gear, the first gearset component of the third planetary gearset is a third sun gear, the second gearset component of the first planetary gearset is a first planet carrier, the second gearset component of the second planetary gearset is a second planet carrier, the second gearset component of the third planetary gearset is a third planet carrier, the third gearset component of the first planetary gearset is a first ring gear, the third gearset component of the second planetary gearset is a second ring gear, and the third gearset component of the third planetary gearset is a third ring gear.

In a further still exemplary embodiment of the present disclosure a transmission is provided. The transmission comprising at least one stationary member; an input member rotatable relative to the at least one stationary member; and a plurality of planetary gearsets operatively coupled to the input member. The plurality of planetary gearsets including a first planetary gearset, a second planetary gearset, and a third planetary gearset wherein each of the first planetary gearset, the second planetary gearset, and the third planetary gearset includes a first gearset component, a second gearset component, and a third gearset component. The plurality of planetary gearsets further including a fourth planetary gearset. The fourth planetary gearset includes a plurality of sun gears including a first fourth planetary gearset sun gear and a second fourth planetary gearset sun gear, a planet carrier, a first plurality of planet gears, a second plurality of planet gears, and a ring gear. Each of the plurality of first plurality of planet gears is intermeshed with a respective one of the second plurality of planet gears. The first plurality of planet gears are further intermeshed with the first fourth planetary gearset sun gear. The second plurality of planet gears are further intermeshed with the ring gear and the second fourth planetary gearset sun gear. The input member is fixedly coupled to the first gearset component of the first planetary gearset. The transmission further comprising an output member operatively coupled to the input member through the plurality of planetary gearsets and rotatable relative to the at least one stationary member. The output member is fixedly coupled to the second gearset component of the third planetary gearset and to the fourth planetary gearset. The transmission further comprising a first interconnector which fixedly couples the second gearset component of the second planetary gearset, the third gearset component of the third planetary gearset, and the planet carrier of the fourth planetary gearset together; a second interconnector which fixedly couples the second gearset component of the first planetary gearset to the third gearset component of the second planetary gearset; a third interconnector which fixedly couples the first gearset component of the second planetary gearset to the first gearset component of the third planetary gearset; and a plurality of selective couplers, wherein the plurality of selective couplers include a first number of clutches and a second number of brakes, wherein the second number is more than the first number.

In an example thereof, the output member is further fixedly coupled to the first fourth planetary gearset sun gear of the fourth planetary gearset.

In another example thereof, the first number is two and the second number is five.

In still another example thereof, the plurality of selective couplers includes: a first selective coupler which, when engaged, fixedly couples the first gearset component of the first planetary gearset to the first gearset component of the second planetary gearset and the first gearset component of the third planetary gearset; a second selective coupler which, when engaged, fixedly couples the first gearset component of the first planetary gearset to the second gearset component of the second planetary gearset, the third gearset component of the third planetary gearset, and the planet carrier of the fourth planetary gearset; a third selective coupler which, when engaged, fixedly couples the third gearset component of the first planetary gearset to the at least one stationary member; a fourth selective coupler which, when engaged, fixedly couples the second gearset component of the first planetary gearset and the third gearset component of the second planetary gearset to the at least one stationary member; a fifth selective coupler which, when engaged, fixedly couples the second gearset component of the second planetary gearset, the third gearset component of the third planetary gearset, and the planet carrier of the fourth planetary gearset to the at least one stationary member; a sixth selective coupler which, when engaged, fixedly couples the ring gear of the fourth planetary gearset to the at least one stationary member; and a seventh selective coupler which, when engaged, fixedly couples the second fourth planetary gearset sun gear of the fourth planetary gearset to the at least one stationary member.

In yet a further example thereof, the transmission further comprising a retarder including a retarder housing, a rotor fixedly coupled to the second gearset component of the third planetary gearset and the first fourth planetary gearset sun gear of the fourth planetary gearset and positioned in the retarder housing, and a stator positioned in the retarder housing and fixedly coupled to the at least one stationary member. In a variation thereof, the transmission further comprising a fluid control system in fluid communication with an interior of the retarder housing of the retarder to control an amount of fluid in the interior of the retarder housing. In another variation thereof, the fluid control system controls the amount of fluid in the interior of the retarder housing to a first amount in response to a first input from an accelerator input and to a second amount in response to a second input from a brake input, the second amount being more than the first amount.

In yet another example thereof, the at least one stationary member includes a housing. The housing having a first end and a second end, wherein the input member is accessible proximate the first end of the housing; the output member is accessible proximate the second end of the housing; the first planetary gearset is positioned between the first end of the housing and the second planetary gearset; the second planetary gearset is positioned between the first planetary gearset and the third planetary gearset; the third planetary gearset is positioned between the second planetary gearset and the fourth planetary gearset; and the fourth planetary gearset is positioned between the third planetary gearset and the second end of the housing.

In still yet another example thereof, each of the first planetary gearset, the second planetary gearset, and the third planetary gearset is a simple planetary gearset. In a variation thereof, the first gearset component of the first planetary gearset is a first sun gear, the first gearset component of the second planetary gearset is a second sun gear, the first gearset component of the third planetary gearset is a third sun gear, the second gearset component of the first planetary gearset is a first planet carrier, the second gearset component of the second planetary gearset is a second planet carrier, the second gearset component of the third planetary gearset is a third planet carrier, the third gearset component of the first planetary gearset is a first ring gear, the third gearset component of the second planetary gearset is a second ring gear, and the third gearset component of the third planetary gearset is a third ring gear.

BRIEF DESCRIPTION OF THE DRAWINGS

The above-mentioned and other features and advantages of this disclosure, and the manner of attaining them, will become more apparent and will be better understood by reference to the following description of exemplary embodiments taken in conjunction with the accompanying drawings, wherein.

Corresponding reference characters indicate corresponding parts throughout the several views. The exemplifications set out herein illustrate exemplary embodiments of the invention and such exemplifications are not to be construed as limiting the scope of the invention in any manner.

DETAILED DESCRIPTION

Figure 1:
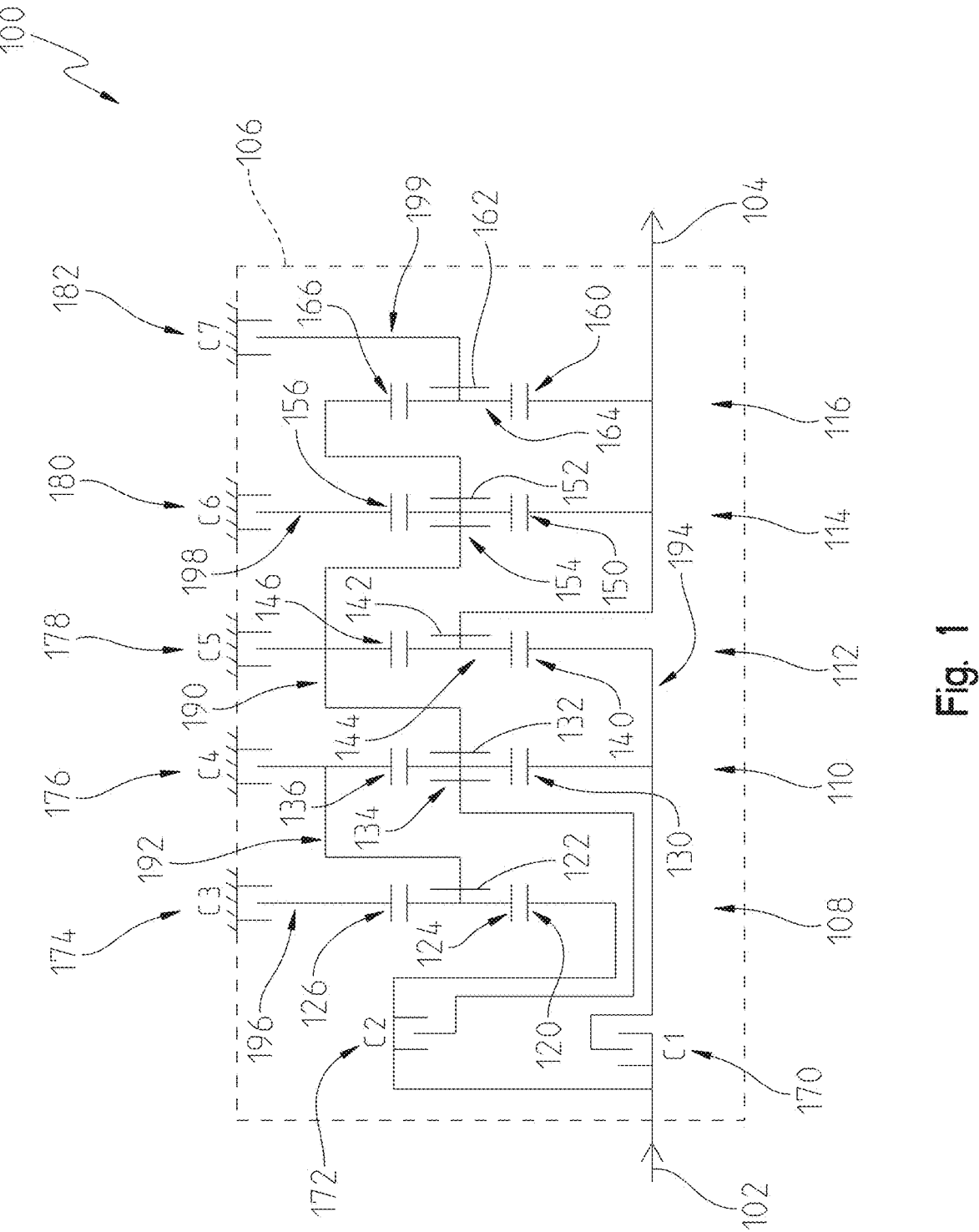
FIG. 1 is a diagrammatic view of an exemplary multi-speed transmission including five planetary gearsets and seven selective couplers.

For the purposes of promoting an understanding of the principles of the present disclosure, reference is now made to the embodiments illustrated in the drawings, which are described below. The embodiments disclosed below are not intended to be exhaustive or limit the present disclosure to the precise form disclosed in the following detailed description. Rather, the embodiments are chosen and described so that others skilled in the art may utilize their teachings. Therefore, no limitation of the scope of the present disclosure is thereby intended. Corresponding reference characters indicate corresponding parts throughout the several views.

In the illustrated transmission embodiments, selective couplers are disclosed. A selective coupler is a device which may be actuated to fixedly couple two or more components together. A selective coupler fixedly couples two or more components to rotate together as a unit when the selective coupler is in an engaged configuration. Further, the two or more components may be rotatable relative to each other when the selective coupler is in a disengaged configuration. The terms "couples", "coupled", "coupler" and variations thereof are used to include both arrangements wherein the two or more components are in direct physical contact and arrangements wherein the two or more components are not in direct contact with each other (e.g., the components are "coupled" via at least a third component), but yet still cooperate or interact with each other.

A first exemplary selective coupler is a clutch. A clutch couples two or more rotating components to one another so that the two or more rotating components rotate together as a unit in an engaged configuration and permits relative rotation between the two or more rotating components in the disengaged position. Exemplary clutches may be shiftable friction-locked multi-disk clutches, shiftable form-locking claw or conical clutches, wet clutches, or any other known form of a clutch.

A second exemplary selective coupler is a brake. A brake couples one or more rotatable components to a stationary component to hold the one or more rotatable components stationary relative to the stationary component in the engaged configuration and permits rotation of the one or more components relative to the stationary component in the disengaged configuration. Exemplary brakes may be configured as shiftable-friction-locked disk brakes, shiftable friction-locked band brakes, shiftable form-locking claw or conical brakes, or any other known form of a brake.

Selective couplers may be actively controlled devices or passive devices. Exemplary actively controlled devices include hydraulically actuated clutch or brake elements and electrically actuated clutch or brake elements. Additional details regarding systems and methods for controlling selective couplers are disclosed in t U.S. Pat. No. 10,024,394, the entire disclosure of which is incorporated by reference herein.

In addition to coupling through selective couplers, various components of the disclosed transmission embodiments may be fixedly coupled together continuously throughout the operation of the disclosed transmissions. Components may be fixedly coupled together either permanently or removably. Components may be fixedly coupled together through spline connections, press fitting, fasteners, welding, machined or formed functional portions of a unitary piece, or other suitable methods of connecting components.

The disclosed transmission embodiments include a plurality of planetary gearsets. Each planetary gearset includes at least four components: a sun gear; a ring gear; a plurality of planet gears; and a carrier that is rotatably coupled to and carries the planet gears. In the case of a simple planetary gearset, the teeth of the sun gear are intermeshed with the teeth of the planet gears which are in turn engaged with the teeth of the ring gear. Each of these components may also be referred to as a gearset component. It will be apparent to one of skill in the art that some planetary gearsets may include further components than those explicitly identified. For example, one or more of the planetary gearsets may include two sets of planet gears. A first set of planet gears may intermesh with the sun gear while the second set of planet gears intermesh with the first set of planet gears and the ring gear. Both sets of planet gears are carried by the planet carrier.

One or more rotating components, such as shafts, drums, and other components, may be collectively referred to as an interconnector when the one or more components are fixedly coupled together. Interconnectors may further be fixedly coupled to one or more gearset components and/or one or more selective couplers.

An input member of the disclosed transmission embodiments is rotated by a prime mover. An exemplary input member is a shaft or other rotatable component which may be operatively coupled to the prime mover. Exemplary prime movers include internal combustion engines, electric motors, hybrid power systems, and other suitable power systems. In one embodiment, the prime mover indirectly rotates the input member through a clutch and/or a torque converter. An output member of the disclosed transmission embodiments provides rotational power to one or more working components. An exemplary output member is a shaft or other rotatable component which may be operatively coupled to the working component. Exemplary working components include one or more drive wheels of a motor vehicle, a power take-off shaft, and other suitable devices. The output member is rotated based on the interconnections of the gearset components and the selective couplers of the transmission. By changing the interconnections of the gearset components and the selective couplers, a rotation speed and/or direction of the output member may be varied from a rotation speed and/or direction of the input member.

The disclosed transmission embodiments are capable of transferring torque from the input member to the output member and rotating the output member in at least eight forward gear or speed ratios relative to the input member and at least three reverse gear or speed ratios. Illustratively nine forward gear or speed ratios and four reverse gear or speed ratios are possible for some embodiments. Exemplary gear ratios that may be obtained using the embodiments of the present disclosure are disclosed herein. Of course, other gear ratios are achievable depending on the characteristics of the gearsets utilized. Exemplary characteristics include respective gear diameters, the number of gear teeth, and the configurations of the various gears.

FIG. 1 is a diagrammatic representation of a multi-speed transmission 100. Multi-speed transmission 100 includes an input member 102 and an output member 104. Each of input member 102 and output member 104 is rotatable relative to at least one stationary member 106. An exemplary input member 102 is an input shaft or other suitable rotatable component which is accessible from a first end of stationary member 106 so that a drive component, such as an output of a prime mover 820 (see FIG. 13) or a rotatable component operatively coupled to an output of a prime mover 820 (see FIG. 13), may be coupled thereto. An exemplary output member 104 is an output shaft or other suitable rotatable component which is accessible from a second end of stationary member 106 so that a driven component 822 (see FIG. 13), such as an output shaft, a differential, a pump, one or more ground engaging members, may be coupled thereto. An exemplary stationary member 106 is a housing of multi-speed transmission 100. The housing may include several components coupled together.

Multi-speed transmission 100 includes a plurality of planetary gearsets, illustratively a first planetary gearset 108, a second planetary gearset 110, a third planetary gearset 112, a fourth planetary gearset 114, and a fifth planetary gearset 116. In one embodiment, additional planetary gearsets may be included. Further, although first planetary gearset 108, second planetary gearset 110, third planetary gearset 112, fourth planetary gearset 114, and fifth planetary gearset 116 are illustrated as simple planetary gearsets, it is contemplated that compound planetary gearsets may be included in some embodiments.

First planetary gearset 108 includes a sun gear 120, a planet carrier 122 supporting a plurality of planet gears 124, and a ring gear 126. Second planetary gearset 110 includes a sun gear 130, a planet carrier 132 supporting a plurality of planet gears 134, and a ring gear 136. Third planetary gearset 112 includes a sun gear 140, a planet carrier 142 supporting a plurality of planet gears 144, and a ring gear 146. Fourth planetary gearset 114 includes a sun gear 150, a planet carrier 152 supporting a plurality of planet gears 154, and a ring gear 156. Fifth planetary gearset 116 includes a sun gear 160, a planet carrier 162 supporting a plurality of planet gears 164, and a ring gear 166.

Multi-speed transmission 100 further includes a plurality of selective couplers, illustratively a first selective coupler 170, a second selective coupler 172, a third selective coupler 174, a fourth selective coupler 176, a fifth selective coupler 178, a sixth selective coupler 180, and a seventh selective coupler 182. In the illustrated embodiment, first selective coupler 170 and second selective coupler 172 are clutches and third selective coupler 174, fourth selective coupler 176, fifth selective coupler 178, sixth selective coupler 180, and seventh selective coupler 182 are brakes. The axial locations of the clutches and brakes relative to the plurality of planetary gearsets may be altered from the illustrated axial locations. In alternative embodiments, any number of clutches and brakes may be used.

Multi-speed transmission 100 includes several components that are illustratively shown as being fixedly coupled together. Input member 102 is fixedly coupled to sun gear 120 of first planetary gearset 108. Output member 104 is fixedly coupled to planet carrier 142 of third planetary gearset 112, sun gear 150 of fourth planetary gearset 114, and sun gear 160 of fifth planetary gearset 116. Sun gear 130 of second planetary gearset 110 is fixedly coupled to sun gear 140 of third planetary gearset 112. Planet carrier 122 of first planetary gearset 108 is fixedly coupled to ring gear 136 of second planetary gearset 110. Ring gear 146 of third planetary gearset 112, planet carrier 132 of second planetary gearset 110, planet carrier 152 of fourth planetary gearset 114, and ring gear 166 of fifth planetary gearset 116 are fixedly coupled together. In alternative embodiments, one or more of the components fixedly coupled together are selectively coupled together through one or more selective couplers.

Multi-speed transmission 100 may be described as having eight interconnectors. Input member 102 is a first interconnector that both provides input torque to multi-speed transmission 100 and is fixedly coupled to sun gear 120 of first planetary gearset 108. Input member 102 is further fixedly connected to first selective coupler 170 and second selective coupler 172. Output member 104 is a second interconnector that both provides output torque from multi-speed transmission 100 and fixedly couples planet carrier 142 of third planetary gearset 112, sun gear 150 of fourth planetary gearset 114, and sun gear 160 of fifth planetary gearset 116. A third interconnector 190 fixedly couples ring gear 146 of third planetary gearset 112, planet carrier 132 of second planetary gearset 110, planet carrier 152 of fourth planetary gearset 114, and ring gear 166 of fifth planetary gearset 116 together. Third interconnector 190 is further fixedly coupled to second selective coupler 172 and fifth selective coupler 178. A fourth interconnector 192 fixedly couples planet carrier 122 of the first planetary gearset 108 to ring gear 136 of the second planetary gearset 110 together. Fourth interconnector 192 is further fixedly coupled to fourth selective coupler 176. A fifth interconnector 194 fixedly couples sun gear 130 of second planetary gearset 110 and sun gear 140 of third planetary gearset 112 together. Fifth interconnector 194 is further fixedly coupled to first selective coupler 170. A sixth interconnector 196 fixedly couples ring gear 126 of first planetary gearset 108 to third selective coupler 174. A seventh interconnector 198 fixedly couples ring gear 156 of fourth planetary gearset 114 to sixth selective coupler 180. An eighth interconnector 199 fixedly couples planet carrier 162 of fifth planetary gearset 116 to seventh selective coupler 182.

Multi-speed transmission 100 further includes several components that are illustratively shown as being selectively coupled together through selective couplers. First selective coupler 170, when engaged, fixedly couples sun gear 120 of the first planetary gearset 108 to sun gear 130 of the second planetary gearset 110 and sun gear 140 of the third planetary gearset 112. When first selective coupler 170 is disengaged, sun gear 120 of the first planetary gearset 108 may rotate relative to sun gear 130 of the second planetary gearset 110 and sun gear 140 of the third planetary gearset 112.

Second selective coupler 172, when engaged, fixedly couples sun gear 120 of the first planetary gearset 108 to planet carrier 132 of second planetary gearset 110, ring gear 146 of the third planetary gearset 112, planet carrier 152 of fourth planetary gearset 114, and ring gear 166 of fifth planetary gearset 116. When second selective coupler 172 is disengaged, sun gear 120 of the first planetary gearset 108 may rotate relative to planet carrier 132 of second planetary gearset 110, ring gear 146 of the third planetary gearset 112, planet carrier 152 of fourth planetary gearset 114, and ring gear 166 of fifth planetary gearset 116.

Third selective coupler 174, when engaged, fixedly couples ring gear 126 of the first planetary gearset 108 to stationary member 106. When third selective coupler 174 is disengaged, ring gear 126 of the first planetary gearset 108 may rotate relative to stationary member 106.

Fourth selective coupler 176, when engaged, fixedly couples planet carrier 122 of the first planetary gearset 108 and ring gear 136 of the second planetary gearset 110 to stationary member 106. When fourth selective coupler 176 is disengaged, planet carrier 122 of the first planetary gearset 108 and ring gear 136 of the second planetary gearset 110 may rotate relative to stationary member 106.

Fifth selective coupler 178, when engaged, fixedly couples planet carrier 132 of second planetary gearset 110, ring gear 146 of the third planetary gearset 112, planet carrier 152 of fourth planetary gearset 114, and ring gear 166 of fifth planetary gearset 116 to stationary member 106. When fifth selective coupler 178 is disengaged, planet carrier 132 of second planetary gearset 110, ring gear 146 of the third planetary gearset 112, planet carrier 152 of fourth planetary gearset 114, and ring gear 166 of fifth planetary gearset 116 may rotate relative to stationary member 106.

Sixth selective coupler 180, when engaged, fixedly couples ring gear 156 of fourth planetary gearset 114 to stationary member 106. When sixth selective coupler 180 is disengaged, ring gear 156 of fourth planetary gearset 114 may rotate relative to stationary member 106.

Seventh selective coupler 182, when engaged, fixedly couples planet carrier 162 of the fifth planetary gearset 116 to stationary member 106. When seventh selective coupler 182 is disengaged, planet carrier 162 of the fifth planetary gearset 116 may rotate relative to stationary member 106.

By engaging various combinations of first selective coupler 170, second selective coupler 172, third selective coupler 174, fourth selective coupler 176, fifth selective coupler 178, sixth selective coupler 180, and seventh selective coupler 182, additional components of multi-speed transmission 100 may be fixedly coupled together.

Figure 2:
FIG. 2 is a truth table illustrating the selective engagement of the seven selective couplers of FIG. 1 to provide a plurality of forward and reverse gear or speed ratios of the multi-speed transmission of FIG. 1.

The plurality of planetary gearsets and the plurality of selective couplers of multi-speed transmission 100 may be interconnected in various arrangements to provide torque from input member 102 to output member 104. Referring to FIG. 2, an exemplary shift table 800 is shown that provides the state of each of first selective coupler 170, second selective coupler 172, third selective coupler 174, fourth selective coupler 176, fifth selective coupler 178, sixth selective coupler 180, and seventh selective coupler 182 for nine different forward gear or speed ratios (F1-F9) and four reverse gear or speed ratios (R1-R4). In embodiments, more or less forward and/or reverse speed ratios may be provided. Each row corresponds to a given interconnection arrangement for transmission 100. The first column provides the gear range (R2 being a higher ratio or gear than R1 for reverse gears and F2 being a higher ratio or gear than F1 for forward gears). The second column provides the gear ratio between the input member 102 and the output member 104. The third column provides the gear step. The seven right-most columns illustrate which ones of the selective couplers 170-182 are engaged ("X" indicates engaged) and which ones of selective couplers 170-182 are disengaged ("(blank)" indicates disengaged). FIG. 2 is only one example of any number of truth tables possible for achieving a plurality of forward ratios and a plurality of reverse ratios.

In one embodiment, to place multi-speed transmission 100 in neutral (Neu), all of first selective coupler 170, second selective coupler 172, third selective coupler 174, fourth selective coupler 176, fifth selective coupler 178, sixth selective coupler 180, and seventh selective coupler 182 are in the disengaged configuration. One or more of first selective coupler 170, second selective coupler 172, third selective coupler 174, fourth selective coupler 176, fifth selective coupler 178, sixth selective coupler 180, and seventh selective coupler 182 may remain engaged in neutral (Neu) as long as the combination of first selective coupler 170, second selective coupler 172, third selective coupler 174, fourth selective coupler 176, fifth selective coupler 178, sixth selective coupler 180, and seventh selective coupler 182 does not transmit torque from input member 102 to output member 104.

A first forward ratio (shown as F1) in shift table 800 of FIG. 2 is achieved by having first selective coupler 170 and seventh selective coupler 182 in an engaged configuration and second selective coupler 172, third selective coupler 174, fourth selective coupler 176, fifth selective coupler 178, and sixth selective coupler 180 in a disengaged configuration. \

A second or subsequent forward ratio (shown as F2) in shift table 800 of FIG. 2 is achieved by having first selective coupler 170 and fifth selective coupler 178 in an engaged configuration and second selective coupler 172, third selective coupler 174, fourth selective coupler 176, sixth selective coupler 180, and seventh selective coupler 182 in a disengaged configuration. Therefore, when transitioning between the first forward ratio and the second forward ratio, seventh selective coupler 182 is placed in the disengaged configuration and fifth selective coupler 178 is placed in the engaged configuration.

A third or subsequent forward ratio (shown as F3) in shift table 800 of FIG. 2 is achieved by having first selective coupler 170 and sixth selective coupler 180 in an engaged configuration and second selective coupler 172, third selective coupler 174, fourth selective coupler 176, fifth selective coupler 178, and seventh selective coupler 182 in a disengaged configuration. Therefore, when transitioning between the second forward ratio and the third forward ratio, fifth selective coupler 178 is placed in the disengaged configuration and sixth selective coupler 180 is placed in the engaged configuration.

A fourth or subsequent forward ratio (shown as F4) in shift table 800 of FIG. 2 is achieved by having first selective coupler 170 and fourth selective coupler 176 in an engaged configuration and second selective coupler 172, third selective coupler 174, fifth selective coupler 178, sixth selective coupler 180, and seventh selective coupler 182 in a disengaged configuration. Therefore, when transitioning between the third forward ratio and the fourth forward ratio, sixth selective coupler 180 is placed in the disengaged configuration and fourth selective coupler 176 is placed in the engaged configuration.

A fifth or subsequent forward ratio (shown as F5) in shift table 800 of FIG. 2 is achieved by having first selective coupler 170 and third selective coupler 174 in an engaged configuration and second selective coupler 172, fourth selective coupler 176, fifth selective coupler 178, sixth selective coupler 180, and seventh selective coupler 182 in a disengaged configuration. Therefore, when transitioning between the fourth forward ratio and the fifth forward ratio, fourth selective coupler 176 is placed in the disengaged configuration and third selective coupler 174 is placed in the engaged configuration.

A sixth or subsequent forward ratio (shown as F6) in shift table 800 of FIG. 2 is achieved by having first selective coupler 170 and second selective coupler 172 in an engaged configuration and third selective coupler 174, fourth selective coupler 176, fifth selective coupler 178, sixth selective coupler 180, and seventh selective coupler 182 in a disengaged configuration. Therefore, when transitioning between the fifth forward ratio and the sixth forward ratio, third selective coupler 174 is placed in the disengaged configuration and second selective coupler 172 is placed in the engaged configuration.

A seventh or subsequent forward ratio (shown as F7) in shift table 800 of FIG. 2 is achieved by having second selective coupler 172 and third selective coupler 174 in an engaged configuration and first selective coupler 170, fourth selective coupler 176, fifth selective coupler 178, sixth selective coupler 180, and seventh selective coupler 182 in a disengaged configuration. Therefore, when transitioning between the sixth forward ratio and the seventh forward ratio, first selective coupler 170 is placed in the disengaged configuration and third selective coupler 174 is placed in the engaged configuration.

An eighth or subsequent forward ratio (shown as F8) in shift table 800 of FIG. 2 is achieved by having second selective coupler 172 and fourth selective coupler 176 in an engaged configuration and first selective coupler 170, third selective coupler 174, fifth selective coupler 178, sixth selective coupler 180, and seventh selective coupler 182 in a disengaged configuration. Therefore, when transitioning between the seventh forward ratio and the eighth forward ratio, third selective coupler 174 is placed in the disengaged configuration and fourth selective coupler 176 is placed in the engaged configuration.

A ninth or subsequent forward ratio (shown as F9) in shift table 800 of FIG. 2 is achieved by having second selective coupler 172 and sixth selective coupler 180 in an engaged configuration and first selective coupler 170, third selective coupler 174, fourth selective coupler 176, fifth selective coupler 178, and seventh selective coupler 182 in a disengaged configuration. Therefore, when transitioning between the eighth forward ratio and the ninth forward ratio, fourth selective coupler 176 is placed in the disengaged configuration and sixth selective coupler 180 is placed in the engaged configuration.

A first reverse ratio (shown as R1) in shift table 800 of FIG. 2 is achieved by having third selective coupler 174 and seventh selective coupler 182 in an engaged configuration and first selective coupler 170, second selective coupler 172, fourth selective coupler 176, fifth selective coupler 178, and sixth selective coupler 180 in a disengaged configuration.

A second or subsequent reverse ratio (shown as R2) in shift table 800 of FIG. 2 is achieved by having third selective coupler 174 and fifth selective coupler 178 in an engaged configuration and first selective coupler 170, second selective coupler 172, fourth selective coupler 176, sixth selective coupler 180, and seventh selective coupler 182 in a disengaged configuration. Therefore, when transitioning between the first reverse ratio and the second reverse ratio, seventh selective coupler 182 is placed in the disengaged configuration and fifth selective coupler 178 is placed in the engaged configuration.

A third or subsequent reverse ratio (shown as R3) in shift table 800 of FIG. 2 is achieved by having third selective coupler 174 and sixth selective coupler 180 in an engaged configuration and first selective coupler 170, second selective coupler 172, fourth selective coupler 176, fifth selective coupler 178, and seventh selective coupler 182 in a disengaged configuration. Therefore, when transitioning between the second reverse ratio and the third reverse ratio, fifth selective coupler 178 is placed in the disengaged configuration and sixth selective coupler 180 is placed in the engaged configuration.

A fourth or subsequent reverse ratio (shown as R4) in shift table 800 of FIG. 2 is achieved by having second selective coupler 172 and seventh selective coupler 182 in an engaged configuration and first selective coupler 170, third selective coupler 174, fourth selective coupler 176, fifth selective coupler 178, and sixth selective coupler 180 in a disengaged configuration. Therefore, when transitioning between the third reverse ratio and the fourth reverse ratio, third selective coupler 174 and sixth selective coupler 180 are placed in the disengaged configuration and second selective coupler 172 and seventh selective coupler 182 are placed in the engaged configuration.

The present disclosure contemplates that downshifts follow the reverse sequence of the corresponding upshift (as described above). Further, several power-on skip-shifts that are single-transition are possible (e.g. from F1 up to F3, from F3 down to F1, from F3 up to F5, and from F5 down to F3).

In the illustrated embodiments, various combinations of two of the available selective couplers are engaged for each of the illustrated forward speed ratios and reverse speed ratios. Additional forward speed ratios and reverse speed ratios are possible based on other combinations of engaged selective couplers. Although in the illustrated embodiments, each forward speed ratio and reverse speed ratio has two of the available selective couplers engaged, it is contemplated that more than two selective couplers may be engaged at the same time.

Figure 1A:
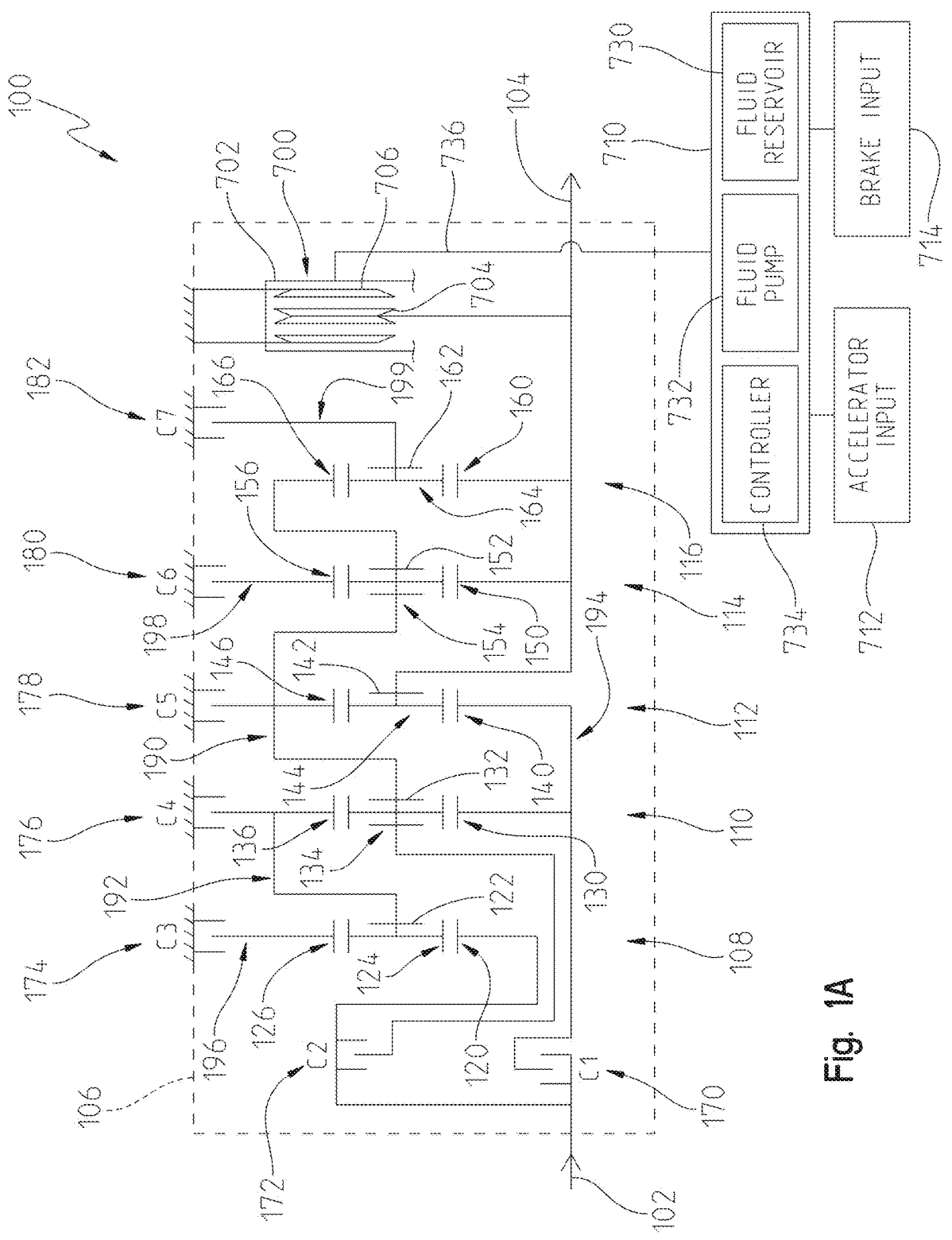
FIG. 1A is a diagrammatic view of the exemplary multi-speed transmission of FIG. 1 including a retarder.

Referring to FIG. 1A, multi-speed transmission 100 may further include a retarder 700. Retarder 700 includes a retarder housing 702 containing a rotor 704 and stator 706. Rotor 704 is fixedly coupled to output member 104 to rotate with output member 104. Stator 706 is fixedly coupled to stationary member 106. Thus, as output member 104 rotates rotor 704 rotates relative to stator 706.

Both of rotor 704 and stator 706 include vanes. Hydraulic fluid is provided to and removed from retarder housing 702 with a fluid control system 710. Fluid control system 710 includes a fluid reservoir 730, a pump 732, a controller 734, and at least one fluid conduit 736 in fluid communication with fluid reservoir 730, pump 732, and an interior of the retarder housing 702. As more fluid is provided to retarder housing 702, the rotation of rotor 704 is retarded due to the resistance of the fluid, such as oil, to be moved by the vanes of rotor 704 due to the stationary vanes of stator 706. In embodiments, in response to an operator of the vehicle including multi-speed transmission 100 removing their foot from the accelerator pedal, the accelerator input 712, the controller 734 of fluid control system 710 provides a first amount of fluid to retarder housing 702 which in turn retards the rotation of rotor 704 relative to stator 706 and hence retards output member 104 thereby slowing the vehicle including multi-speed transmission 100. Further, if the operator of the vehicle including multi-speed transmission 100 depresses the brake pedal, the brake input 714, controller 734 of fluid control system 710 provides a second amount of fluid to retarder housing 702, the second amount being higher than the first amount. The further increase in the amount of fluid further retards the rotation of rotor 704 relative to stator 706 and hence further retards output member 104 thereby slowing the vehicle including multi-speed transmission 100 faster.

Figure 3:
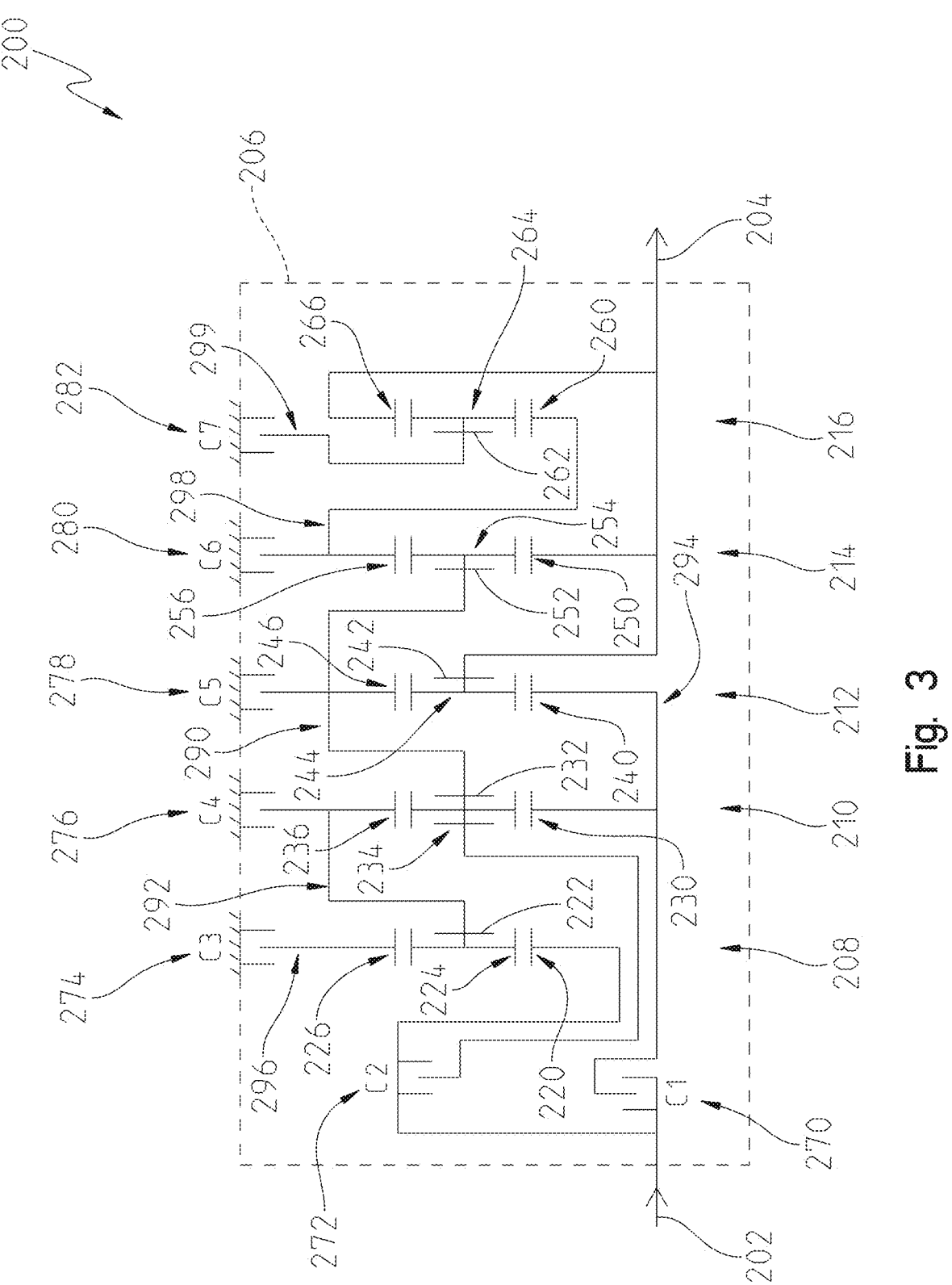
FIG. 3 is a diagrammatic view of an exemplary multi-speed transmission including five planetary gearsets and seven selective couplers.

FIG. 3 is a diagrammatic representation of a multi-speed transmission 200. Multi-speed transmission 200 includes an input member 202 and an output member 204. Each of input member 202 and output member 204 is rotatable relative to at least one stationary member 206. An exemplary input member 202 is an input shaft or other suitable rotatable component which is accessible from a first end of stationary member 206 so that a drive component, such as an output of a prime mover 820 (see FIG. 13) or a rotatable component operatively coupled to an output of a prime mover 820 (see FIG. 13), may be coupled thereto. An exemplary output member 204 is an output shaft or other suitable rotatable component which is accessible from a second end of stationary member 206 so that a driven component 822 (see FIG. 13), such as an output shaft, a differential, a pump, one or more ground engaging members, may be coupled thereto.

Multi-speed transmission 200 includes a plurality of planetary gearsets, illustratively a first planetary gearset 208, a second planetary gearset 210, a third planetary gearset 212, a fourth planetary gearset 214, and a fifth planetary gearset 216. In one embodiment, additional planetary gearsets may be included. Further, although first planetary gearset 208, second planetary gearset 210, third planetary gearset 212, fourth planetary gearset 214, and fifth planetary gearset 216 are illustrated as simple planetary gearsets, it is contemplated that compound planetary gearsets may be included in some embodiments.

First planetary gearset 208 includes a sun gear 220, a planet carrier 222 supporting a plurality of planet gears 224, and a ring gear 226. Second planetary gearset 210 includes a sun gear 230, a planet carrier 232 supporting a plurality of planet gears 234, and a ring gear 236. Third planetary gearset 212 includes a sun gear 240, a planet carrier 242 supporting a plurality of planet gears 244, and a ring gear 246. Fourth planetary gearset 214 includes a sun gear 250, a planet carrier 252 supporting a plurality of planet gears 254, and a ring gear 256. Fifth planetary gearset 216 includes a sun gear 260, a planet carrier 262 supporting a plurality of planet gears 264, and a ring gear 266.

Multi-speed transmission 200 further includes a plurality of selective couplers, illustratively a first selective coupler 270, a second selective coupler 272, a third selective coupler 274, a fourth selective coupler 276, a fifth selective coupler 278, a sixth selective coupler 280, and a seventh selective coupler 282. In the illustrated embodiment, first selective coupler 270 and second selective coupler 272 are clutches and third selective coupler 274, fourth selective coupler 276, fifth selective coupler 278, sixth selective coupler 280, and seventh selective coupler 282 are brakes. The axial locations of the clutches and brakes relative to the plurality of planetary gearsets may be altered from the illustrated axial locations. In alternative embodiments, any number of clutches and brakes may be used.

Multi-speed transmission 200 includes several components that are illustratively shown as being fixedly coupled together. Input member 202 is fixedly coupled to sun gear 220 of first planetary gearset 208. Output member 204 is fixedly coupled to planet carrier 242 of third planetary gearset 212, sun gear 250 of fourth planetary gearset 214, and ring gear 266 of fifth planetary gearset 216. Sun gear 230 of second planetary gearset 210 is fixedly coupled to sun gear 240 of third planetary gearset 212. Planet carrier 222 of first planetary gearset 208 is fixedly coupled to ring gear 236 of second planetary gearset 210. Ring gear 246 of third planetary gearset 212, planet carrier 232 of second planetary gearset 210, and planet carrier 252 of fourth planetary gearset 214 are fixedly coupled together. Ring gear 256 of fourth planetary gearset 214 is fixedly coupled to sun gear 260 of fifth planetary gearset 216. In alternative embodiments, one or more of the components fixedly coupled together are selectively coupled together through one or more selective couplers.

Multi-speed transmission 200 may be described as having eight interconnectors. Input member 202 is a first interconnector that both provides input torque to multi-speed transmission 200 and is fixedly coupled to sun gear 220 of first planetary gearset 208. Input member 202 is further fixedly connected to first selective coupler 270 and second selective coupler 272. Output member 204 is a second interconnector that both provides output torque from multi-speed transmission 200 and fixedly couples planet carrier 242 of third planetary gearset 212, sun gear 250 of fourth planetary gearset 214, and ring gear 266 of fifth planetary gearset 216. A third interconnector 290 fixedly couples ring gear 246 of third planetary gearset 212, planet carrier 232 of second planetary gearset 210, and planet carrier 252 of fourth planetary gearset 214 together. Third interconnector 290 is further fixedly coupled to second selective coupler 272 and fifth selective coupler 278. A fourth interconnector 292 fixedly couples planet carrier 222 of the first planetary gearset 208 to ring gear 236 of the second planetary gearset 210 together. Fourth interconnector 292 is further fixedly coupled to fourth selective coupler 276. A fifth interconnector 294 fixedly couples sun gear 230 of second planetary gearset 210 and sun gear 240 of third planetary gearset 212 together. Fifth interconnector 294 is further fixedly coupled to first selective coupler 270. A sixth interconnector 296 fixedly couples ring gear 226 of first planetary gearset 208 to third selective coupler 274. A seventh interconnector 298 fixedly couples ring gear 256 of fourth planetary gearset 214 to sun gear 260 of fifth planetary gearset 216. Seventh interconnector 298 is further fixedly coupled to sixth selective coupler 280. An eighth interconnector 299 fixedly couples planet carrier 262 of fifth planetary gearset 216 to seventh selective coupler 282.

Multi-speed transmission 200 further includes several components that are illustratively shown as being selectively coupled together through selective couplers. First selective coupler 270, when engaged, fixedly couples sun gear 220 of the first planetary gearset 208 to sun gear 230 of the second planetary gearset 210 and sun gear 240 of the third planetary gearset 212. When first selective coupler 270 is disengaged, sun gear 220 of the first planetary gearset 208 may rotate relative to sun gear 230 of the second planetary gearset 210 and sun gear 240 of the third planetary gearset 212.

Second selective coupler 272, when engaged, fixedly couples sun gear 220 of the first planetary gearset 208 to planet carrier 232 of second planetary gearset 210, ring gear 246 of the third planetary gearset 212 and planet carrier 252 of fourth planetary gearset 214. When second selective coupler 272 is disengaged, sun gear 220 of the first planetary gearset 208 may rotate relative to planet carrier 232 of second planetary gearset 210, ring gear 246 of the third planetary gearset 212, and planet carrier 252 of fourth planetary gearset 214.

Third selective coupler 274, when engaged, fixedly couples ring gear 226 of the first planetary gearset 208 to stationary member 206. When third selective coupler 274 is disengaged, ring gear 226 of the first planetary gearset 208 may rotate relative to stationary member 206.

Fourth selective coupler 276, when engaged, fixedly couples planet carrier 222 of the first planetary gearset 208 and ring gear 236 of the second planetary gearset 210 to stationary member 206. When fourth selective coupler 276 is disengaged, planet carrier 222 of the first planetary gearset 208 and ring gear 236 of the second planetary gearset 210 may rotate relative to stationary member 206.

Fifth selective coupler 278, when engaged, fixedly couples planet carrier 232 of second planetary gearset 210, ring gear 246 of the third planetary gearset 212 and planet carrier 252 of fourth planetary gearset 214 to stationary member 206. When fifth selective coupler 278 is disengaged, planet carrier 232 of second planetary gearset 210, ring gear 246 of the third planetary gearset 212 and planet carrier 252 of fourth planetary gearset 214 may rotate relative to stationary member 206.

Sixth selective coupler 280, when engaged, fixedly couples ring gear 256 of fourth planetary gearset 214 to stationary member 206. When sixth selective coupler 280 is disengaged, ring gear 256 of fourth planetary gearset 214 may rotate relative to stationary member 206.

Seventh selective coupler 282, when engaged, fixedly couples planet carrier 262 of the fifth planetary gearset 216 to stationary member 206. When seventh selective coupler 282 is disengaged, planet carrier 262 of the fifth planetary gearset 2166 may rotate relative to stationary member 206.

By engaging various combinations of first selective coupler 270, second selective coupler 272, third selective coupler 274, fourth selective coupler 276, fifth selective coupler 278, sixth selective coupler 280, and seventh selective coupler 282, additional components of multi-speed transmission 200 may be fixedly coupled together.

Figure 4:
FIG. 4 is a truth table illustrating the selective engagement of the seven selective couplers of FIG. 3 to provide a plurality of forward and reverse gear or speed ratios of the multi-speed transmission of FIG. 3.

The plurality of planetary gearsets and the plurality of selective couplers of multi-speed transmission 200 may be interconnected in various arrangements to provide torque from input member 202 to output member 204. Referring to FIG. 4, an exemplary shift table 802 is shown that provides the state of each of first selective coupler 270, second selective coupler 272, third selective coupler 274, fourth selective coupler 276, fifth selective coupler 278, sixth selective coupler 280, and seventh selective coupler 282 for nine different forward gear or speed ratios (F1-F9) and four reverse gear or speed ratios (R1-R4). Each row corresponds to a given interconnection arrangement for transmission 200. The first column provides the gear range (R2 being a higher ratio or gear than R1 for reverse gears and F2 being a higher ratio or gear than F1 for forward gears). The second column provides the gear ratio between the input member 202 and the output member 204. The third column provides the gear step. The seven rightmost columns illustrate which ones of the selective couplers 270-282 are engaged ("X" indicates engaged) and which ones of selective couplers 270-282 are disengaged ("(blank)" indicates disengaged). FIG. 4 is only one example of any number of truth tables possible for achieving a plurality of forward ratios and a plurality of reverse ratios.

In one embodiment, to place multi-speed transmission 200 in neutral (Neu), all of first selective coupler 270, second selective coupler 272, third selective coupler 274, fourth selective coupler 276, fifth selective coupler 278, sixth selective coupler 280, and seventh selective coupler 282 are in the disengaged configuration. One or more of first selective coupler 270, second selective coupler 272, third selective coupler 274, fourth selective coupler 276, fifth selective coupler 278, sixth selective coupler 280, and seventh selective coupler 282 may remain engaged in neutral (Neu) as long as the combination of first selective coupler 270, second selective coupler 272, third selective coupler 274, fourth selective coupler 276, fifth selective coupler 278, sixth selective coupler 280, and seventh selective coupler 282 does not transmit torque from input member 202 to output member 204.

A first forward ratio (shown as F1) in shift table 802 of FIG. 4 is achieved by having first selective coupler 270 and seventh selective coupler 282 in an engaged configuration and second selective coupler 272, third selective coupler 274, fourth selective coupler 276, fifth selective coupler 278, and sixth selective coupler 280 in a disengaged configuration.

A second or subsequent forward ratio (shown as F2) in shift table 802 of FIG. 4 is achieved by having first selective coupler 270 and fifth selective coupler 278 in an engaged configuration and second selective coupler 272, third selective coupler 274, fourth selective coupler 276, sixth selective coupler 280, and seventh selective coupler 282 in a disengaged configuration. Therefore, when transitioning between the first forward ratio and the second forward ratio, seventh selective coupler 282 is placed in the disengaged configuration and fifth selective coupler 278 is placed in the engaged configuration.

A third or subsequent forward ratio (shown as F3) in shift table 802 of FIG. 4 is achieved by having first selective coupler 270 and sixth selective coupler 280 in an engaged configuration and second selective coupler 272, third selective coupler 274, fourth selective coupler 276, fifth selective coupler 278, and seventh selective coupler 282 in a disengaged configuration. Therefore, when transitioning between the second forward ratio and the third forward ratio, fifth selective coupler 278 is placed in the disengaged configuration and sixth selective coupler 280 is placed in the engaged configuration.

A fourth or subsequent forward ratio (shown as F4) in shift table 802 of FIG. 4 is achieved by having first selective coupler 270 and fourth selective coupler 276 in an engaged configuration and second selective coupler 272, third selective coupler 274, fifth selective coupler 278, sixth selective coupler 280, and seventh selective coupler 282 in a disengaged configuration. Therefore, when transitioning between the third forward ratio and the fourth forward ratio, sixth selective coupler 280 is placed in the disengaged configuration and fourth selective coupler 276 is placed in the engaged configuration.

A fifth or subsequent forward ratio (shown as F5) in shift table 802 of FIG. 4 is achieved by having first selective coupler 270 and third selective coupler 274 in an engaged configuration and second selective coupler 272, fourth selective coupler 276, fifth selective coupler 278, sixth selective coupler 280, and seventh selective coupler 282 in a disengaged configuration. Therefore, when transitioning between the fourth forward ratio and the fifth forward ratio, fourth selective coupler 276 is placed in the disengaged configuration and third selective coupler 274 is placed in the engaged configuration.

A sixth or subsequent forward ratio (shown as F6) in shift table 802 of FIG. 4 is achieved by having first selective coupler 270 and second selective coupler 272 in an engaged configuration and third selective coupler 274, fourth selective coupler 276, fifth selective coupler 278, sixth selective coupler 280, and seventh selective coupler 282 in a disengaged configuration. Therefore, when transitioning between the fifth forward ratio and the sixth forward ratio, third selective coupler 274 is placed in the disengaged configuration and second selective coupler 272 is placed in the engaged configuration.

A seventh or subsequent forward ratio (shown as F7) in shift table 802 of FIG. 4 is achieved by having second selective coupler 272 and third selective coupler 274 in an engaged configuration and first selective coupler 270, fourth selective coupler 276, fifth selective coupler 278, sixth selective coupler 280, and seventh selective coupler 282 in a disengaged configuration. Therefore, when transitioning between the sixth forward ratio and the seventh forward ratio, first selective coupler 270 is placed in the disengaged configuration and third selective coupler 274 is placed in the engaged configuration.

An eighth or subsequent forward ratio (shown as F8) in shift table 802 of FIG. 4 is achieved by having second selective coupler 272 and fourth selective coupler 276 in an engaged configuration and first selective coupler 270, third selective coupler 274, fifth selective coupler 278, sixth selective coupler 280, and seventh selective coupler 282 in a disengaged configuration. Therefore, when transitioning between the seventh forward ratio and the eighth forward ratio, third selective coupler 274 is placed in the disengaged configuration and fourth selective coupler 276 is placed in the engaged configuration.

A ninth or subsequent forward ratio (shown as F9) in shift table 802 of FIG. 4 is achieved by having second selective coupler 272 and sixth selective coupler 280 in an engaged configuration and first selective coupler 270, third selective coupler 274, fourth selective coupler 276, fifth selective coupler 278, and seventh selective coupler 282 in a disengaged configuration. Therefore, when transitioning between the eighth forward ratio and the ninth forward ratio, fourth selective coupler 276 is placed in the disengaged configuration and sixth selective coupler 280 is placed in the engaged configuration.

A first reverse ratio (shown as R1) in shift table 802 of FIG. 4 is achieved by having third selective coupler 274 and seventh selective coupler 282 in an engaged configuration and first selective coupler 270, second selective coupler 272, fourth selective coupler 276, fifth selective coupler 278, and sixth selective coupler 280 in a disengaged configuration.

A second or subsequent reverse ratio (shown as R2) in shift table 802 of FIG. 4 is achieved by having third selective coupler 274 and fifth selective coupler 278 in an engaged configuration and first selective coupler 270, second selective coupler 272, fourth selective coupler 276, sixth selective coupler 280, and seventh selective coupler 282 in a disengaged configuration. Therefore, when transitioning between the first reverse ratio and the second reverse ratio, seventh selective coupler 282 is placed in the disengaged configuration and fifth selective coupler 278 is placed in the engaged configuration.

A third or subsequent reverse ratio (shown as R3) in shift table 802 of FIG. 4 is achieved by having third selective coupler 274 and sixth selective coupler 280 in an engaged configuration and first selective coupler 270, second selective coupler 272, fourth selective coupler 276, fifth selective coupler 278, and seventh selective coupler 282 in a disengaged configuration. Therefore, when transitioning between the second reverse ratio and the third reverse ratio, fifth selective coupler 278 is placed in the disengaged configuration and sixth selective coupler 280 is placed in the engaged configuration.

A fourth or subsequent reverse ratio (shown as R4) in shift table 802 of FIG. 4 is achieved by having second selective coupler 272 and seventh selective coupler 282 in an engaged configuration and first selective coupler 270, third selective coupler 274, fourth selective coupler 276, fifth selective coupler 278, and sixth selective coupler 280 in a disengaged configuration. Therefore, when transitioning between the third reverse ratio and the fourth reverse ratio, third selective coupler 274 and sixth selective coupler 280 are placed in the disengaged configuration and second selective coupler 272 and seventh selective coupler 282 are placed in the engaged configuration.

The present disclosure contemplates that downshifts follow the reverse sequence of the corresponding upshift (as described above). Further, several power-on skip-shifts that are single-transition are possible (e.g. from F1 up to F3, from F3 down to F1, from F3 up to F5, and from F5 down to F3).

In the illustrated embodiments, various combinations of two of the available selective couplers are engaged for each of the illustrated forward speed ratios and reverse speed ratios. Additional forward speed ratios and reverse speed ratios are possible based on other combinations of engaged selective couplers. Although in the illustrated embodiments, each forward speed ratio and reverse speed ratio has two of the available selective couplers engaged, it is contemplated that more than two selective couplers may be engaged at the same time.

Figure 3A:
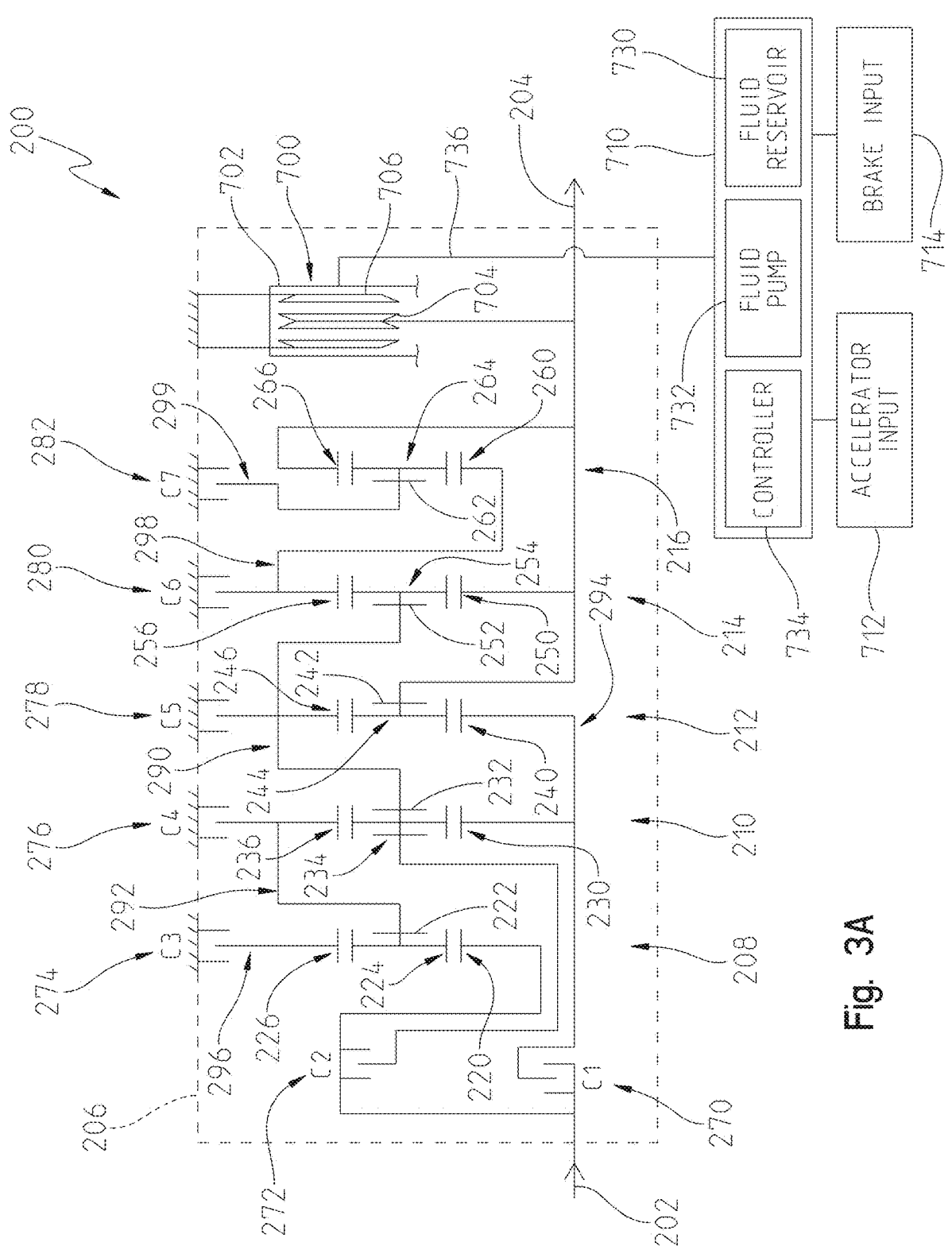
FIG. 3A is a diagrammatic view of the exemplary multi-speed transmission of FIG. 3 including a retarder.

Referring to FIG. 3A, multi-speed transmission 200 may further include a retarder 700. Retarder 700 includes a retarder housing 702 containing a rotor 704 and stator 706. Rotor 704 is fixedly coupled to output member 204 to rotate with output member 204. Stator 706 is fixedly coupled to stationary member 206. Thus, as output member 204 rotates rotor 704 rotates relative to stator 706.

Both of rotor 704 and stator 706 include vanes. Hydraulic fluid is provided to and removed from retarder housing 702 with a fluid control system 710. Fluid control system 710 includes a fluid reservoir 730, a pump 732, a controller 734, and at least one fluid conduit 736 in fluid communication with fluid reservoir 730, pump 732, and an interior of the retarder housing 702. As more fluid is provided to retarder housing 702, the rotation of rotor 704 is retarded due to the resistance of the fluid, such as oil, to be moved by the vanes of rotor 704 due to the stationary vanes of stator 706. In embodiments, in response to an operator of the vehicle including multi-speed transmission 100 removing their foot from the accelerator pedal, the accelerator input 712, controller 734 of fluid control system 710 provides a first amount of fluid to retarder housing 702 which in turn retards the rotation of rotor 704 relative to stator 706 and hence retards output member 104 thereby slowing the vehicle including multi-speed transmission 200. Further, if the operator of the vehicle including multi-speed transmission 200 depresses the brake pedal, the brake input 714, controller 734 of fluid control system 710 provides a second amount of fluid to retarder housing 702, the second amount being higher than the first amount. The further increase in the amount of fluid further retards the rotation of rotor 704 relative to stator 706 and hence further retards output member 204 thereby slowing the vehicle including multi-speed transmission 200 faster.

Figure 5:
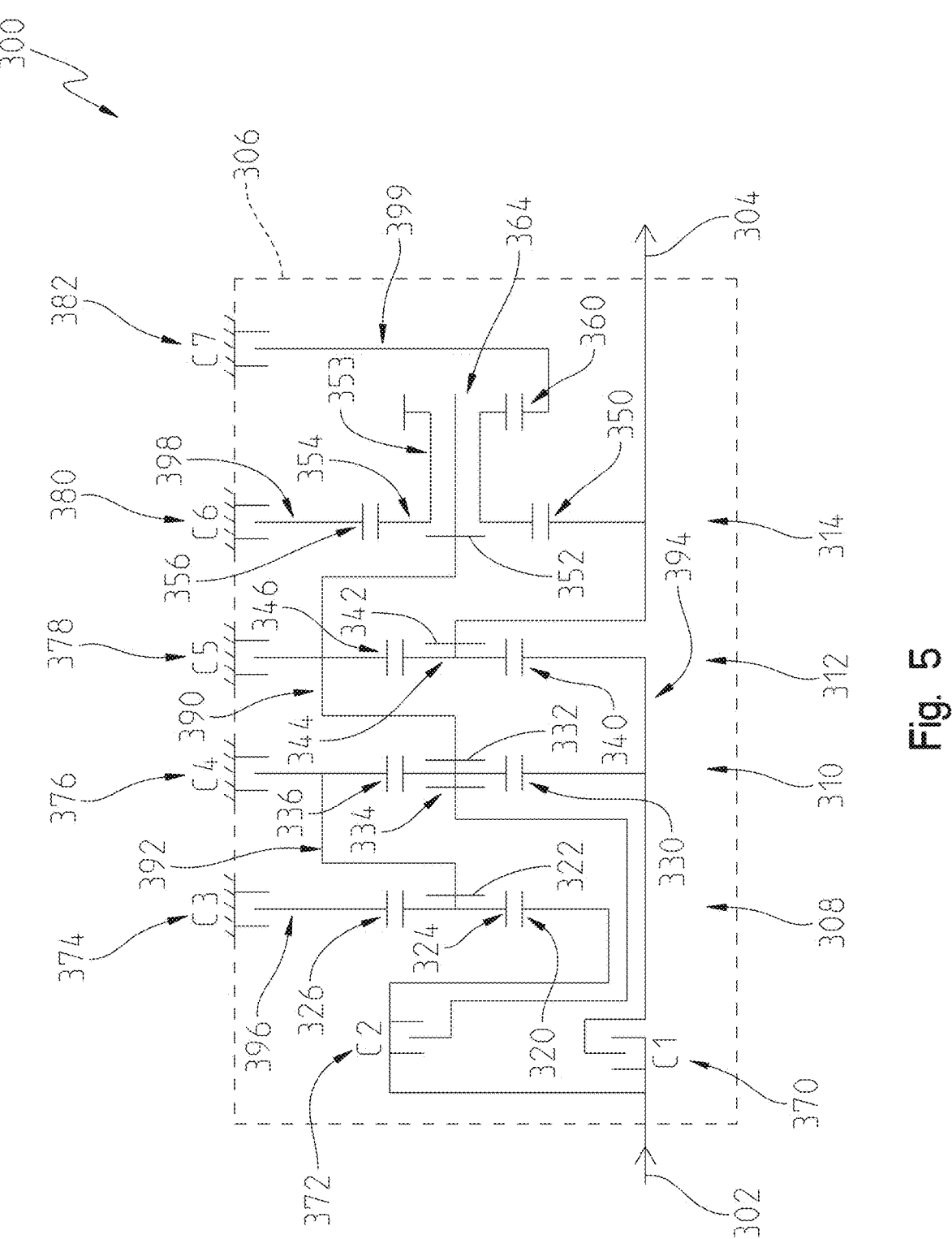
FIG. 5 is a diagrammatic view of an exemplary multi-speed transmission including five planetary gearsets and seven selective couplers.

FIG. 5 is a diagrammatic representation of a multi-speed transmission 300. Multi-speed transmission 300 includes an input member 302 and an output member 304. Each of input member 302 and output member 304 is rotatable relative to at least one stationary member 306. An exemplary input member 302 is an input shaft or other suitable rotatable component which is accessible from a first end of stationary member 306 so that a drive component, such as an output of a prime mover 820 (see FIG. 13) or a rotatable component operatively coupled to an output of a prime mover 820 (see FIG. 13), may be coupled thereto. An exemplary output member 304 is an output shaft or other suitable rotatable component which is accessible from a second end of stationary member 306 so that a driven component 822 (see FIG. 13), such as an output shaft, a differential, a pump, one or more ground engaging members, may be coupled thereto.

Multi-speed transmission 300 includes a plurality of planetary gearsets, illustratively a first planetary gearset 308, a second planetary gearset 310, a third planetary gearset 312, and a fourth planetary gearset 314. In one embodiment, additional planetary gearsets may be included. Further, although first planetary gearset 308, second planetary gearset 310, third planetary gearset 312, are illustrated as simple planetary gearsets, it is contemplated that compound planetary gearsets may be included in some embodiments. Fourth planetary gearset 314 is a compound planetary gearset including two sun gears, sun gear 350 and sun gear 360 and a stepped planet gear 353 having a first end with a first set of gear teeth, referred to herein as stepped planet gear first gear 354 and a second end with a second set of gear teeth, referred to herein as stepped planet gear second gear 364. In the illustrated embodiment, stepped planet gear first gear 354 has a larger diameter than stepped planet gear second gear 364. In other embodiments, stepped planet gear first gear 354 has a smaller diameter than stepped planet gear second gear 364.

First planetary gearset 308 includes a sun gear 320, a planet carrier 322 supporting a plurality of planet gears 324, and a ring gear 326. Second planetary gearset 310 includes a sun gear 330, a planet carrier 332 supporting a plurality of planet gears 334, and a ring gear 336. Third planetary gearset 312 includes a sun gear 340, a planet carrier 342 supporting a plurality of planet gears 344, and a ring gear 346. Fourth planetary gearset 314 includes a pair of sun gears, sun gear 350 and sun gear 360, a planet carrier 352 supporting a plurality of stepped planet gears 353, and a ring gear 356. Sun gear 350 intermeshes with stepped planet gear first gear 354 of stepped planet gear 353 while sun gear 360 intermeshes with stepped planet gear second gear 364 of stepped planet gear 353. Ring gear 356 intermeshes with stepped planet gear first gear 354 of stepped planet gear 353. Stepped planet gear second gear 364 of stepped planet gear 353 does not intermesh with a ring gear.

Multi-speed transmission 300 further includes a plurality of selective couplers, illustratively a first selective coupler 370, a second selective coupler 372, a third selective coupler 374, a fourth selective coupler 376, a fifth selective coupler 378, a sixth selective coupler 380, and a seventh selective coupler 382. In the illustrated embodiment, first selective coupler 370 and second selective coupler 372 are clutches and third selective coupler 374, fourth selective coupler 376, fifth selective coupler 378, sixth selective coupler 380, and seventh selective coupler 382 are brakes. The axial locations of the clutches and brakes relative to the plurality of planetary gearsets may be altered from the illustrated axial locations. In alternative embodiments, any number of clutches and brakes may be used.

Multi-speed transmission 300 includes several components that are illustratively shown as being fixedly coupled together. Input member 302 is fixedly coupled to sun gear 320 of first planetary gearset 308. Output member 304 is fixedly coupled to planet carrier 342 of third planetary gearset 312 and sun gear 350 of fourth planetary gearset 314. Sun gear 330 of second planetary gearset 310 is fixedly coupled to sun gear 340 of third planetary gearset 312. Planet carrier 322 of first planetary gearset 308 is fixedly coupled to ring gear 336 of second planetary gearset 310. Ring gear 346 of third planetary gearset 312, planet carrier

332 of second planetary gearset 310, and planet carrier 352 of fourth planetary gearset 314 are fixedly coupled together. In alternative embodiments, one or more of the components fixedly coupled together are selectively coupled together through one or more selective couplers.

Multi-speed transmission 300 may be described as having eight interconnectors. Input member 302 is a first interconnector that both provides input torque to multi-speed transmission 300 and is fixedly coupled to sun gear 320 of first planetary gearset 308. Input member 302 is further fixedly connected to first selective coupler 370 and second selective coupler 372. Output member 304 is a second interconnector that both provides output torque from multi-speed transmission 300 and fixedly couples planet carrier 342 of third planetary gearset 312 and sun gear 350 of fourth planetary gearset 314. A third interconnector 390 fixedly couples ring gear 346 of third planetary gearset 312, planet carrier 332 of second planetary gearset 310, and planet carrier 352 of fourth planetary gearset 314. Third interconnector 390 is further fixedly coupled to second selective coupler 372 and fifth selective coupler 378. A fourth interconnector 392 fixedly couples planet carrier 322 of the first planetary gearset 308 to ring gear 336 of the second planetary gearset 310 together. Fourth interconnector 392 is further fixedly coupled to fourth selective coupler 376. A fifth interconnector 394 fixedly couples sun gear 330 of second planetary gearset 310 and sun gear 340 of third planetary gearset 312 together. Fifth interconnector 394 is further fixedly coupled to first selective coupler 370. A sixth interconnector 396 fixedly couples ring gear 326 of first planetary gearset 308 to third selective coupler 374. A seventh interconnector 398 fixedly couples ring gear 356 of fourth planetary gearset 314 to sixth selective coupler 380. An eighth interconnector 399 fixedly couples sun gear 360 of fourth planetary gearset 314 to seventh selective coupler 382.

Multi-speed transmission 300 further includes several components that are illustratively shown as being selectively coupled together through selective couplers. First selective coupler 370, when engaged, fixedly couples sun gear 320 of the first planetary gearset 308 to sun gear 330 of the second planetary gearset 310 and sun gear 340 of the third planetary gearset 312. When first selective coupler 370 is disengaged, sun gear 320 of the first planetary gearset 308 may rotate relative to sun gear 330 of the second planetary gearset 310 and sun gear 340 of the third planetary gearset 312.

Second selective coupler 372, when engaged, fixedly couples sun gear 320 of the first planetary gearset 308 to planet carrier 332 of second planetary gearset 310, ring gear 346 of the third planetary gearset 312 and planet carrier 352 of fourth planetary gearset 314. When second selective coupler 372 is disengaged, sun gear 320 of the first planetary gearset 308 may rotate relative to planet carrier 332 of second planetary gearset 310, ring gear 346 of the third planetary gearset 312 and planet carrier 352 of fourth planetary gearset 314.

Third selective coupler 374, when engaged, fixedly couples ring gear 326 of the first planetary gearset 308 to stationary member 306. When third selective coupler 374 is disengaged, ring gear 326 of the first planetary gearset 308 may rotate relative to stationary member 306.

Fourth selective coupler 376, when engaged, fixedly couples planet carrier 322 of the first planetary gearset 308 and ring gear 336 of the second planetary gearset 310 to stationary member 306. When fourth selective coupler 376 is disengaged, planet carrier 322 of the first planetary gearset 308 and ring gear 336 of the second planetary gearset 310 may rotate relative to stationary member 306.

Fifth selective coupler 378, when engaged, fixedly couples planet carrier 332 of second planetary gearset 310, ring gear 346 of the third planetary gearset 312 and planet carrier 352 of fourth planetary gearset 314 to stationary member 306. When fifth selective coupler 378 is disengaged, planet carrier 332 of second planetary gearset 310, ring gear 346 of the third planetary gearset 312 and planet carrier 352 of fourth planetary gearset 314 may rotate relative to stationary member 306.

Sixth selective coupler 380, when engaged, fixedly couples ring gear 356 of fourth planetary gearset 314 to stationary member 306. When sixth selective coupler 380 is disengaged, ring gear 356 of fourth planetary gearset 314 may rotate relative to stationary member 306.

Seventh selective coupler 382, when engaged, fixedly couples sun gear 360 of fourth planetary gearset 314 to stationary member 306. When seventh selective coupler 382 is disengaged, sun gear 360 of fourth planetary gearset 314 may rotate relative to stationary member 306.

By engaging various combinations of first selective coupler 370, second selective coupler 372, third selective coupler 374, fourth selective coupler 376, fifth selective coupler 378, sixth selective coupler 380, and seventh selective coupler 382, additional components of multi-speed transmission 300 may be fixedly coupled together.

Figure 6:
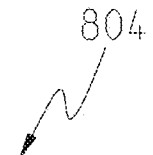
FIG. 6 is a truth table illustrating the selective engagement of the seven selective couplers of FIG. 5 to provide a plurality of forward and reverse gear or speed ratios of the multi-speed transmission of FIG. 5.

The plurality of planetary gearsets and the plurality of selective couplers of multi-speed transmission 300 may be interconnected in various arrangements to provide torque from input member 302 to output member 304. Referring to FIG. 6, an exemplary shift table 804 is shown that provides the state of each of first selective coupler 370, second selective coupler 372, third selective coupler 374, fourth selective coupler 376, fifth selective coupler 378, sixth selective coupler 380, and seventh selective coupler 382 for nine different forward gear or speed ratios (F1-F9) and four reverse gear or speed ratios (R1-R4). Each row corresponds to a given interconnection arrangement for transmission 300. The first column provides the gear range (R2 being a higher ratio or gear than R1 for reverse gears and F2 being a higher ratio or gear than F1 for forward gears). The second column provides the gear ratio between the input member 302 and the output member 304. The third column provides the gear step. The seven rightmost columns illustrate which ones of the selective couplers 370-382 are engaged ("X" indicates engaged) and which ones of selective couplers 370-382 are disengaged ("(blank)" indicates disengaged). FIG. 6 is only one example of any number of truth tables possible for achieving a plurality of forward ratios and a plurality of reverse ratios.

In one embodiment, to place multi-speed transmission 300 in neutral (Neu), all of first selective coupler 370, second selective coupler 372, third selective coupler 374, fourth selective coupler 376, fifth selective coupler 378, sixth selective coupler 380, and seventh selective coupler 382 are in the disengaged configuration. One or more of first selective coupler 370, second selective coupler 372, third selective coupler 374, fourth selective coupler 376, fifth selective coupler 378, sixth selective coupler 380, and seventh selective coupler 382 may remain engaged in neutral (Neu) as long as the combination of first selective coupler 370, second selective coupler 372, third selective coupler 374, fourth selective coupler 376, fifth selective coupler 378, sixth selective coupler 380, and seventh selective coupler 382 does not transmit torque from input member 302 to output member 304.

A first forward ratio (shown as F1) in shift table 804 of FIG. 6 is achieved by having first selective coupler 370 and seventh selective coupler 382 in an engaged configuration and second selective coupler 372, third selective coupler 374, fourth selective coupler 376, fifth selective coupler 378, and sixth selective coupler 380 in a disengaged configuration.

A second or subsequent forward ratio (shown as F2) in shift table 804 of FIG. 6 is achieved by having first selective coupler 370 and fifth selective coupler 378 in an engaged configuration and second selective coupler 372, third selective coupler 374, fourth selective coupler 376, sixth selective coupler 380, and seventh selective coupler 382 in a disengaged configuration. Therefore, when transitioning between the first forward ratio and the second forward ratio, seventh selective coupler 382 is placed in the disengaged configuration and fifth selective coupler 378 is placed in the engaged configuration.

A third or subsequent forward ratio (shown as F3) in shift table 804 of FIG. 6 is achieved by having first selective coupler 370 and sixth selective coupler 380 in an engaged configuration and second selective coupler 372, third selective coupler 374, fourth selective coupler 376, fifth selective coupler 378, and seventh selective coupler 382 in a disengaged configuration. Therefore, when transitioning between the second forward ratio and the third forward ratio, fifth selective coupler 378 is placed in the disengaged configuration and sixth selective coupler 380 is placed in the engaged configuration.

A fourth or subsequent forward ratio (shown as F4) in shift table 804 of FIG. 6 is achieved by having first selective coupler 370 and fourth selective coupler 376 in an engaged configuration and second selective coupler 372, third selective coupler 374, fifth selective coupler 378, sixth selective coupler 380, and seventh selective coupler 382 in a disengaged configuration. Therefore, when transitioning between the third forward ratio and the fourth forward ratio, sixth selective coupler 380 is placed in the disengaged configuration and fourth selective coupler 376 is placed in the engaged configuration.

A fifth or subsequent forward ratio (shown as F5) in shift table 804 of FIG. 6 is achieved by having first selective coupler 370 and third selective coupler 374 in an engaged configuration and second selective coupler 372, fourth selective coupler 376, fifth selective coupler 378, sixth selective coupler 380, and seventh selective coupler 382 in a disengaged configuration. Therefore, when transitioning between the fourth forward ratio and the fifth forward ratio, fourth selective coupler 376 is placed in the disengaged configuration and third selective coupler 374 is placed in the engaged configuration.

A sixth or subsequent forward ratio (shown as F6) in shift table 804 of FIG. 6 is achieved by having first selective coupler 370 and second selective coupler 372 in an engaged configuration and third selective coupler 374, fourth selective coupler 376, fifth selective coupler 378, sixth selective coupler 380, and seventh selective coupler 382 in a disengaged configuration. Therefore, when transitioning between the fifth forward ratio and the sixth forward ratio, third selective coupler 374 is placed in the disengaged configuration and second selective coupler 372 is placed in the engaged configuration.

A seventh or subsequent forward ratio (shown as F7) in shift table 804 of FIG. 6 is achieved by having second selective coupler 372 and third selective coupler 374 in an engaged configuration and first selective coupler 370, fourth selective coupler 376, fifth selective coupler 378, sixth selective coupler 380, and seventh selective coupler 382 in a disengaged configuration. Therefore, when transitioning between the sixth forward ratio and the seventh forward ratio, first selective coupler 370 is placed in the disengaged configuration and third selective coupler 374 is placed in the engaged configuration.

An eighth or subsequent forward ratio (shown as F8) in shift table 804 of FIG. 6 is achieved by having second selective coupler 372 and fourth selective coupler 376 in an engaged configuration and first selective coupler 370, third selective coupler 374, fifth selective coupler 378, sixth selective coupler 380, and seventh selective coupler 382 in a disengaged configuration. Therefore, when transitioning between the seventh forward ratio and the eighth forward ratio, third selective coupler 374 is placed in the disengaged configuration and fourth selective coupler 376 is placed in the engaged configuration.

A ninth or subsequent forward ratio (shown as F9) in shift table 804 of FIG. 6 is achieved by having second selective coupler 372 and sixth selective coupler 380 in an engaged configuration and first selective coupler 370, third selective coupler 374, fourth selective coupler 376, fifth selective coupler 378, and seventh selective coupler 382 in a disengaged configuration. Therefore, when transitioning between the eighth forward ratio and the ninth forward ratio, fourth selective coupler 376 is placed in the disengaged configuration and sixth selective coupler 380 is placed in the engaged configuration.

A first reverse ratio (shown as R1) in shift table 804 of FIG. 6 is achieved by having third selective coupler 374 and seventh selective coupler 382 in an engaged configuration and first selective coupler 370, second selective coupler 372, fourth selective coupler 376, fifth selective coupler 378, and sixth selective coupler 380 in a disengaged configuration.

A second or subsequent reverse ratio (shown as R2) in shift table 804 of FIG. 6 is achieved by having third selective coupler 374 and fifth selective coupler 378 in an engaged configuration and first selective coupler 370, second selective coupler 372, fourth selective coupler 376, sixth selective coupler 380, and seventh selective coupler 382 in a disengaged configuration. Therefore, when transitioning between the first reverse ratio and the second reverse ratio, seventh selective coupler 382 is placed in the disengaged configuration and fifth selective coupler 378 is placed in the engaged configuration.

A third or subsequent reverse ratio (shown as R3) in shift table 804 of FIG. 6 is achieved by having third selective coupler 374 and sixth selective coupler 380 in an engaged configuration and first selective coupler 370, second selective coupler 372, fourth selective coupler 376, fifth selective coupler 378, and seventh selective coupler 382 in a disengaged configuration. Therefore, when transitioning between the second reverse ratio and the third reverse ratio, fifth selective coupler 378 is placed in the disengaged configuration and sixth selective coupler 380 is placed in the engaged configuration.

A fourth or subsequent reverse ratio (shown as R4) in shift table 804 of FIG. 6 is achieved by having second selective coupler 372 and seventh selective coupler 382 in an engaged configuration and first selective coupler 370, third selective coupler 374, fourth selective coupler 376, fifth selective coupler 378, and sixth selective coupler 380 in a disengaged configuration. Therefore, when transitioning between the third reverse ratio and the fourth reverse ratio, third selective coupler 374 and sixth selective coupler 380 are placed in the disengaged configuration and second selective coupler 372 and seventh selective coupler 382 are placed in the engaged configuration.

The present disclosure contemplates that downshifts follow the reverse sequence of the corresponding upshift (as described above). Further, several power-on skip-shifts that are single-transition are possible (e.g. from F1 up to F3, from F3 down to F1, from F3 up to F5, and from F5 down to F3).

In the illustrated embodiments, various combinations of two of the available selective couplers are engaged for each of the illustrated forward speed ratios and reverse speed ratios. Additional forward speed ratios and reverse speed ratios are possible based on other combinations of engaged selective couplers. Although in the illustrated embodiments, each forward speed ratio and reverse speed ratio has two of the available selective couplers engaged, it is contemplated that more than two selective couplers may be engaged at the same time.

Figure 5A:
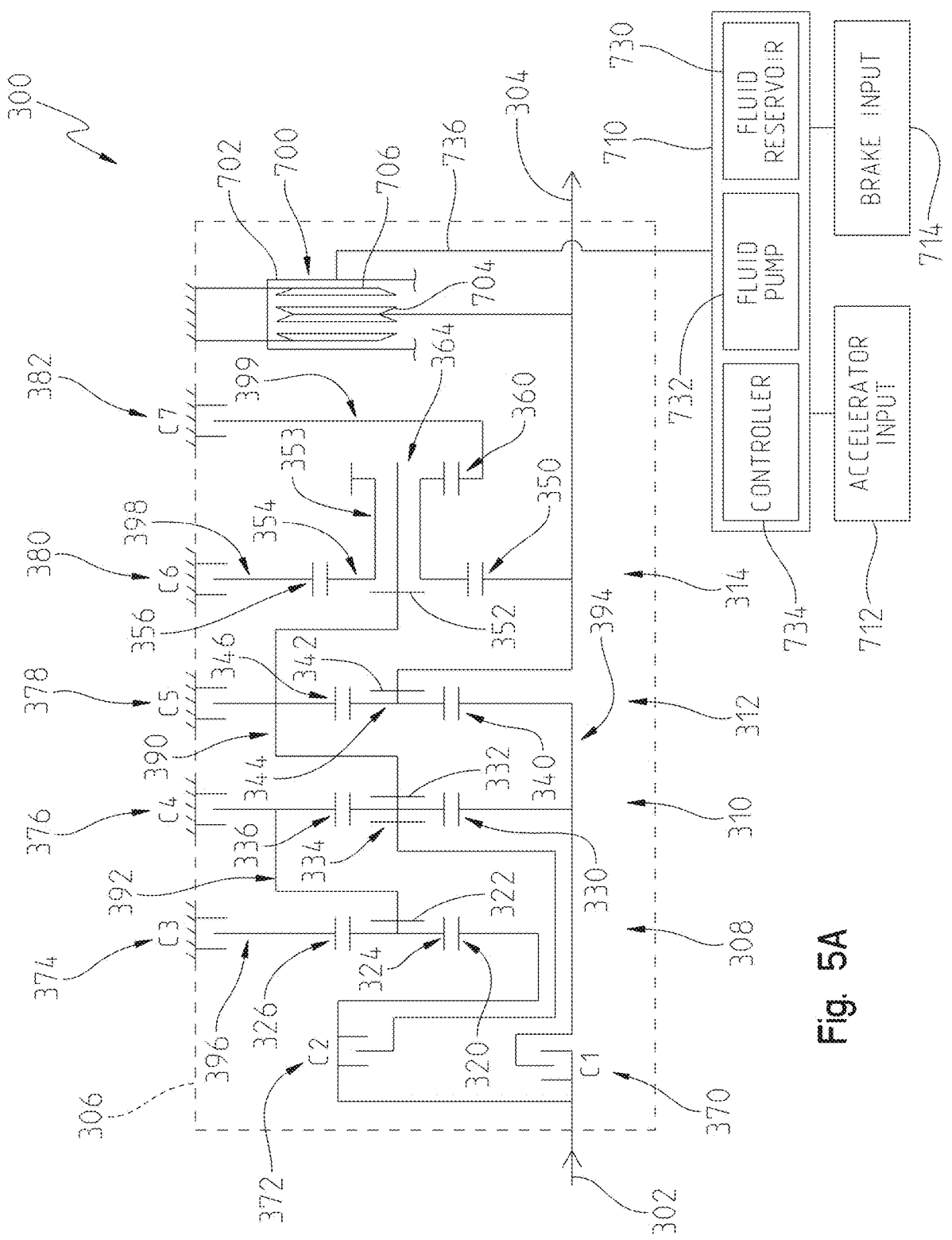
FIG. 5A is a diagrammatic view of the exemplary multi-speed transmission of FIG. 5 including a retarder.

Referring to FIG. 5A, multi-speed transmission 300 may further include a retarder 700. Retarder 700 includes a retarder housing 702 containing a rotor 704 and stator 706. Rotor 704 is fixedly coupled to output member 304 to rotate with output member 304. Stator 706 is fixedly coupled to stationary member 306. Thus, as output member 304 rotates rotor 704 rotates relative to stator 706.

Both of rotor 704 and stator 706 include vanes. Hydraulic fluid is provided to and removed from retarder housing 702 with a fluid control system 710. Fluid control system 710 includes a fluid reservoir 730, a pump 732, a controller 734, and at least one fluid conduit 736 in fluid communication with fluid reservoir 730, pump 732, and an interior of the retarder housing 702. As more fluid is provided to retarder housing 702, the rotation of rotor 704 is retarded due to the resistance of the fluid, such as oil, to be moved by the vanes of rotor 704 due to the stationary vanes of stator 706. In embodiments, in response to an operator of the vehicle including multi-speed transmission 300 removing their foot from the accelerator pedal, the accelerator input 712, the controller 734 of fluid control system 710 provides a first amount of fluid to retarder housing 702 which in turn retards the rotation of rotor 704 relative to stator 706 and hence retards output member 304 thereby slowing the vehicle including multi-speed transmission 300. Further, if the operator of the vehicle including multi-speed transmission 300 depresses the brake pedal, the brake input 714, controller 734 of fluid control system 710 provides a second amount of fluid to retarder housing 702, the second amount being higher than the first amount. The further increase in the amount of fluid further retards the rotation of rotor 704 relative to stator 706 and hence further retards output member 304 thereby slowing the vehicle including multi-speed transmission 300 faster.

Figure 7:
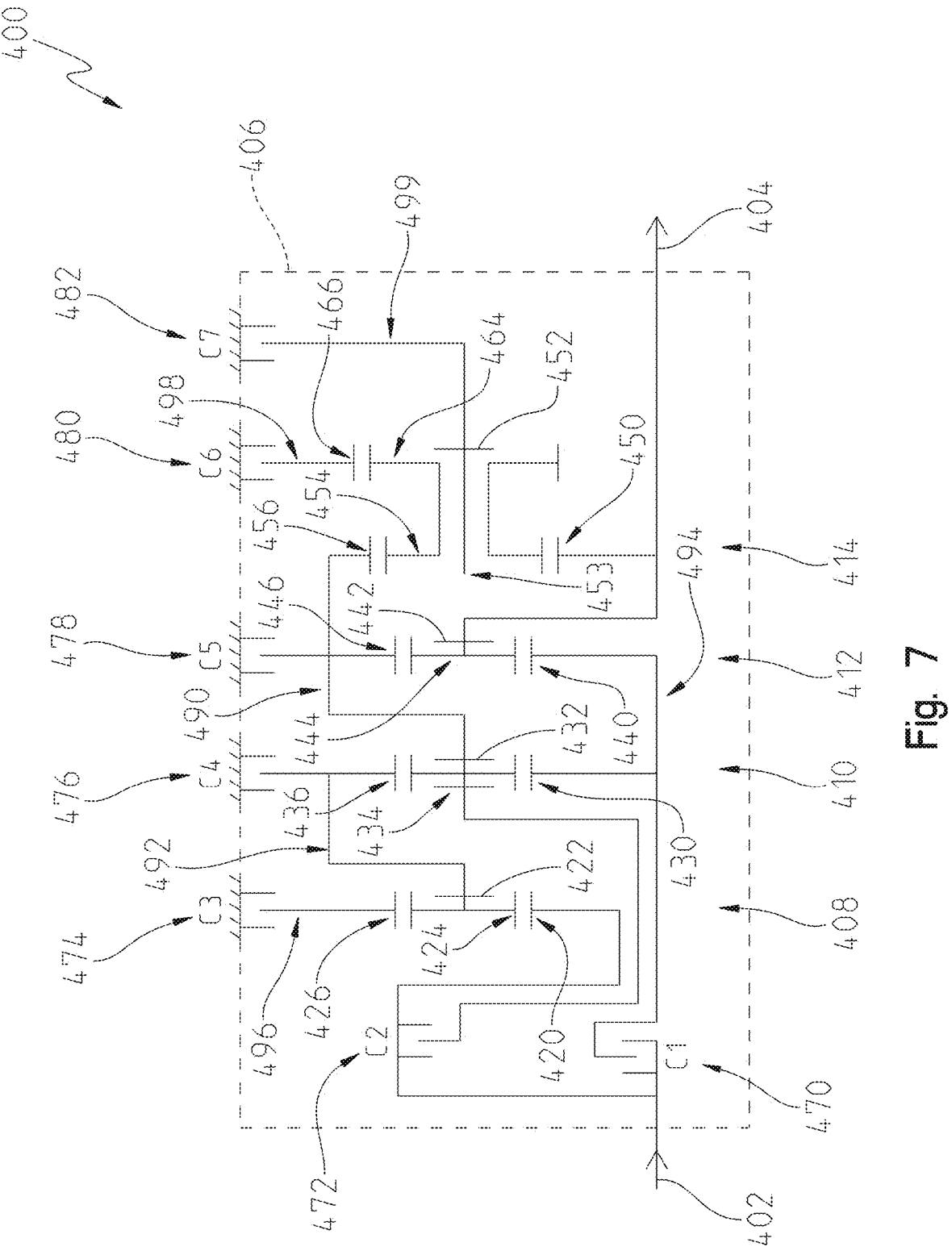
FIG. 7 is a diagrammatic view of an exemplary multi-speed transmission including five planetary gearsets and seven selective couplers.

FIG. 7 is a diagrammatic representation of a multi-speed transmission 400. Multi-speed transmission 400 includes an input member 402 and an output member 404. Each of input member 402 and output member 404 is rotatable relative to at least one stationary member 406. An exemplary input member 402 is an input shaft or other suitable rotatable component which is accessible from a first end of stationary member 406 so that a drive component, such as an output of a prime mover 820 (see FIG. 13) or a rotatable component operatively coupled to an output of a prime mover 820 (see FIG. 13), may be coupled thereto. An exemplary output member 404 is an output shaft or other suitable rotatable component which is accessible from a second end of stationary member 406 so that a driven component, such as an output shaft, a differential, a pump, one or more ground engaging members, may be coupled thereto.

Multi-speed transmission 400 includes a plurality of planetary gearsets, illustratively a first planetary gearset 408, a second planetary gearset 410, a third planetary gearset 412, and a fourth planetary gearset 414. In one embodiment, additional planetary gearsets may be included. Further, although first planetary gearset 408, second planetary gearset 410, third planetary gearset 412, are illustrated as simple planetary gearsets, it is contemplated that compound planetary gearsets may be included in some embodiments. Fourth planetary gearset 414 is a compound planetary gearset including sun gear 450, and a pair of ring gears, ring gear 456 and ring gear 466. Fourth planetary gearset 414 further includes a stepped planet gear 453 having a first end with a first set of gear teeth, referred to herein as stepped planet gear first gear 454 and a second end with a second set of gear teeth, referred to herein as stepped planet gear second gear 464. In the illustrated embodiment, stepped planet gear second gear 464 has a larger diameter than stepped planet gear first gear 454. In other embodiments, stepped planet gear second gear 464 has a smaller diameter than stepped planet gear first gear 454.

First planetary gearset 408 includes a sun gear 420, a planet carrier 422 supporting a plurality of planet gears 424, and a ring gear 426. Second planetary gearset 410 includes a sun gear 430, a planet carrier 432 supporting a plurality of planet gears 434, and a ring gear 436. Third planetary gearset 412 includes a sun gear 440, a planet carrier 442 supporting a plurality of planet gears 444, and a ring gear 446. Fourth planetary gearset 414 includes sun gear 450, a pair of ring gears, ring gear 456 and ring gear 466, and a planet carrier 452 supporting a plurality of stepped planet gears 453. Sun gear 450 intermeshes with stepped planet gear first gear 454 of stepped planet gear 453. Ring gear 456 intermeshes with stepped planet gear first gear 454 of stepped planet gear 453 and ring gear 466 intermeshes with stepped planet gear second gear 464 of stepped planet gear 453. Stepped planet gear second gear 464 of stepped planet gear 453 does not intermesh with a sun gear.

Multi-speed transmission 400 further includes a plurality of selective couplers, illustratively a first selective coupler 470, a second selective coupler 472, a third selective coupler 474, a fourth selective coupler 476, a fifth selective coupler 478, a sixth selective coupler 480, and a seventh selective coupler 482. In the illustrated embodiment, first selective coupler 470 and second selective coupler 472 are clutches and third selective coupler 474, fourth selective coupler 476, fifth selective coupler 478, sixth selective coupler 480, and seventh selective coupler 482 are brakes. The axial locations of the clutches and brakes relative to the plurality of planetary gearsets may be altered from the illustrated axial locations. In alternative embodiments, any number of clutches and brakes may be used.

Multi-speed transmission 400 includes several components that are illustratively shown as being fixedly coupled together. Input member 402 is fixedly coupled to sun gear 420 of first planetary gearset 408. Output member 404 is fixedly coupled to planet carrier 442 of third planetary gearset 412 and sun gear 450 of fourth planetary gearset 414. Sun gear 430 of second planetary gearset 410 is fixedly coupled to sun gear 440 of third planetary gearset 412. Planet carrier 422 of first planetary gearset 408 is fixedly coupled to ring gear 436 of second planetary gearset 410. Ring gear 446 of third planetary gearset 412, planet carrier 432 of second planetary gearset 410, and ring gear 456 of fourth planetary gearset 414 are fixedly coupled together. In alternative embodiments, one or more of the components fixedly coupled together are selectively coupled together through one or more selective couplers.

Multi-speed transmission 400 may be described as having eight interconnectors. Input member 402 is a first interconnector that both provides input torque to multi-speed transmission 400 and is fixedly coupled to sun gear 420 of first planetary gearset 408. Input member 402 is further fixedly connected to first selective coupler 470 and second selective coupler 472. Output member 404 is a second interconnector that both provides output torque from multi-speed transmission 400 and fixedly couples planet carrier 442 of third planetary gearset 412 and sun gear 450 of fourth planetary gearset 414. A third interconnector 490 fixedly couples ring gear 446 of third planetary gearset 412, planet carrier 432 of second planetary gearset 410, and ring gear 456 of fourth planetary gearset 414. Third interconnector 490 is further fixedly coupled to second selective coupler 472 and fifth selective coupler 478. A fourth interconnector 492 fixedly couples planet carrier 422 of the first planetary gearset 408 to ring gear 436 of the second planetary gearset 410 together. Fourth interconnector 492 is further fixedly coupled to fourth selective coupler 476. A fifth interconnector 494 fixedly couples sun gear 430 of second planetary gearset 410 and sun gear 440 of third planetary gearset 412 together. Fifth interconnector 494 is further fixedly coupled to first selective coupler 470. A sixth interconnector 496 fixedly couples ring gear 426 of first planetary gearset 408 to third selective coupler 474. A seventh interconnector 498 fixedly couples ring gear 466 of fourth planetary gearset 414 to sixth selective coupler 480. An eighth interconnector 499 fixedly couples planet carrier 452 of fourth planetary gearset 414 to seventh selective coupler 482.

Multi-speed transmission 400 further includes several components that are illustratively shown as being selectively coupled together through selective couplers. First selective coupler 470, when engaged, fixedly couples sun gear 420 of the first planetary gearset 408 to sun gear 430 of the second planetary gearset 410 and sun gear 440 of the third planetary gearset 412. When first selective coupler 470 is disengaged, sun gear 420 of the first planetary gearset 408 may rotate relative to sun gear 430 of the second planetary gearset 410 and sun gear 440 of the third planetary gearset 412.

Second selective coupler 472, when engaged, fixedly couples sun gear 420 of the first planetary gearset 408 to planet carrier 432 of second planetary gearset 410, ring gear 446 of the third planetary gearset 412 and ring gear 456 of fourth planetary gearset 414. When second selective coupler 472 is disengaged, sun gear 420 of the first planetary gearset 408 may rotate relative to planet carrier 432 of second planetary gearset 410, ring gear 446 of the third planetary gearset 412 and ring gear 456 of fourth planetary gearset 414.

Third selective coupler 474, when engaged, fixedly couples ring gear 426 of the first planetary gearset 408 to stationary member 406. When third selective coupler 474 is disengaged, ring gear 426 of the first planetary gearset 408 may rotate relative to stationary member 406.

Fourth selective coupler 476, when engaged, fixedly couples planet carrier 422 of the first planetary gearset 408 and ring gear 436 of the second planetary gearset 410 to stationary member 406. When fourth selective coupler 476 is disengaged, planet carrier 422 of the first planetary gearset 408 and ring gear 436 of the second planetary gearset 410 may rotate relative to stationary member 406.

Fifth selective coupler 478, when engaged, fixedly couples planet carrier 432 of second planetary gearset 410, ring gear 446 of the third planetary gearset 412 and ring gear 456 of fourth planetary gearset 414 to stationary member 406. When fifth selective coupler 478 is disengaged, planet carrier 432 of second planetary gearset 410, ring gear 446 of the third planetary gearset 412 and ring gear 456 of fourth planetary gearset 414 may rotate relative to stationary member 406.

Sixth selective coupler 480, when engaged, fixedly couples ring gear 466 of fourth planetary gearset 414 to stationary member 406. When sixth selective coupler 480 is disengaged, ring gear 466 of fourth planetary gearset 414 may rotate relative to stationary member 406.

Seventh selective coupler 482, when engaged, fixedly couples planet carrier 452 of fourth planetary gearset 414 to stationary member 406. When seventh selective coupler 482 is disengaged, planet carrier 452 of fourth planetary gearset 414 may rotate relative to stationary member 406.

By engaging various combinations of first selective coupler 470, second selective coupler 472, third selective coupler 474, fourth selective coupler 476, fifth selective coupler 478, sixth selective coupler 480, and seventh selective coupler 482, additional components of multi-speed transmission 400 may be fixedly coupled together.

Figure 8:
FIG. 8 is a truth table illustrating the selective engagement of the seven selective couplers of FIG. 7 to provide a plurality of forward and reverse gear or speed ratios of the multi-speed transmission of FIG. 7.

The plurality of planetary gearsets and the plurality of selective couplers of multi-speed transmission 400 may be interconnected in various arrangements to provide torque from input member 402 to output member 404. Referring to FIG. 8, an exemplary shift table 806 is shown that provides the state of each of first selective coupler 470, second selective coupler 472, third selective coupler 474, fourth selective coupler 476, fifth selective coupler 478, sixth selective coupler 480, and seventh selective coupler 482 for nine different forward gear or speed ratios (F1-F9) and four reverse gear or speed ratios (R1-R4). Each row corresponds to a given interconnection arrangement for transmission 400. The first column provides the gear range (R2 being a higher ratio or gear than R1 for reverse gears and F2 being a higher ratio or gear than F1 for forward gears). The second column provides the gear ratio between the input member 402 and the output member 404. The third column provides the gear step. The seven rightmost columns illustrate which ones of the selective couplers 470-482 are engaged ("X" indicates engaged) and which ones of selective couplers 470-482 are disengaged ("(blank)" indicates disengaged). FIG. 8 is only one example of any number of truth tables possible for achieving a plurality of forward ratios and a plurality of reverse ratios.

In one embodiment, to place multi-speed transmission 400 in neutral (Neu), all of first selective coupler 470, second selective coupler 472, third selective coupler 474, fourth selective coupler 476, fifth selective coupler 478, sixth selective coupler 480, and seventh selective coupler 482 are in the disengaged configuration. One or more of first selective coupler 470, second selective coupler 472, third selective coupler 474, fourth selective coupler 476, fifth selective coupler 478, sixth selective coupler 480, and seventh selective coupler 482 may remain engaged in neutral (Neu) as long as the combination of first selective coupler 470, second selective coupler 472, third selective coupler 474, fourth selective coupler 476, fifth selective coupler 478, sixth selective coupler 480, and seventh selective coupler 482 does not transmit torque from input member 402 to output member 404.

A first forward ratio (shown as F1) in shift table 806 of FIG. 8 is achieved by having first selective coupler 470 and sixth selective coupler 480 in an engaged configuration and second selective coupler 472, third selective coupler 474, fourth selective coupler 476, fifth selective coupler 478, and seventh selective coupler 482 in a disengaged configuration.

A second or subsequent forward ratio (shown as F2) in shift table 806 of FIG. 8 is achieved by having first selective coupler 470 and fifth selective coupler 478 in an engaged configuration and second selective coupler 472, third selective coupler 474, fourth selective coupler 476, sixth selective coupler 480, and seventh selective coupler 482 in a disengaged configuration. Therefore, when transitioning between the first forward ratio and the second forward ratio, sixth selective coupler 480 is placed in the disengaged configuration and fifth selective coupler 478 is placed in the engaged configuration.

A third or subsequent forward ratio (shown as F3) in shift table 806 of FIG. 8 is achieved by having first selective coupler 470 and seventh selective coupler 482 in an engaged configuration and second selective coupler 472, third selective coupler 474, fourth selective coupler 476, fifth selective coupler 478, and sixth selective coupler 480 in a disengaged configuration. Therefore, when transitioning between the second forward ratio and the third forward ratio, fifth selective coupler 478 is placed in the disengaged configuration and seventh selective coupler 482 is placed in the engaged configuration.

A fourth or subsequent forward ratio (shown as F4) in shift table 806 of FIG. 8 is achieved by having first selective coupler 470 and fourth selective coupler 476 in an engaged configuration and second selective coupler 472, third selective coupler 474, fifth selective coupler 478, sixth selective coupler 480, and seventh selective coupler 482 in a disengaged configuration. Therefore, when transitioning between the third forward ratio and the fourth forward ratio, seventh selective coupler 482 is placed in the disengaged configuration and fourth selective coupler 476 is placed in the engaged configuration.

A fifth or subsequent forward ratio (shown as F5) in shift table 806 of FIG. 8 is achieved by having first selective coupler 470 and third selective coupler 474 in an engaged configuration and second selective coupler 472, fourth selective coupler 476, fifth selective coupler 478, sixth selective coupler 480, and seventh selective coupler 482 in a disengaged configuration. Therefore, when transitioning between the fourth forward ratio and the fifth forward ratio, fourth selective coupler 476 is placed in the disengaged configuration and third selective coupler 474 is placed in the engaged configuration.

A sixth or subsequent forward ratio (shown as F6) in shift table 806 of FIG. 8 is achieved by having first selective coupler 470 and second selective coupler 472 in an engaged configuration and third selective coupler 474, fourth selective coupler 476, fifth selective coupler 478, sixth selective coupler 480, and seventh selective coupler 482 in a disengaged configuration. Therefore, when transitioning between the fifth forward ratio and the sixth forward ratio, third selective coupler 474 is placed in the disengaged configuration and second selective coupler 472 is placed in the engaged configuration.

A seventh or subsequent forward ratio (shown as F7) in shift table 806 of FIG. 8 is achieved by having second selective coupler 472 and third selective coupler 474 in an engaged configuration and first selective coupler 470, fourth selective coupler 476, fifth selective coupler 478, sixth selective coupler 480, and seventh selective coupler 482 in a disengaged configuration. Therefore, when transitioning between the sixth forward ratio and the seventh forward ratio, first selective coupler 470 is placed in the disengaged configuration and third selective coupler 474 is placed in the engaged configuration.

An eighth or subsequent forward ratio (shown as F8) in shift table 806 of FIG. 8 is achieved by having second selective coupler 472 and fourth selective coupler 476 in an engaged configuration and first selective coupler 470, third selective coupler 474, fifth selective coupler 478, sixth selective coupler 480, and seventh selective coupler 482 in a disengaged configuration. Therefore, when transitioning between the seventh forward ratio and the eighth forward ratio, third selective coupler 474 is placed in the disengaged configuration and fourth selective coupler 476 is placed in the engaged configuration.

A ninth or subsequent forward ratio (shown as F9) in shift table 806 of FIG. 8 is achieved by having second selective coupler 472 and seventh selective coupler 482 in an engaged configuration and first selective coupler 470, third selective coupler 474, fourth selective coupler 476, fifth selective coupler 478, and sixth selective coupler 480 in a disengaged configuration. Therefore, when transitioning between the eighth forward ratio and the ninth forward ratio, fourth selective coupler 476 is placed in the disengaged configuration and seventh selective coupler 482 is placed in the engaged configuration.

A first reverse ratio (shown as R1) in shift table 806 of FIG. 8 is achieved by having third selective coupler 474 and sixth selective coupler 480 in an engaged configuration and first selective coupler 470, second selective coupler 472, fourth selective coupler 476, fifth selective coupler 478, and seventh selective coupler 482 in a disengaged configuration.

A second or subsequent reverse ratio (shown as R2) in shift table 806 of FIG. 8 is achieved by having third selective coupler 474 and fifth selective coupler 478 in an engaged configuration and first selective coupler 470, second selective coupler 472, fourth selective coupler 476, sixth selective coupler 480, and seventh selective coupler 482 in a disengaged configuration. Therefore, when transitioning between the first reverse ratio and the second reverse ratio, seventh selective coupler 482 is placed in the disengaged configuration and fifth selective coupler 478 is placed in the engaged configuration.

A third or subsequent reverse ratio (shown as R3) in shift table 806 of FIG. 8 is achieved by having third selective coupler 474 and seventh selective coupler 482 in an engaged configuration and first selective coupler 470, second selective coupler 472, fourth selective coupler 476, fifth selective coupler 478, and sixth selective coupler 480 in a disengaged configuration. Therefore, when transitioning between the second reverse ratio and the third reverse ratio, fifth selective coupler 478 is placed in the disengaged configuration and seventh selective coupler 482 is placed in the engaged configuration.

A fourth or subsequent reverse ratio (shown as R4) in shift table 806 of FIG. 8 is achieved by having second selective coupler 472 and sixth selective coupler 480 in an engaged configuration and first selective coupler 470, third selective coupler 474, fourth selective coupler 476, fifth selective coupler 478, and seventh selective coupler 482 in a disengaged configuration. Therefore, when transitioning between the third reverse ratio and the fourth reverse ratio, third selective coupler 474 and seventh selective coupler 482 are placed in the disengaged configuration and second selective coupler 472 and sixth selective coupler 480 are placed in the engaged configuration.

The present disclosure contemplates that downshifts follow the reverse sequence of the corresponding upshift (as described above). Further, several power-on skip-shifts that are single-transition are possible (e.g. from F1 up to F3, from F3 down to F1, from F3 up to F5, and from F5 down to F3).

In the illustrated embodiments, various combinations of two of the available selective couplers are engaged for each of the illustrated forward speed ratios and reverse speed ratios. Additional forward speed ratios and reverse speed ratios are possible based on other combinations of engaged selective couplers. Although in the illustrated embodiments, each forward speed ratio and reverse speed ratio has two of the available selective couplers engaged, it is contemplated that more than two selective couplers may be engaged at the same time.

Figure 7A:
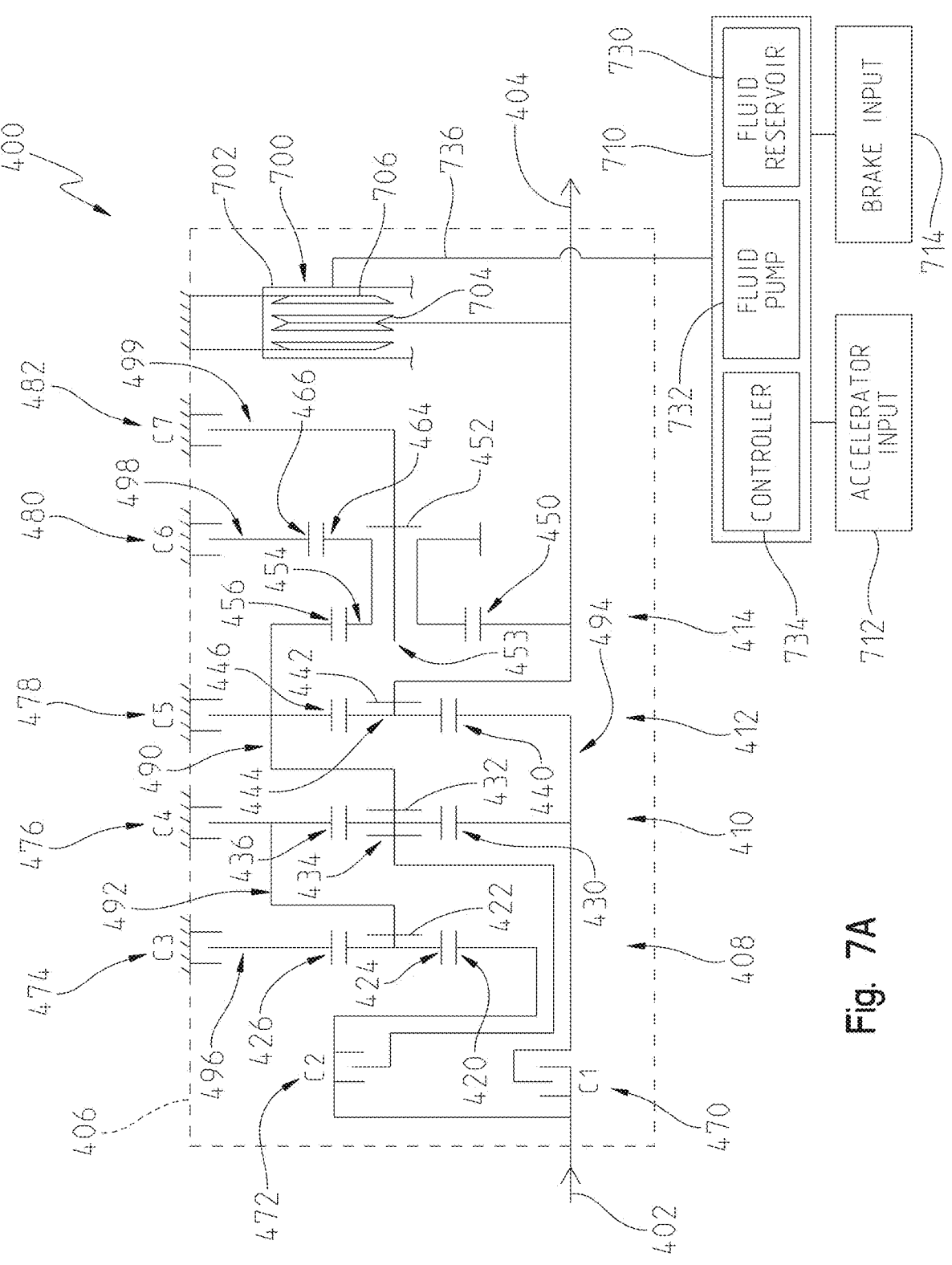
FIG. 7A is a diagrammatic view of the exemplary multi-speed transmission of FIG. 7 including a retarder.

Referring to FIG. 7A, multi-speed transmission 400 may further include a retarder 700. Retarder 700 includes a retarder housing 702 containing a rotor 704 and stator 706. Rotor 704 is fixedly coupled to output member 404 to rotate with output member 404. Stator 706 is fixedly coupled to stationary member 406. Thus, as output member 404 rotates rotor 704 rotates relative to stator 706.

Both of rotor 704 and stator 706 include vanes. Hydraulic fluid is provided to and removed from retarder housing 702 with a fluid control system 710. Fluid control system 710 includes a fluid reservoir 730, a pump 732, a controller 734, and at least one fluid conduit 736 in fluid communication with fluid reservoir 730, pump 732, and an interior of the retarder housing 702. As more fluid is provided to retarder housing 702, the rotation of rotor 704 is retarded due to the resistance of the fluid, such as oil, to be moved by the vanes of rotor 704 due to the stationary vanes of stator 706. In embodiments, in response to an operator of the vehicle including multi-speed transmission 400 removing their foot from the accelerator pedal, the accelerator input 712, the controller 734 of fluid control system 710 provides a first amount of fluid to retarder housing 702 which in turn retards the rotation of rotor 704 relative to stator 706 and hence retards output member 404 thereby slowing the vehicle including multi-speed transmission 100. Further, if the operator of the vehicle including multi-speed transmission 400 depresses the brake pedal, the brake input 714, controller 734 of fluid control system 710 provides a second amount of fluid to retarder housing 702, the second amount being higher than the first amount. The further increase in the amount of fluid further retards the rotation of rotor 704 relative to stator 706 and hence further retards output member 404 thereby slowing the vehicle including multi-speed transmission 100 faster.

Figure 9:
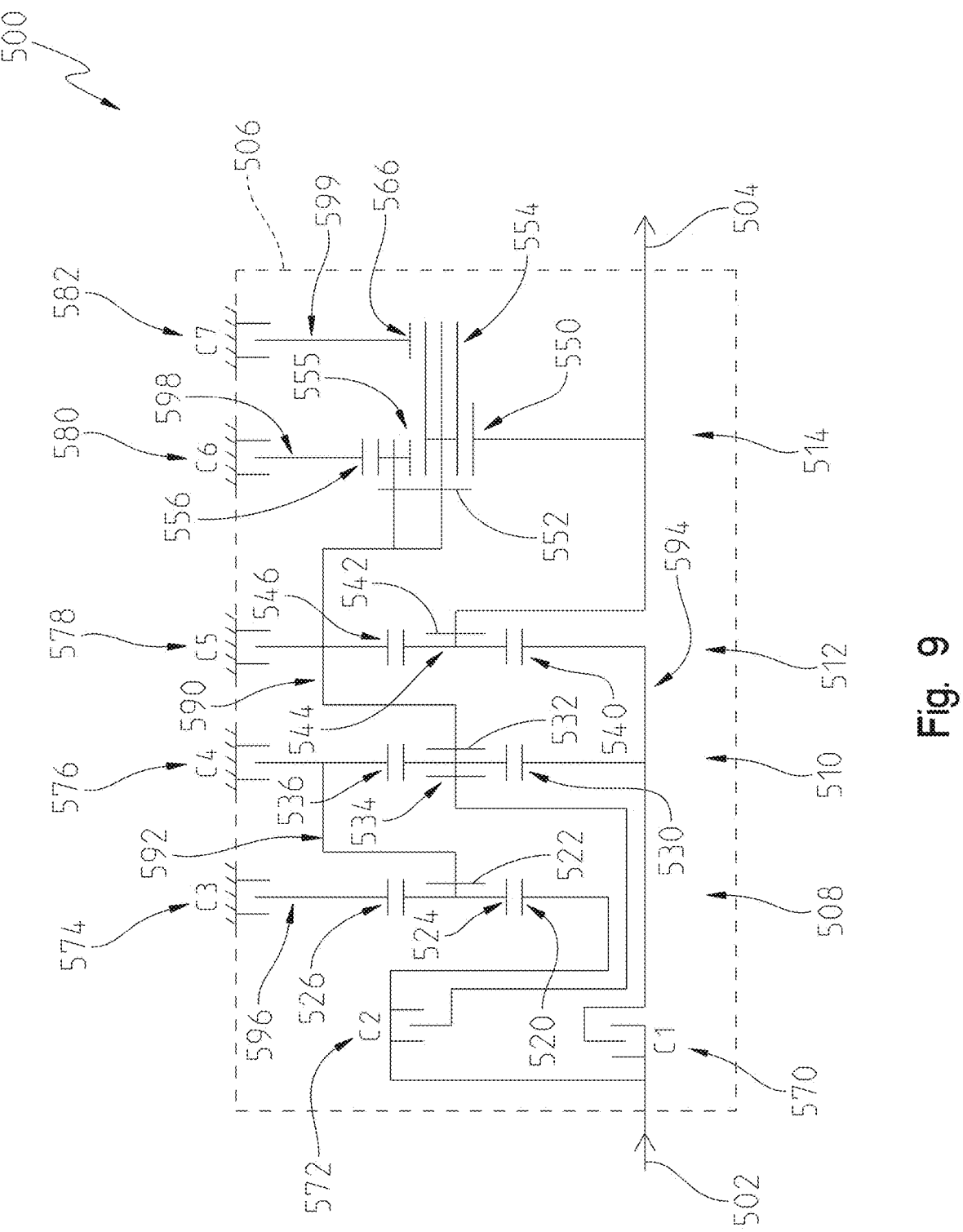
FIG. 9 is a diagrammatic view of an exemplary multi-speed transmission including five planetary gearsets and seven selective couplers.

FIG. 9 is a diagrammatic representation of a multi-speed transmission 500. Multi-speed transmission 500 includes an input member 502 and an output member 504. Each of input member 502 and output member 504 is rotatable relative to at least one stationary member 506. An exemplary input member 502 is an input shaft or other suitable rotatable component which is accessible from a first end of stationary member 506 so that a drive component, such as an output of a prime mover 820 (see FIG. 13) or a rotatable component operatively coupled to an output of a prime mover 820 (see FIG. 13), may be coupled thereto. An exemplary output member 504 is an output shaft or other suitable rotatable component which is accessible from a second end of stationary member 506 so that a driven component 822 (see FIG. 13), such as an output shaft, a differential, a pump, one or more ground engaging members, may be coupled thereto.

Multi-speed transmission 500 includes a plurality of planetary gearsets, illustratively a first planetary gearset 508, a second planetary gearset 510, a third planetary gearset 512, and a fourth planetary gearset 514. In one embodiment, additional planetary gearsets may be included. Further, although first planetary gearset 508, second planetary gearset 510, third planetary gearset 512, are illustrated as simple planetary gearsets, it is contemplated that compound planetary gearsets may be included in some embodiments.

First planetary gearset 508 includes a sun gear 520, a planet carrier 522 supporting a plurality of planet gears 524, and a ring gear 526. Second planetary gearset 510 includes a sun gear 530, a planet carrier 532 supporting a plurality of planet gears 534, and a ring gear 536. Third planetary gearset 512 includes a sun gear 540, a planet carrier 542 supporting a plurality of planet gears 544, and a ring gear 546. Fourth planetary gearset 514 is a compound planetary gearset including sun gear 550, and a pair of ring gears, ring gear 556 and ring gear 566. Fourth planetary gearset 514 further includes a planet carrier 552 carrying a first set of planet gears 554 and a second set of planet gears 555. Planet gears 554 are intermeshed with sun gear 550 and ring gear 566. Planet gears 555 are intermeshed with planet gears 554 and ring gear 556.

Multi-speed transmission 500 further includes a plurality of selective couplers, illustratively a first selective coupler 570, a second selective coupler 572, a third selective coupler 574, a fourth selective coupler 576, a fifth selective coupler 578, a sixth selective coupler 580, and a seventh selective coupler 582. In the illustrated embodiment, first selective coupler 570 and second selective coupler 572 are clutches and third selective coupler 574, fourth selective coupler 576, fifth selective coupler 578, sixth selective coupler 580, and seventh selective coupler 582 are brakes. The axial locations of the clutches and brakes relative to the plurality of planetary gearsets may be altered from the illustrated axial locations. In alternative embodiments, any number of clutches and brakes may be used.

Multi-speed transmission 500 includes several components that are illustratively shown as being fixedly coupled together. Input member 502 is fixedly coupled to sun gear 520 of first planetary gearset 508. Output member 504 is fixedly coupled to planet carrier 542 of third planetary gearset 512 and sun gear 550 of fourth planetary gearset 514. Sun gear 530 of second planetary gearset 510 is fixedly coupled to sun gear 540 of third planetary gearset 512. Planet carrier 522 of first planetary gearset 508 is fixedly coupled to ring gear 536 of second planetary gearset 510. Ring gear 546 of third planetary gearset 512, planet carrier 532 of second planetary gearset 510, and planet carrier 552 of fourth planetary gearset 514 are fixedly coupled together. In alternative embodiments, one or more of the components fixedly coupled together are selectively coupled together through one or more selective couplers.

Multi-speed transmission 500 may be described as having eight interconnectors. Input member 502 is a first interconnector that both provides input torque to multi-speed transmission 500 and is fixedly coupled to sun gear 520 of first planetary gearset 508. Input member 502 is further fixedly connected to first selective coupler 570 and second selective coupler 572. Output member 504 is a second interconnector that both provides output torque from multi-speed transmission 500 and fixedly couples planet carrier 542 of third planetary gearset 512 and sun gear 550 of fourth planetary gearset 514. A third interconnector 590 fixedly couples ring gear 546 of third planetary gearset 512, planet carrier 532 of second planetary gearset 510, and planet carrier 552 of fourth planetary gearset 514. Third interconnector 590 is further fixedly coupled to second selective coupler 572 and fifth selective coupler 578. A fourth interconnector 592 fixedly couples planet carrier 522 of the first planetary gearset 508 to ring gear 536 of the second planetary gearset 510 together. Fourth interconnector 592 is further fixedly coupled to fourth selective coupler 576. A fifth interconnector 594 fixedly couples sun gear 530 of second planetary gearset 510 and sun gear 540 of third planetary gearset 512 together. Fifth interconnector 594 is further fixedly coupled to first selective coupler 570. A sixth interconnector 596 fixedly couples ring gear 526 of first planetary gearset 508 to third selective coupler 574. A seventh interconnector 598 fixedly couples ring gear 556 of fourth planetary gearset 514 to sixth selective coupler 580. An eighth interconnector 599 fixedly couples ring gear 566 of fourth planetary gearset 514 to seventh selective coupler 582.

Multi-speed transmission 500 further includes several components that are illustratively shown as being selectively coupled together through selective couplers. First selective coupler 570, when engaged, fixedly couples sun gear 520 of the first planetary gearset 508 to sun gear 530 of the second planetary gearset 510 and sun gear 540 of the third planetary gearset 512. When first selective coupler 570 is disengaged, sun gear 520 of the first planetary gearset 508 may rotate relative to sun gear 530 of the second planetary gearset 510 and sun gear 540 of the third planetary gearset 512.

Second selective coupler 572, when engaged, fixedly couples sun gear 520 of the first planetary gearset 508 to planet carrier 532 of second planetary gearset 510, ring gear 546 of the third planetary gearset 512 and planet carrier 552 of fourth planetary gearset 514. When second selective coupler 572 is disengaged, sun gear 520 of the first planetary gearset 508 may rotate relative to planet carrier 532 of second planetary gearset 510, ring gear 546 of the third planetary gearset 512 and planet carrier 552 of fourth planetary gearset 514.

Third selective coupler 574, when engaged, fixedly couples ring gear 526 of the first planetary gearset 508 to stationary member 506. When third selective coupler 574 is disengaged, ring gear 526 of the first planetary gearset 508 may rotate relative to stationary member 506.

Fourth selective coupler 576, when engaged, fixedly couples planet carrier 522 of the first planetary gearset 508 and ring gear 536 of the second planetary gearset 510 to stationary member 506. When fourth selective coupler 576 is disengaged, planet carrier 522 of the first planetary gearset 508 and ring gear 536 of the second planetary gearset 510 may rotate relative to stationary member 506.

Fifth selective coupler 578, when engaged, fixedly couples planet carrier 532 of second planetary gearset 510, ring gear 546 of the third planetary gearset 512 and planet carrier 552 of fourth planetary gearset 514 to stationary member 506. When fifth selective coupler 578 is disengaged, planet carrier 532 of second planetary gearset 510, ring gear 546 of the third planetary gearset 512 and planet carrier 552 of fourth planetary gearset 514 may rotate relative to stationary member 506.

Sixth selective coupler 580, when engaged, fixedly couples ring gear 556 of fourth planetary gearset 514 to stationary member 506. When sixth selective coupler 580 is disengaged, ring gear 556 of fourth planetary gearset 514 may rotate relative to stationary member 506.

Seventh selective coupler 582, when engaged, fixedly couples ring gear 566 of fourth planetary gearset 514 to stationary member 506. When seventh selective coupler 582 is disengaged, ring gear 566 of fourth planetary gearset 514 may rotate relative to stationary member 506.

By engaging various combinations of first selective coupler 570, second selective coupler 572, third selective coupler 574, fourth selective coupler 576, fifth selective coupler 578, sixth selective coupler 580, and seventh selective coupler 582, additional components of multi-speed transmission 500 may be fixedly coupled together.

Figure 10:
FIG. 10 is a truth table illustrating the selective engagement of the seven selective couplers of FIG. 9 to provide a plurality of forward and reverse gear or speed ratios of the multi-speed transmission of FIG. 9.

The plurality of planetary gearsets and the plurality of selective couplers of multi-speed transmission 500 may be interconnected in various arrangements to provide torque from input member 502 to output member 504. Referring to FIG. 10, an exemplary shift table 808 is shown that provides the state of each of first selective coupler 570, second selective coupler 572, third selective coupler 574, fourth selective coupler 576, fifth selective coupler 578, sixth selective coupler 580, and seventh selective coupler 582 for nine different forward gear or speed ratios (F1-F9) and four reverse gear or speed ratios (R1-R4). Each row corresponds to a given interconnection arrangement for transmission 500. The first column provides the gear range (R2 being a higher ratio or gear than R1 for reverse gears and F2 being a higher ratio or gear than F1 for forward gears). The second column provides the gear ratio between the input member 502 and the output member 504. The third column provides the gear step. The seven rightmost columns illustrate which ones of the selective couplers 570-582 are engaged ("X" indicates engaged) and which ones of selective couplers 570-582 are disengaged ("(blank)" indicates disengaged). FIG. 10 is only one example of any number of truth tables possible for achieving a plurality of forward ratios and a plurality of reverse ratios.

In one embodiment, to place multi-speed transmission 500 in neutral (Neu), all of first selective coupler 570, second selective coupler 572, third selective coupler 574, fourth selective coupler 576, fifth selective coupler 578, sixth selective coupler 580, and seventh selective coupler 582 are in the disengaged configuration. One or more of first selective coupler 570, second selective coupler 572, third selective coupler 574, fourth selective coupler 576, fifth selective coupler 578, sixth selective coupler 580, and seventh selective coupler 582 may remain engaged in neutral (Neu) as long as the combination of first selective coupler 570, second selective coupler 572, third selective coupler 574, fourth selective coupler 576, fifth selective coupler 578, sixth selective coupler 580, and seventh selective coupler 582 does not transmit torque from input member 502 to output member 504.

A first forward ratio (shown as F1) in shift table 808 of FIG. 10 is achieved by having first selective coupler 570 and sixth selective coupler 580 in an engaged configuration and second selective coupler 572, third selective coupler 574, fourth selective coupler 576, fifth selective coupler 578, and seventh selective coupler 582 in a disengaged configuration.

A second or subsequent forward ratio (shown as F2) in shift table 808 of FIG. 10 is achieved by having first selective coupler 570 and fifth selective coupler 578 in an engaged configuration and second selective coupler 572, third selective coupler 574, fourth selective coupler 576, sixth selective coupler 580, and seventh selective coupler 582 in a disengaged configuration. Therefore, when transitioning between the first forward ratio and the second forward ratio, sixth selective coupler 580 is placed in the disengaged configuration and fifth selective coupler 578 is placed in the engaged configuration.

A third or subsequent forward ratio (shown as F3) in shift table 808 of FIG. 10 is achieved by having first selective coupler 570 and seventh selective coupler 582 in an engaged configuration and second selective coupler 572, third selective coupler 574, fourth selective coupler 576, fifth selective coupler 578, and sixth selective coupler 580 in a disengaged configuration. Therefore, when transitioning between the second forward ratio and the third forward ratio, fifth selective coupler 578 is placed in the disengaged configuration and seventh selective coupler 582 is placed in the engaged configuration.

A fourth or subsequent forward ratio (shown as F4) in shift table 808 of FIG. 10 is achieved by having first selective coupler 570 and fourth selective coupler 576 in an engaged configuration and second selective coupler 572, third selective coupler 574, fifth selective coupler 578, sixth selective coupler 580, and seventh selective coupler 582 in a disengaged configuration. Therefore, when transitioning between the third forward ratio and the fourth forward ratio, seventh selective coupler 582 is placed in the disengaged configuration and fourth selective coupler 576 is placed in the engaged configuration.

A fifth or subsequent forward ratio (shown as F5) in shift table 808 of FIG. 10 is achieved by having first selective coupler 570 and third selective coupler 574 in an engaged configuration and second selective coupler 572, fourth selective coupler 576, fifth selective coupler 578, sixth selective coupler 580, and seventh selective coupler 582 in a disengaged configuration. Therefore, when transitioning between the fourth forward ratio and the fifth forward ratio, fourth selective coupler 576 is placed in the disengaged configuration and third selective coupler 574 is placed in the engaged configuration.

A sixth or subsequent forward ratio (shown as F6) in shift table 808 of FIG. 10 is achieved by having first selective coupler 570 and second selective coupler 572 in an engaged configuration and third selective coupler 574, fourth selective coupler 576, fifth selective coupler 578, sixth selective coupler 580, and seventh selective coupler 582 in a disengaged configuration. Therefore, when transitioning between the fifth forward ratio and the sixth forward ratio, third selective coupler 574 is placed in the disengaged configuration and second selective coupler 572 is placed in the engaged configuration.

A seventh or subsequent forward ratio (shown as F7) in shift table 808 of FIG. 10 is achieved by having second selective coupler 572 and third selective coupler 574 in an engaged configuration and first selective coupler 570, fourth selective coupler 576, fifth selective coupler 578, sixth selective coupler 580, and seventh selective coupler 582 in a disengaged configuration. Therefore, when transitioning between the sixth forward ratio and the seventh forward ratio, first selective coupler 570 is placed in the disengaged configuration and third selective coupler 574 is placed in the engaged configuration.

An eighth or subsequent forward ratio (shown as F8) in shift table 808 of FIG. 10 is achieved by having second selective coupler 572 and fourth selective coupler 576 in an engaged configuration and first selective coupler 570, third selective coupler 574, fifth selective coupler 578, sixth selective coupler 580, and seventh selective coupler 582 in a disengaged configuration. Therefore, when transitioning between the seventh forward ratio and the eighth forward ratio, third selective coupler 574 is placed in the disengaged configuration and fourth selective coupler 576 is placed in the engaged configuration.

A ninth or subsequent forward ratio (shown as F9) in shift table 808 of FIG. 10 is achieved by having second selective coupler 572 and seventh selective coupler 582 in an engaged configuration and first selective coupler 570, third selective coupler 574, fourth selective coupler 576, fifth selective coupler 578, and sixth selective coupler 580 in a disengaged configuration. Therefore, when transitioning between the eighth forward ratio and the ninth forward ratio, fourth selective coupler 576 is placed in the disengaged configuration and seventh selective coupler 582 is placed in the engaged configuration.

A first reverse ratio (shown as R1) in shift table 808 of FIG. 10 is achieved by having third selective coupler 574 and sixth selective coupler 580 in an engaged configuration and first selective coupler 570, second selective coupler 572, fourth selective coupler 576, fifth selective coupler 578, and seventh selective coupler 582 in a disengaged configuration.

A second or subsequent reverse ratio (shown as R2) in shift table 808 of FIG. 10 is achieved by having third selective coupler 574 and fifth selective coupler 578 in an engaged configuration and first selective coupler 570, second selective coupler 572, fourth selective coupler 576, sixth selective coupler 580, and seventh selective coupler 582 in a disengaged configuration. Therefore, when transitioning between the first reverse ratio and the second reverse ratio, seventh selective coupler 582 is placed in the disengaged configuration and fifth selective coupler 578 is placed in the engaged configuration.

A third or subsequent reverse ratio (shown as R3) in shift table 808 of FIG. 10 is achieved by having third selective coupler 574 and seventh selective coupler 582 in an engaged configuration and first selective coupler 570, second selective coupler 572, fourth selective coupler 576, fifth selective coupler 578, and sixth selective coupler 580 in a disengaged configuration. Therefore, when transitioning between the second reverse ratio and the third reverse ratio, fifth selective coupler 578 is placed in the disengaged configuration and seventh selective coupler 582 is placed in the engaged configuration.

A fourth or subsequent reverse ratio (shown as R4) in shift table 808 of FIG. 10 is achieved by having second selective coupler 572 and sixth selective coupler 580 in an engaged configuration and first selective coupler 570, third selective coupler 574, fourth selective coupler 576, fifth selective coupler 578, and seventh selective coupler 582 in a disengaged configuration. Therefore, when transitioning between the third reverse ratio and the fourth reverse ratio, third selective coupler 574 and seventh selective coupler 582 are placed in the disengaged configuration and second selective coupler 572 and sixth selective coupler 580 are placed in the engaged configuration.

The present disclosure contemplates that downshifts follow the reverse sequence of the corresponding upshift (as described above). Further, several power-on skip-shifts that are single-transition are possible (e.g. from F1 up to F3, from F3 down to F1, from F3 up to F5, and from F5 down to F3).

In the illustrated embodiments, various combinations of two of the available selective couplers are engaged for each of the illustrated forward speed ratios and reverse speed ratios. Additional forward speed ratios and reverse speed ratios are possible based on other combinations of engaged selective couplers. Although in the illustrated embodiments, each forward speed ratio and reverse speed ratio has two of the available selective couplers engaged, it is contemplated that more than two selective couplers may be engaged at the same time.

Figure 9A:
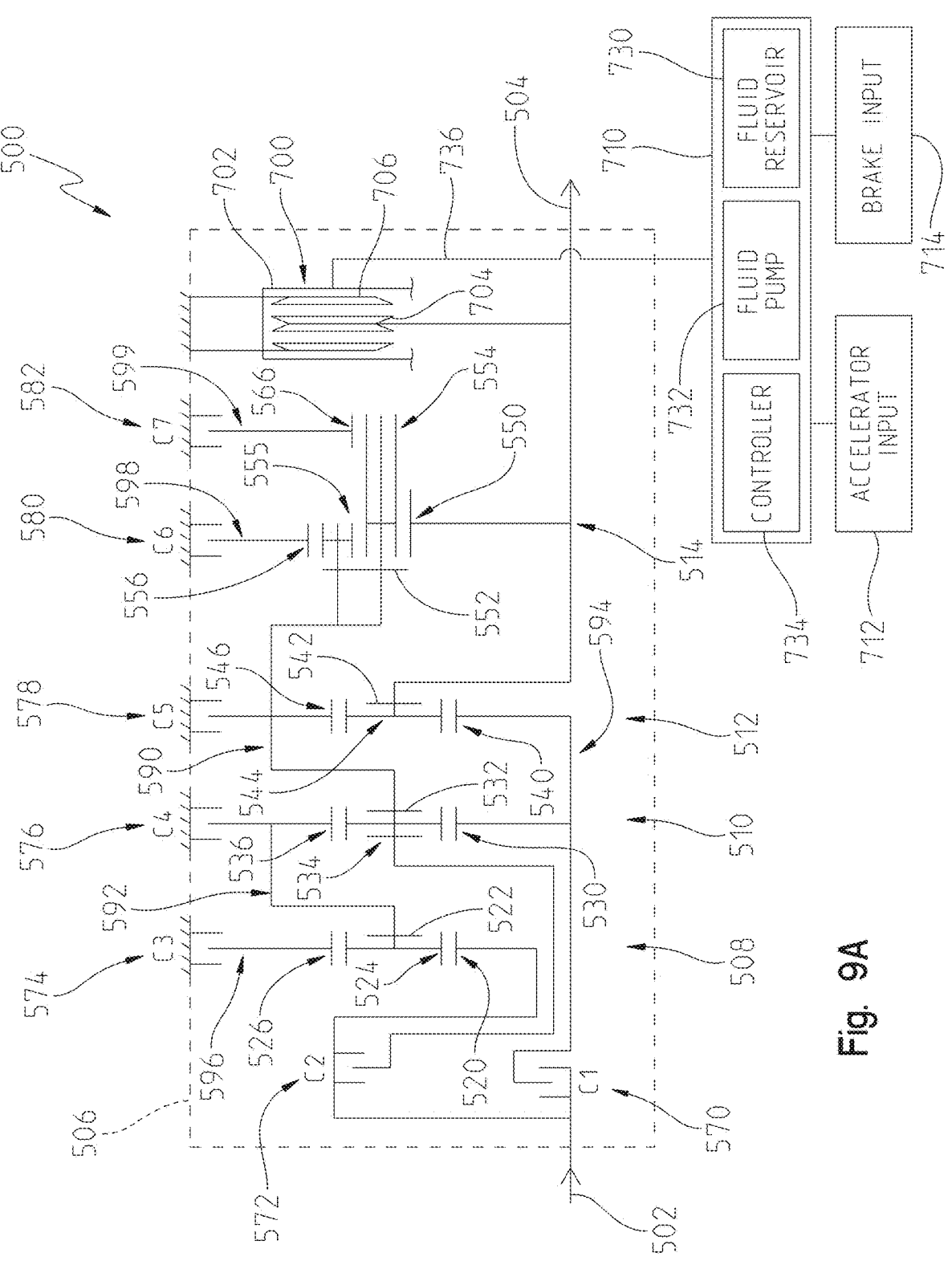
FIG. 9A is a diagrammatic view of the exemplary multi-speed transmission of FIG. 9 including a retarder.

Referring to FIG. 9A, multi-speed transmission 500 may further include a retarder 700. Retarder 700 includes a retarder housing 702 containing a rotor 704 and stator 706. Rotor 704 is fixedly coupled to output member 504 to rotate with output member 504. Stator 706 is fixedly coupled to stationary member 506. Thus, as output member 504 rotates rotor 704 rotates relative to stator 706.

Both of rotor 704 and stator 706 include vanes. Hydraulic fluid is provided to and removed from retarder housing 702 with a fluid control system 710. Fluid control system 710 includes a fluid reservoir 730, a pump 732, a controller 734, and at least one fluid conduit 736 in fluid communication with fluid reservoir 730, pump 732, and an interior of the retarder housing 702. As more fluid is provided to retarder housing 702, the rotation of rotor 704 is retarded due to the resistance of the fluid, such as oil, to be moved by the vanes of rotor 704 due to the stationary vanes of stator 706. In embodiments, in response to an operator of the vehicle including multi-speed transmission 500 removing their foot from the accelerator pedal, the accelerator input 712, the controller 734 of fluid control system 710 provides a first amount of fluid to retarder housing 702 which in turn retards the rotation of rotor 704 relative to stator 706 and hence retards output member 504 thereby slowing the vehicle including multi-speed transmission 500. Further, if the operator of the vehicle including multi-speed transmission 500 depresses the brake pedal, the brake input 714, controller 734 of fluid control system 710 provides a second amount of fluid to retarder housing 702, the second amount being higher than the first. The further increase in the amount of fluid further retards the rotation of rotor 704 relative to stator 706 and hence further retards output member 504 thereby slowing the vehicle including multi-speed transmission 500 faster.

Figure 11:
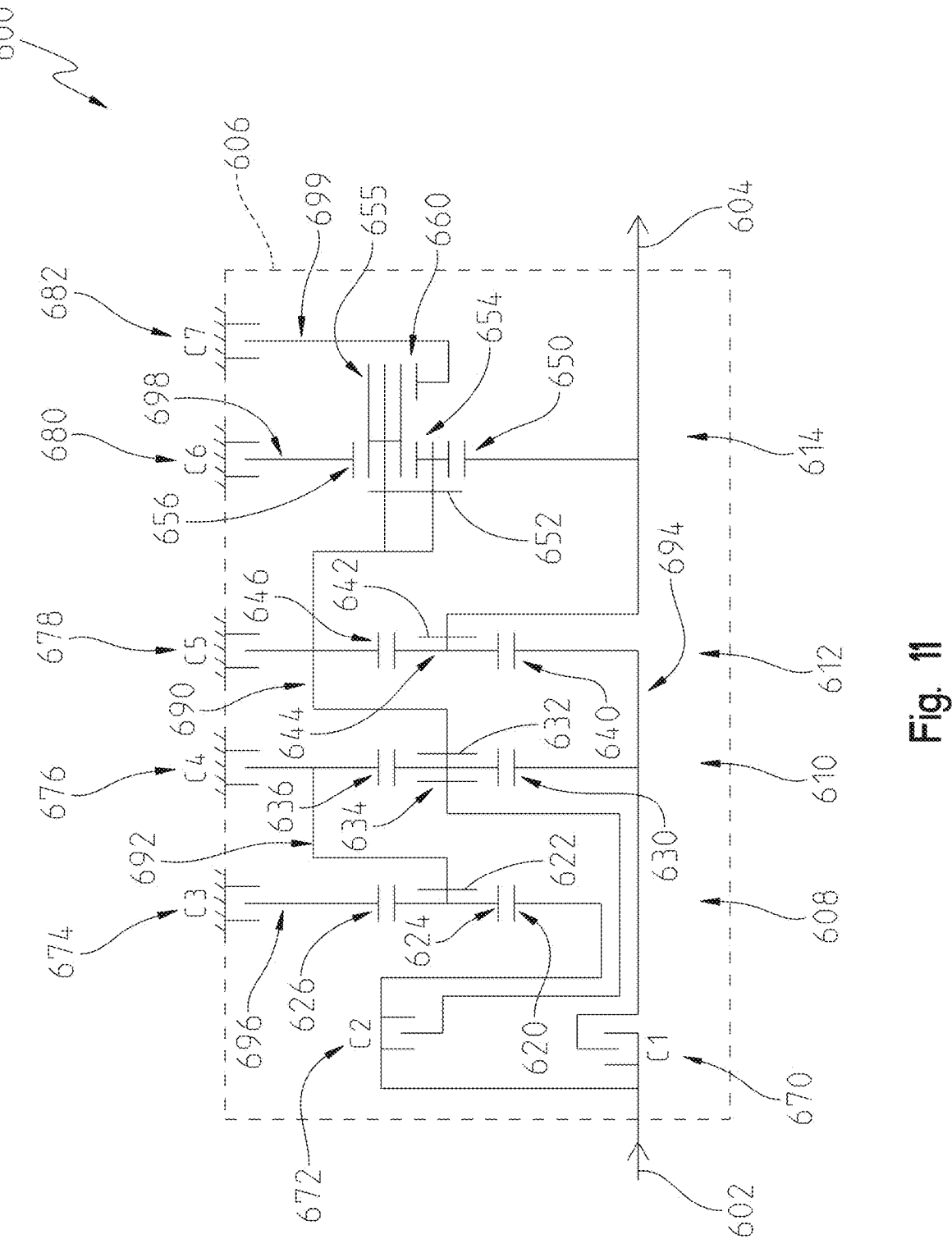
FIG. 11 is a diagrammatic view of an exemplary multi-speed transmission including five planetary gearsets and seven selective couplers.

FIG. 11 is a diagrammatic representation of a multi-speed transmission 600. Multi-speed transmission 600 includes an input member 602 and an output member 604. Each of input member 602 and output member 604 is rotatable relative to at least one stationary member 606. An exemplary input member 602 is an input shaft or other suitable rotatable component which is accessible from a first end of stationary member 606 so that a drive component, such as an output of a prime mover 820 (see FIG. 13) or a rotatable component operatively coupled to an output of a prime mover 820 (see FIG. 13), may be coupled thereto. An exemplary output member 604 is an output shaft or other suitable rotatable component which is accessible from a second end of stationary member 606 so that a driven component 822 (see FIG. 13), such as an output shaft, a differential, a pump, one or more ground engaging members, may be coupled thereto.

Multi-speed transmission 600 includes a plurality of planetary gearsets, illustratively a first planetary gearset 608, a second planetary gearset 610, a third planetary gearset 612, and a fourth planetary gearset 614. In one embodiment, additional planetary gearsets may be included. Further, although first planetary gearset 608, second planetary gearset 610, third planetary gearset 612, are illustrated as simple planetary gearsets, it is contemplated that compound planetary gearsets may be included in some embodiments. Fourth planetary gearset 614 is a compound planetary gearset including a pair of sun gears, sun gear 650 and sun gear 660 and a ring gear 656. Fourth planetary gearset 614 further includes a planet carrier 652 carrying a first set of planet gears 654 and a second set of planet gears 655. Planet gears 654 are intermeshed with sun gear 650. Planet gears 655 are intermeshed with planet gears 654, ring gear 656, and sun gear 660.

First planetary gearset 608 includes a sun gear 620, a planet carrier 622 supporting a plurality of planet gears 624, and a ring gear 626. Second planetary gearset 610 includes a sun gear 630, a planet carrier 632 supporting a plurality of planet gears 634, and a ring gear 636. Third planetary gearset 612 includes a sun gear 640, a planet carrier 642 supporting a plurality of planet gears 644, and a ring gear 646. Fourth planetary gearset 614 is a compound planetary gearset including a pair of sun gears, sun gear 650 and sun gear 660 and a ring gear 656. Fourth planetary gearset 614 further includes a planet carrier 652 carrying a first set of planet gears 654 and a second set of planet gears 655. Planet gears 654 are intermeshed with sun gear 650. Planet gears 655 are intermeshed with planet gears 654, ring gear 656, and sun gear 660.

Multi-speed transmission 600 further includes a plurality of selective couplers, illustratively a first selective coupler 670, a second selective coupler 672, a third selective coupler 674, a fourth selective coupler 676, a fifth selective coupler 678, a sixth selective coupler 680, and a seventh selective coupler 682. In the illustrated embodiment, first selective coupler 670 and second selective coupler 672 are clutches and third selective coupler 674, fourth selective coupler 676, fifth selective coupler 678, sixth selective coupler 680, and seventh selective coupler 682 are brakes. The axial locations of the clutches and brakes relative to the plurality of planetary gearsets may be altered from the illustrated axial locations. In alternative embodiments, any number of clutches and brakes may be used.

Multi-speed transmission 600 includes several components that are illustratively shown as being fixedly coupled together. Input member 602 is fixedly coupled to sun gear 620 of first planetary gearset 608. Output member 604 is fixedly coupled to planet carrier 642 of third planetary gearset 612 and sun gear 650 of fourth planetary gearset 614. Sun gear 630 of second planetary gearset 610 is fixedly coupled to sun gear 640 of third planetary gearset 612. Planet carrier 622 of first planetary gearset 608 is fixedly coupled to ring gear 636 of second planetary gearset 610. Ring gear 646 of third planetary gearset 612, planet carrier 632 of second planetary gearset 610, and planet carrier 652 of fourth planetary gearset 614 are fixedly coupled together. In alternative embodiments, one or more of the components fixedly coupled together are selectively coupled together through one or more selective couplers.

Multi-speed transmission 600 may be described as having eight interconnectors. Input member 602 is a first interconnector that both provides input torque to multi-speed transmission 600 and is fixedly coupled to sun gear 620 of first planetary gearset 608. Input member 602 is further fixedly connected to first selective coupler 670 and second selective coupler 672. Output member 604 is a second interconnector that both provides output torque from multi-speed transmission 600 and fixedly couples planet carrier 642 of third planetary gearset 612 and sun gear 650 of fourth planetary gearset 614. A third interconnector 690 fixedly couples ring gear 646 of third planetary gearset 612, planet carrier 632 of second planetary gearset 610, and planet carrier 652 of fourth planetary gearset 614. Third interconnector 690 is further fixedly coupled to second selective coupler 672 and fifth selective coupler 678. A fourth interconnector 692 fixedly couples planet carrier 622 of the first planetary gearset 608 to ring gear 636 of the second planetary gearset 610 together. Fourth interconnector 692 is further fixedly coupled to fourth selective coupler 676. A fifth interconnector 694 fixedly couples sun gear 630 of second planetary gearset 610 and sun gear 640 of third planetary gearset 612 together. Fifth interconnector 694 is further fixedly coupled to first selective coupler 670. A sixth interconnector 696 fixedly couples ring gear 626 of first planetary gearset 608 to third selective coupler 674. A seventh interconnector 698 fixedly couples ring gear 656 of fourth planetary gearset 614 to sixth selective coupler 680. An eighth interconnector 699 fixedly couples sun gear 660 of fourth planetary gearset 614 to seventh selective coupler 682.

Multi-speed transmission 600 further includes several components that are illustratively shown as being selectively coupled together through selective couplers. First selective coupler 670, when engaged, fixedly couples sun gear 620 of the first planetary gearset 608 to sun gear 630 of the second planetary gearset 610 and sun gear 640 of the third planetary gearset 612. When first selective coupler 670 is disengaged, sun gear 620 of the first planetary gearset 608 may rotate relative to sun gear 630 of the second planetary gearset 610 and sun gear 640 of the third planetary gearset 612.

Second selective coupler 672, when engaged, fixedly couples sun gear 620 of the first planetary gearset 608 to planet carrier 632 of second planetary gearset 610, ring gear 646 of the third planetary gearset 612 and planet carrier 652 of fourth planetary gearset 614. When second selective coupler 672 is disengaged, sun gear 620 of the first planetary gearset 608 may rotate relative to planet carrier 632 of second planetary gearset 610, ring gear 646 of the third planetary gearset 612 and planet carrier 652 of fourth planetary gearset 614.

Third selective coupler 674, when engaged, fixedly couples ring gear 626 of the first planetary gearset 608 to stationary member 606. When third selective coupler 674 is disengaged, ring gear 626 of the first planetary gearset 608 may rotate relative to stationary member 606.

Fourth selective coupler 676, when engaged, fixedly couples planet carrier 622 of the first planetary gearset 608 and ring gear 636 of the second planetary gearset 610 to stationary member 606. When fourth selective coupler 676 is disengaged, planet carrier 622 of the first planetary gearset 608 and ring gear 636 of the second planetary gearset 610 may rotate relative to stationary member 606.

Fifth selective coupler 678, when engaged, fixedly couples planet carrier 632 of second planetary gearset 610, ring gear 646 of the third planetary gearset 612 and planet carrier 652 of fourth planetary gearset 614 to stationary member 606. When fifth selective coupler 678 is disengaged, planet carrier 632 of second planetary gearset 610, ring gear 646 of the third planetary gearset 612 and planet carrier 652 of fourth planetary gearset 614 may rotate relative to stationary member 606.

Sixth selective coupler 680, when engaged, fixedly couples ring gear 656 of fourth planetary gearset 614 to stationary member 606. When sixth selective coupler 680 is disengaged, ring gear 656 of fourth planetary gearset 614 may rotate relative to stationary member 606.

Seventh selective coupler 682, when engaged, fixedly couples sun gear 660 of fourth planetary gearset 614 to stationary member 606. When seventh selective coupler 682 is disengaged, sun gear 660 of fourth planetary gearset 614 may rotate relative to stationary member 606.

By engaging various combinations of first selective coupler 670, second selective coupler 672, third selective coupler 674, fourth selective coupler 676, fifth selective coupler 678, sixth selective coupler 680, and seventh selective coupler 682, additional components of multi-speed transmission 600 may be fixedly coupled together.

Figure 12:
FIG. 12 is a truth table illustrating the selective engagement of the seven selective couplers of FIG. 11 to provide a plurality of forward and reverse gear or speed ratios of the multi-speed transmission of FIG. 11.

The plurality of planetary gearsets and the plurality of selective couplers of multi-speed transmission 600 may be interconnected in various arrangements to provide torque from input member 602 to output member 604. Referring to FIG. 12, an exemplary shift table 810 is shown that provides the state of each of first selective coupler 670, second selective coupler 672, third selective coupler 674, fourth selective coupler 676, fifth selective coupler 678, sixth selective coupler 680, and seventh selective coupler 682 for nine different forward gear or speed ratios (F1-F9) and four reverse gear or speed ratios (R1-R4). Each row corresponds to a given interconnection arrangement for transmission 600. The first column provides the gear range (R2 being a higher ratio or gear than R1 for reverse gears and F2 being a higher ratio or gear than F1 for forward gears). The second column provides the gear ratio between the input member 602 and the output member 604. The third column provides the gear step. The seven rightmost columns illustrate which ones of the selective couplers 670-582 are engaged ("X" indicates engaged) and which ones of selective couplers 670-582 are disengaged ("(blank)" indicates disengaged). FIG. 12 is only one example of any number of truth tables possible for achieving a plurality of forward ratios and a plurality of reverse ratios.

In one embodiment, to place multi-speed transmission 600 in neutral (Neu), all of first selective coupler 670, second selective coupler 672, third selective coupler 674, fourth selective coupler 676, fifth selective coupler 678, sixth selective coupler 680, and seventh selective coupler 682 are in the disengaged configuration. One or more of first selective coupler 670, second selective coupler 672, third selective coupler 674, fourth selective coupler 676, fifth selective coupler 678, sixth selective coupler 680, and seventh selective coupler 682 may remain engaged in neutral (Neu) as long as the combination of first selective coupler 670, second selective coupler 672, third selective coupler 674, fourth selective coupler 676, fifth selective coupler 678, sixth selective coupler 680, and seventh selective coupler 682 does not transmit torque from input member 602 to output member 604.

A first forward ratio (shown as F1) in shift table 810 of FIG. 12 is achieved by having first selective coupler 670 and sixth selective coupler 680 in an engaged configuration and second selective coupler 672, third selective coupler 674, fourth selective coupler 676, fifth selective coupler 678, and seventh selective coupler 682 in a disengaged configuration.

A second or subsequent forward ratio (shown as F2) in shift table 810 of FIG. 12 is achieved by having first selective coupler 670 and fifth selective coupler 678 in an engaged configuration and second selective coupler 672, third selective coupler 674, fourth selective coupler 676, sixth selective coupler 680, and seventh selective coupler 682 in a disengaged configuration. Therefore, when transitioning between the first forward ratio and the second forward ratio, sixth selective coupler 680 is placed in the disengaged configuration and fifth selective coupler 678 is placed in the engaged configuration.

A third or subsequent forward ratio (shown as F3) in shift table 810 of FIG. 12 is achieved by having first selective coupler 670 and seventh selective coupler 682 in an engaged configuration and second selective coupler 672, third selective coupler 674, fourth selective coupler 676, fifth selective coupler 678, and sixth selective coupler 680 in a disengaged configuration. Therefore, when transitioning between the second forward ratio and the third forward ratio, fifth selective coupler 678 is placed in the disengaged configuration and seventh selective coupler 682 is placed in the engaged configuration.

A fourth or subsequent forward ratio (shown as F4) in shift table 810 of FIG. 12 is achieved by having first selective coupler 670 and fourth selective coupler 676 in an engaged configuration and second selective coupler 672, third selective coupler 674, fifth selective coupler 678, sixth selective coupler 680, and seventh selective coupler 682 in a disengaged configuration. Therefore, when transitioning between the third forward ratio and the fourth forward ratio, seventh selective coupler 682 is placed in the disengaged configuration and fourth selective coupler 676 is placed in the engaged configuration.

A fifth or subsequent forward ratio (shown as F5) in shift table 810 of FIG. 12 is achieved by having first selective coupler 670 and third selective coupler 674 in an engaged configuration and second selective coupler 672, fourth selective coupler 676, fifth selective coupler 678, sixth selective coupler 680, and seventh selective coupler 682 in a disengaged configuration. Therefore, when transitioning between the fourth forward ratio and the fifth forward ratio, fourth selective coupler 676 is placed in the disengaged configuration and third selective coupler 674 is placed in the engaged configuration.

A sixth or subsequent forward ratio (shown as F6) in shift table 810 of FIG. 12 is achieved by having first selective coupler 670 and second selective coupler 672 in an engaged configuration and third selective coupler 674, fourth selective coupler 676, fifth selective coupler 678, sixth selective coupler 680, and seventh selective coupler 682 in a disengaged configuration. Therefore, when transitioning between the fifth forward ratio and the sixth forward ratio, third selective coupler 674 is placed in the disengaged configuration and second selective coupler 672 is placed in the engaged configuration.

A seventh or subsequent forward ratio (shown as F7) in shift table 810 of FIG. 12 is achieved by having second selective coupler 672 and third selective coupler 674 in an engaged configuration and first selective coupler 670, fourth selective coupler 676, fifth selective coupler 678, sixth selective coupler 680, and seventh selective coupler 682 in a disengaged configuration. Therefore, when transitioning between the sixth forward ratio and the seventh forward ratio, first selective coupler 670 is placed in the disengaged configuration and third selective coupler 674 is placed in the engaged configuration.

An eighth or subsequent forward ratio (shown as F8) in shift table 810 of FIG. 12 is achieved by having second selective coupler 672 and fourth selective coupler 676 in an engaged configuration and first selective coupler 670, third selective coupler 674, fifth selective coupler 678, sixth selective coupler 680, and seventh selective coupler 682 in a disengaged configuration. Therefore, when transitioning between the seventh forward ratio and the eighth forward ratio, third selective coupler 674 is placed in the disengaged configuration and fourth selective coupler 676 is placed in the engaged configuration.

A ninth or subsequent forward ratio (shown as F9) in shift table 810 of FIG. 12 is achieved by having second selective coupler 672 and seventh selective coupler 682 in an engaged configuration and first selective coupler 670, third selective coupler 674, fourth selective coupler 676, fifth selective coupler 678, and sixth selective coupler 680 in a disengaged configuration. Therefore, when transitioning between the eighth forward ratio and the ninth forward ratio, fourth selective coupler 676 is placed in the disengaged configuration and seventh selective coupler 682 is placed in the engaged configuration.

A first reverse ratio (shown as R1) in shift table 810 of FIG. 12 is achieved by having third selective coupler 674 and sixth selective coupler 680 in an engaged configuration and first selective coupler 670, second selective coupler 672, fourth selective coupler 676, fifth selective coupler 678, and seventh selective coupler 682 in a disengaged configuration.

A second or subsequent reverse ratio (shown as R2) in shift table 810 of FIG. 12 is achieved by having third selective coupler 674 and fifth selective coupler 678 in an engaged configuration and first selective coupler 670, second selective coupler 672, fourth selective coupler 676, sixth selective coupler 680, and seventh selective coupler 682 in a disengaged configuration. Therefore, when transitioning between the first reverse ratio and the second reverse ratio, seventh selective coupler 682 is placed in the disengaged configuration and fifth selective coupler 678 is placed in the engaged configuration.

A third or subsequent reverse ratio (shown as R3) in shift table 810 of FIG. 12 is achieved by having third selective coupler 674 and seventh selective coupler 682 in an engaged configuration and first selective coupler 670, second selective coupler 672, fourth selective coupler 676, fifth selective coupler 678, and sixth selective coupler 680 in a disengaged configuration. Therefore, when transitioning between the second reverse ratio and the third reverse ratio, fifth selective coupler 678 is placed in the disengaged configuration and seventh selective coupler 682 is placed in the engaged configuration.

A fourth or subsequent reverse ratio (shown as R4) in shift table 810 of FIG. 12 is achieved by having second selective coupler 672 and sixth selective coupler 680 in an engaged configuration and first selective coupler 670, third selective coupler 674, fourth selective coupler 676, fifth selective coupler 678, and seventh selective coupler 682 in a disengaged configuration. Therefore, when transitioning between the third reverse ratio and the fourth reverse ratio, third selective coupler 674 and seventh selective coupler 682 are placed in the disengaged configuration and second selective coupler 672 and sixth selective coupler 680 are placed in the engaged configuration.

The present disclosure contemplates that downshifts follow the reverse sequence of the corresponding upshift (as described above). Further, several power-on skip-shifts that are single-transition are possible (e.g. from F1 up to F3, from F3 down to F1, from F3 up to F5, and from F5 down to F3).

In the illustrated embodiments, various combinations of two of the available selective couplers are engaged for each of the illustrated forward speed ratios and reverse speed ratios. Additional forward speed ratios and reverse speed ratios are possible based on other combinations of engaged selective couplers. Although in the illustrated embodiments, each forward speed ratio and reverse speed ratio has two of the available selective couplers engaged, it is contemplated that more than two selective couplers may be engaged at the same time.

Figure 11A:
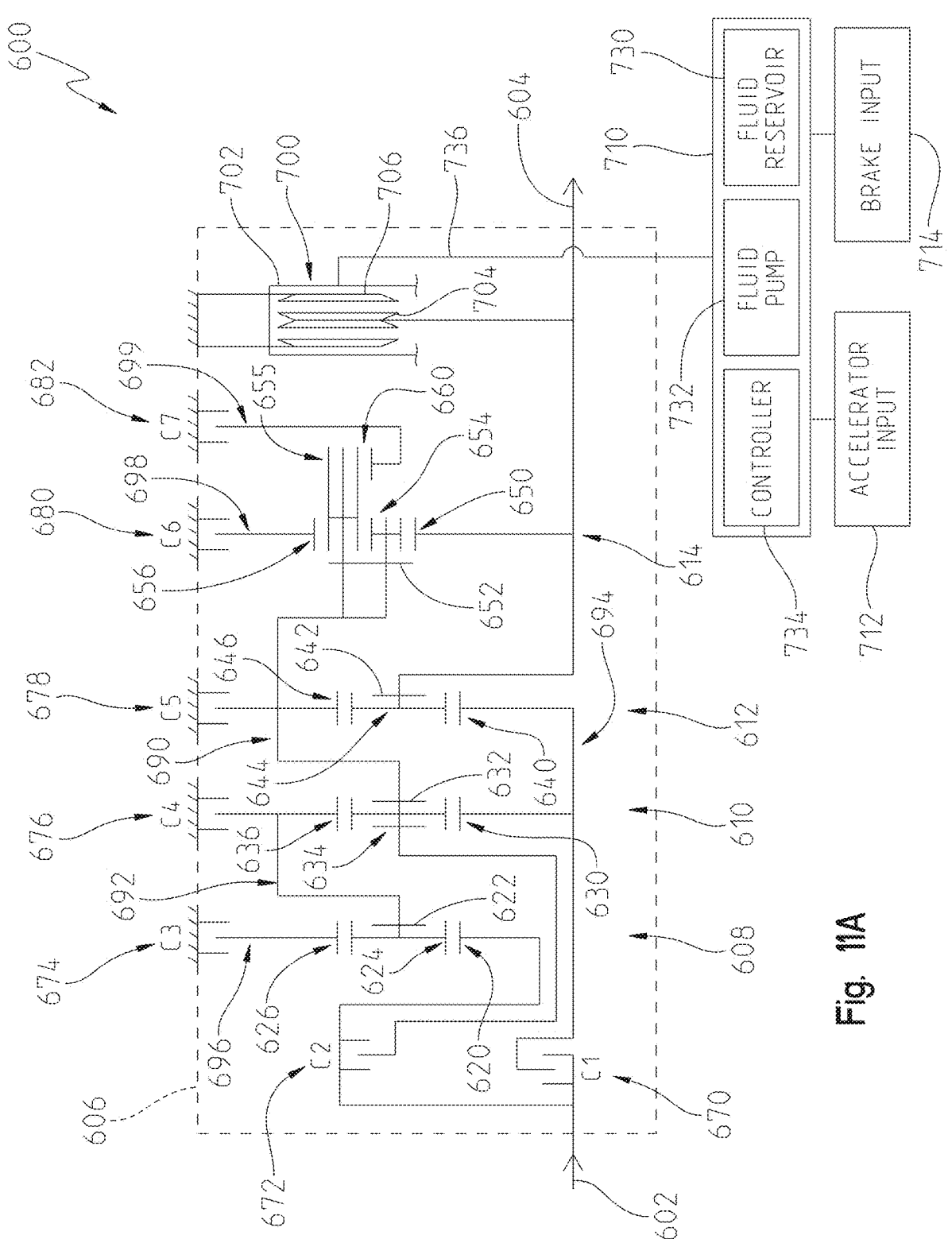
FIG. 11A is a diagrammatic view of the exemplary multi-speed transmission of FIG. 11 including a retarder.

Referring to FIG. 11A, multi-speed transmission 600 may further include a retarder 700. Retarder 700 includes a retarder housing 702 containing a rotor 704 and stator 706. Rotor 704 is fixedly coupled to output member 604 to rotate with output member 604. Stator 706 is fixedly coupled to stationary member 606. Thus, as output member 604 rotates rotor 704 rotates relative to stator 706.

Both of rotor 704 and stator 706 include vanes. Hydraulic fluid is provided to and removed from retarder housing 702 with a fluid control system 710. Fluid control system 710 includes a fluid reservoir 730, a pump 732, a controller 734, and at least one fluid conduit 736 in fluid communication with fluid reservoir 730, pump 732, and an interior of the retarder housing 702. As more fluid is provided to retarder housing 702, the rotation of rotor 704 is retarded due to the resistance of the fluid, such as oil, to be moved by the vanes of rotor 704 due to the stationary vanes of stator 706. In embodiments, in response to an operator of the vehicle including multi-speed transmission 600 removing their foot from the accelerator pedal, the accelerator input 712, the controller 734 of fluid control system 710 provides a first amount of fluid to retarder housing 702 which in turn retards the rotation of rotor 704 relative to stator 706 and hence retards output member 604 thereby slowing the vehicle including multi-speed transmission 600. Further, if the operator of the vehicle including multi-speed transmission 600 depresses the brake pedal, the brake input 714, controller 734 of fluid control system 710 provides a second amount of fluid to retarder housing 702, the second amount being higher than the first amount. The further increase in the amount of fluid further retards the rotation of rotor 704 relative to stator 706 and hence further retards output member 604 thereby slowing the vehicle including multi-speed transmission 600 faster.

Figure 13:
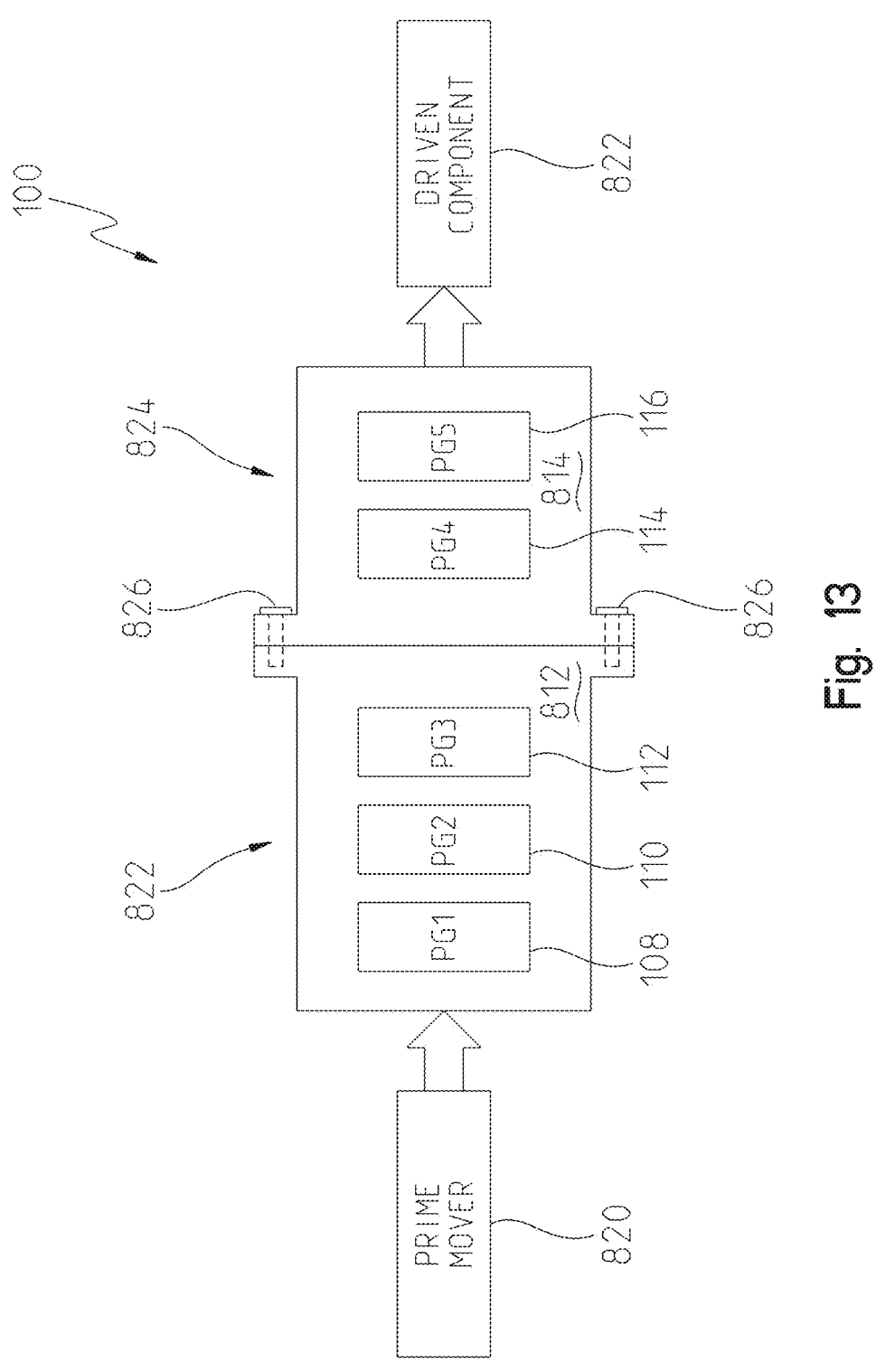
FIG. 13 illustrates the exemplary multi-speed transmission of any one FIGS. 1, 3, 5, 7, 9, and 11 in a multi-piece housing.

Referring to FIG. 13, multi-speed transmission 100 is illustrated as a first housing 822 and a second housing 824 coupled together through a plurality of fasteners 826. First housing 822 includes an interior 812 into which first planetary gearset 108, second planetary gearset 110, and third planetary gearset 112 of multi-speed transmission 100 are received. Second housing 824 includes an interior 814 into which fourth planetary gearset 114 and fifth planetary gearset 116 are received. The input member 102 of multi-speed transmission 100 is operatively coupled to a prime mover 820. Exemplary prime movers include an internal combustion engine, an electric motor, a combination thereof, or other suitable prime movers. The output member 104 of multi-speed transmission 100 is operatively coupled to a driven component. Exemplary driven components include ground engaging members, a drive shaft, a differential, a pump, one or more ground engaging member, and other suitable driven components.

Figure 1B:
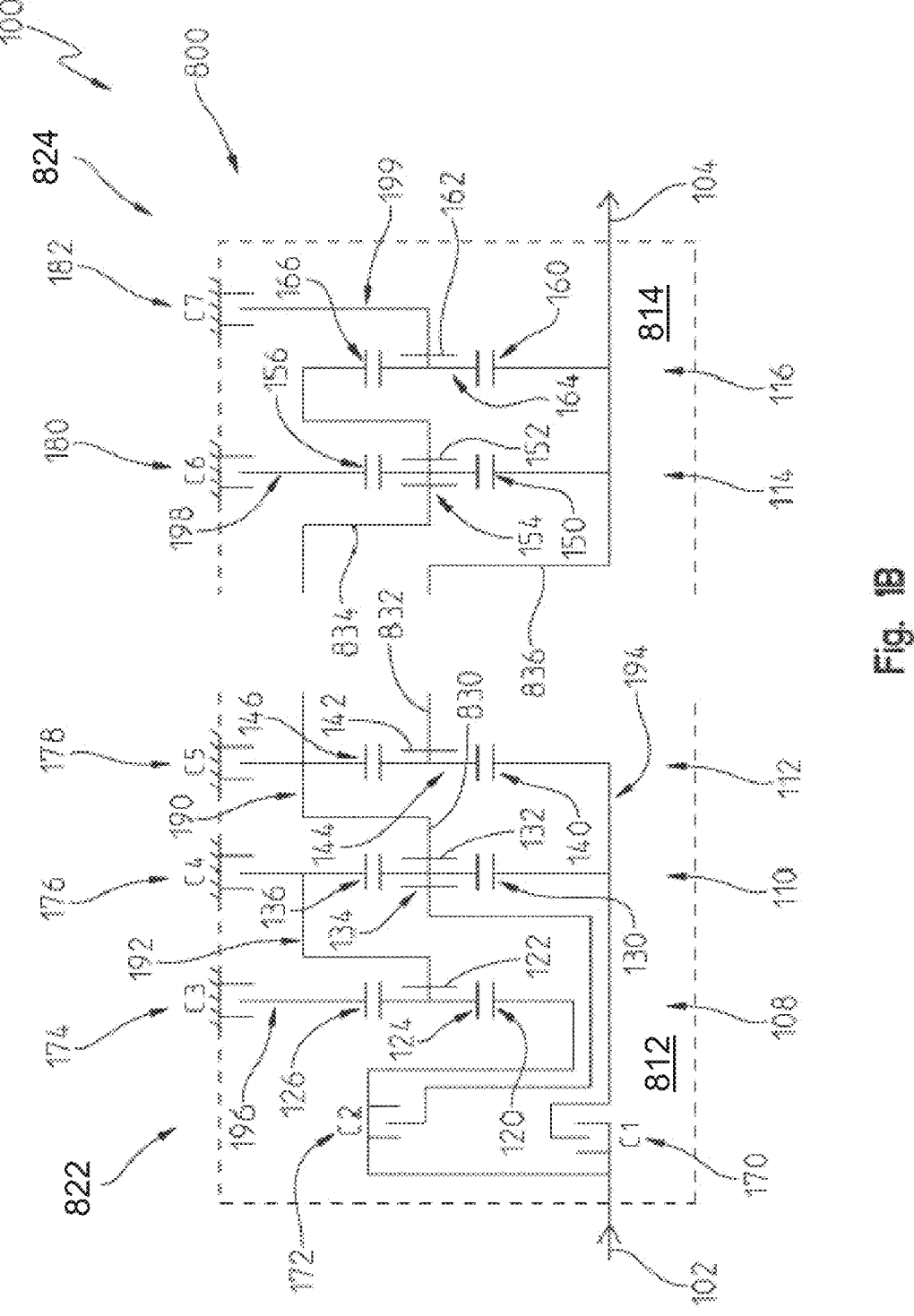
FIG. 1B is a diagrammatic view of the exemplary multi-speed transmission of FIG. 1 in the multi-piece housing of FIG. 13.

Referring to FIG. 1B, in embodiments, first planetary gearset 108, second planetary gearset 110, and third planetary gearset 112 are assembled into interior 812 of housing 822 along with first selective coupler 170, second selective coupler 172, third selective coupler 174, fourth selective coupler 176, fifth selective coupler 178, a first portion 830 of third interconnector 190, fourth interconnector 192 fifth interconnector 194, sixth interconnector 196, and a first portion 832 of output member 104 while fourth planetary gearset 114, fifth planetary gearset 116, sixth selective coupler 180, seventh selective coupler 182, seventh interconnector 198, eighth interconnector 199, a second portion 834 of third interconnector 190, and a second portion 836 of output member 104 are assembled into interior 814 of housing 824. In embodiments, first portion 830 of third interconnector 190 and second portion 834 of third interconnector 190 includes mating components such that when housing 824 is assembled to housing 822 first portion 830 of third interconnector 190 is operatively coupled to second portion 834 of third interconnector 190 and first portion 832 of output member 104 and second portion 836 of output member 104 includes mating components such that when housing 824 is assembled to housing 822 first portion 832 of output member 104 is operatively coupled to second portion 836 of output member 104.

Figure 13A:
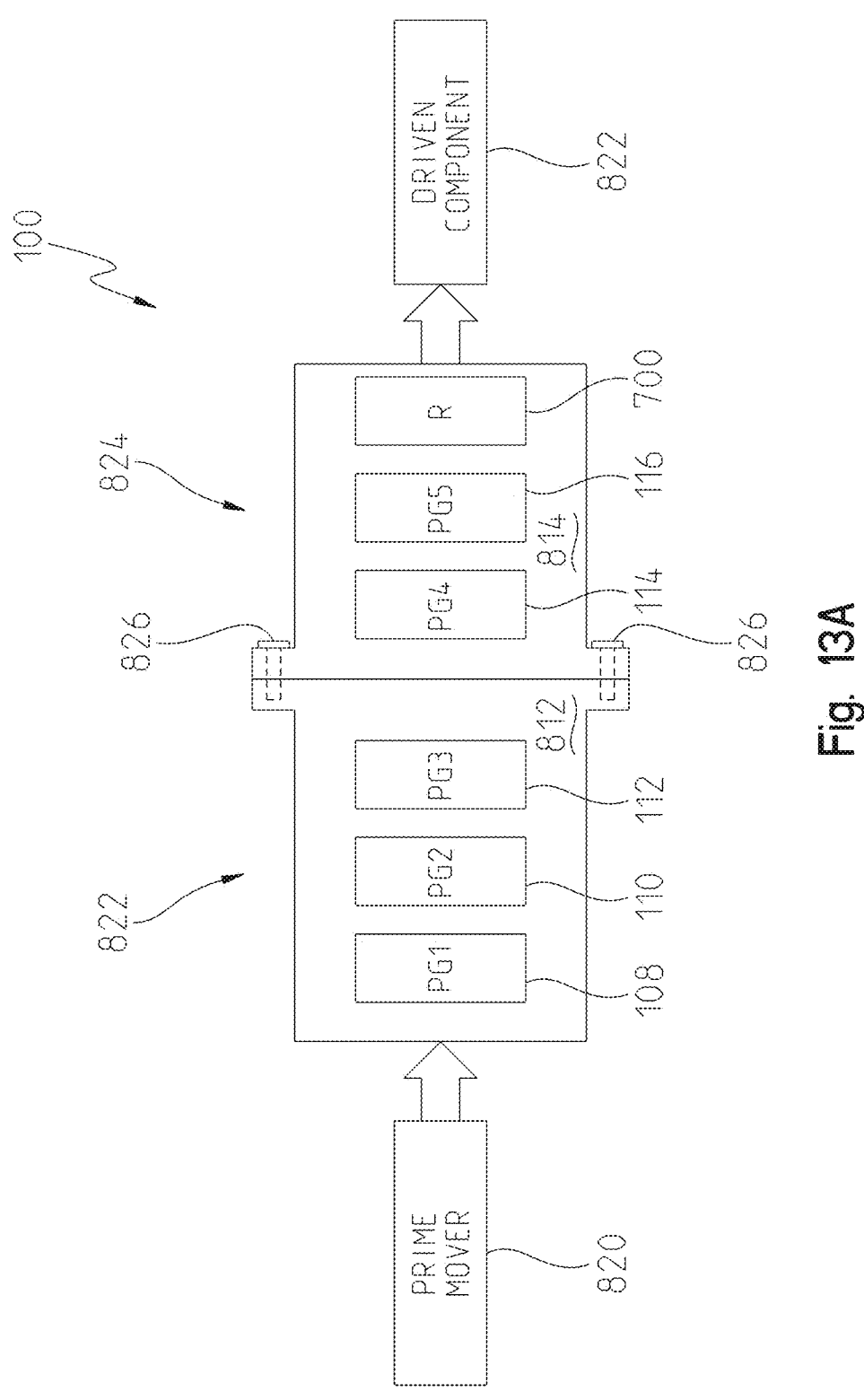
FIG. 13A illustrates the exemplary multi-speed transmission of FIGS. 1A, 3A, 5A, 7A, 9A, and 11A in a multi-piece housing.

Referring to FIG. 13A, the embodiment of FIG. 1A is shown in housing 822 and housing 824. In embodiments, any one of the embodiments of FIG. 3, FIG. 3A, FIG. 5, FIG. 5A, FIG. 7, FIG. 7A, FIG. 9, FIG. 9A, FIG. 11, and FIG. 11A are received within housing 822 and housing 824.

While this invention has been described as having exemplary designs, the present invention can be further modified within the spirit and scope of this disclosure. This application is therefore intended to cover any variations, uses, or adaptations of the invention using its general principles. Further, this application is intended to cover such departures from the present disclosure as come within known or customary practice in the art to which this invention pertains and which fall within the limits of the appended claims.

What is claimed is:

1. A transmission comprising:

at least one stationary member;

an input member rotatable relative to the at least one stationary member;

a plurality of planetary gearsets operatively coupled to the input member, each of the plurality of planetary gearsets including a first gearset component, a second gearset component, and a third gearset component, the plurality of planetary gearsets including a first planetary gearset, a second planetary gearset, a third planetary gearset, a fourth planetary gearset, and a fifth planetary gearset, the input member is fixedly coupled to the first gearset component of the first planetary gearset;

an output member operatively coupled to the input member through the plurality of planetary gearsets and rotatable relative to the at least one stationary member, the output member is fixedly coupled to the second gearset component of the third planetary gearset, the first gearset component of the fourth planetary gearset, and the first gearset component of the fifth planetary gearset;

a first interconnector which fixedly couples the second gearset component of the second planetary gearset, the third gearset component of the third planetary gearset, the second gearset component of the fourth planetary gearset, and the third gearset component of the fifth planetary gearset together;

a second interconnector which fixedly couples the second gearset component of the first planetary gearset to the third gearset component of the second planetary gearset;

a third interconnector which fixedly couples the first gearset component of the second planetary gearset and the first gearset component of the third planetary gearset together;

a plurality of selective couplers, the plurality of selective couplers including:

a first selective coupler which, when engaged, fixedly couples the first gearset component of the first planetary gearset to the first gearset component of the second planetary gearset and the first gearset component of the third planetary gearset;

a second selective coupler which, when engaged, fixedly couples the first gearset component of the first planetary gearset to the second gearset component of the second planetary gearset, the third gearset component of the third planetary gearset, the second gearset component of the fourth planetary gearset, and the third gearset component of the fifth planetary gearset;

a third selective coupler which, when engaged, fixedly couples the third gearset component of the first planetary gearset to the at least one stationary member;

a fourth selective coupler which, when engaged, fixedly couples the second gearset component of the first planetary gearset and the third gearset component of the second planetary gearset to the at least one stationary member;

a fifth selective coupler which, when engaged, fixedly couples the second gearset component of the second planetary gearset, the third gearset component of the third planetary gearset, the second gearset component of the fourth planetary gearset, and the third gearset component of the fifth planetary gearset to the at least one stationary member;

a sixth selective coupler which, when engaged, fixedly couples the third gearset component of the fourth planetary gearset to the at least one stationary member; and a seventh selective coupler which, when engaged, fixedly couples the second gearset component of the fifth planetary gearset to the at least one stationary member;

a retarder including a retarder housing, a rotor fixedly coupled to the second gearset component of the third planetary gearset, the first gearset component of the fourth planetary gearset, and the first gearset component of the fifth planetary gearset and positioned in the retarder housing, and a stator positioned in the retarder housing and fixedly coupled to the at least one stationary member;

wherein the at least one stationary member includes a first housing having a first interior and second housing having a second interior, the second housing being removably coupled to the first housing;

wherein the first planetary gearset, the second planetary gearset, and the third planetary gearset are received in the first interior of the first housing and the fourth planetary gearset and the fifth planetary gearset being received in the second interior of the second housing;

wherein the second interconnector is positioned in the first interior of the first housing;

wherein the third interconnector is positioned in the first interior of the first housing;

wherein the first selective coupler is positioned in the first interior of the first housing.

2. The transmission of claim 1, further comprising a fluid control system in fluid communication with an interior of the retarder housing of the retarder to control an amount of fluid in the interior of the retarder housing.

3. The transmission of claim 2, wherein the fluid control system controls the amount of fluid in the interior of the retarder housing to a first amount in response to a first input from an accelerator input and to a second amount in response to a second input from a brake input, the second amount being more than the first amount.

4. The transmission of claim 1, wherein the second planetary gearset is positioned between the first planetary gearset and the third planetary gearset;

the third planetary gearset is positioned between the second planetary gearset and the fourth planetary gearset; and the fourth planetary gearset is positioned between the third planetary gearset and the fifth planetary gearset.

5. The transmission of claim 1, wherein each of the first planetary gearset, the second planetary gearset, the third planetary gearset, the fourth planetary gearset, and the fifth planetary gearset is a simple planetary gearset.

6. The transmission of claim 5, wherein the first gearset component of the first planetary gearset is a first sun gear, the first gearset component of the second planetary gearset is a second sun gear, the first gearset component of the third planetary gearset is a third sun gear, the first gearset component of the fourth planetary gearset is a fourth sun gear, the first gearset component of the fifth planetary gearset is a fifth sun gear, the second gearset component of the first planetary gearset is a first planet carrier, the second gearset component of the second planetary gearset is a second planet carrier, the second gearset component of the third planetary gearset is a third planet carrier, the second gearset component of the fourth planetary gearset is a fourth planet carrier, the second gearset component of the fifth planetary gearset is a fifth planet carrier, the third gearset component of the first planetary gearset is a first ring gear, the third gearset component of the second planetary gearset is a second ring gear, the third gearset component of the third planetary gearset is a third ring gear, the third gearset component of the fourth planetary gearset is a fourth ring gear, and the third gearset component of the fifth planetary gearset is a fifth ring gear.

7. A transmission comprising:

at least one stationary member including a first housing having a first interior and second housing having a second interior, the second housing being removably coupled to the first housing;

an input member rotatable relative to the at least one stationary member;

a plurality of planetary gearsets operatively coupled to the input member, each of the plurality of planetary gearsets including a first gearset component, a second gearset component, and a third gearset component, the plurality of planetary gearsets including a first planetary gearset, a second planetary gearset, a third planetary gearset, a fourth planetary gearset, and a fifth planetary gearset, the input member is fixedly coupled to the first gearset component of the first planetary gearset, the first planetary gearset, the second planetary gearset, and the third planetary gearset being received in the first interior of the first housing and the fourth planetary gearset and the fifth planetary gearset being received in the second interior of the second housing;

an output member operatively coupled to the input member through the plurality of planetary gearsets and rotatable relative to the at least one stationary member, the output member is fixedly coupled to the second gearset component of the third planetary gearset, the first gearset component of the fourth planetary gearset, and first gearset component of the fifth planetary gearset;

a first interconnector including a first portion which fixedly couples the second gearset component of the second planetary gearset and the third gearset component of the third planetary gearset and a second portion which fixedly couples the second gearset component of the fourth planetary gearset and the third gearset component of the fifth planetary gearset together, the first portion of the first interconnector being removably coupled to the second portion of the first interconnector;

a second interconnector which fixedly couples the second gearset component of the first planetary gearset to the third gearset component of the second planetary gearset;

a third interconnector which fixedly couples the first gearset component of the second planetary gearset and the first gearset component of the third planetary gearset together;

a plurality of selective couplers, the plurality of selective couplers including:

a first selective coupler which, when engaged, fixedly couples the first gearset component of the first planetary gearset to the first gearset component of the second planetary gearset and the first gearset component of the third planetary gearset, the first selective coupler being positioned in the first interior of the first housing;

a second selective coupler which, when engaged, fixedly couples the first gearset component of the first planetary gearset to the second gearset component of the second planetary gearset, the third gearset component of the third planetary gearset, the second gearset component of the fourth planetary gearset, and the third gearset component of the fifth planetary gearset;

a third selective coupler which, when engaged, fixedly couples the third gearset component of the first planetary gearset to the at least one stationary member, the third selective coupler being positioned in the first interior of the first housing;

a fourth selective coupler which, when engaged, fixedly couples the second gearset component of the first planetary gearset and the third gearset component of the second planetary gearset to the at least one stationary member, the fourth selective coupler being positioned in the first interior of the first housing;

a fifth selective coupler which, when engaged, fixedly couples the second gearset component of the second planetary gearset, the third gearset component of the third planetary gearset, the second gearset component of the fourth planetary gearset, and the third gearset component of the fifth planetary gearset to the at least one stationary member;

a sixth selective coupler which, when engaged, fixedly couples the third gearset component of the fourth planetary gearset to the at least one stationary member, the sixth selective coupler being positioned in the second interior of the second housing; and a seventh selective coupler which, when engaged, fixedly couples the second gearset component of the fifth planetary gearset to the at least one stationary member, the seventh selective coupler being positioned in the second interior of the second housing.

8. The transmission of claim 7, wherein the input member is accessible proximate a first end of the first housing opposite a second end of the first housing proximate a first end of the second housing;

the output member is accessible proximate a second end of the second housing opposite the first end of the second housing proximate the first housing;

the first planetary gearset is positioned between the first end of the first housing and the second planetary gearset;

the second planetary gearset is positioned between the first planetary gearset and the third planetary gearset;

the third planetary gearset is positioned between the second planetary gearset and the fourth planetary gearset;

the fourth planetary gearset is positioned between the third planetary gearset and the fifth planetary gearset; and the fifth planetary gearset is positioned between the fourth planetary gearset and the second end of the second housing.

9. The transmission of claim 7, wherein each of the first planetary gearset, the second planetary gearset, the third planetary gearset, the fourth planetary gearset, and the fifth planetary gearset is a simple planetary gearset.

10. The transmission of claim 9, wherein the first gearset component of the first planetary gearset is a first sun gear, the first gearset component of the second planetary gearset is a second sun gear, the first gearset component of the third planetary gearset is a third sun gear, the first gearset component of the fourth planetary gearset is a fourth sun gear, the first gearset component of the fifth planetary gearset is a fifth sun gear, the second gearset component of the first planetary gearset is a first planet carrier, the second gearset component of the second planetary gearset is a second planet carrier, the second gearset component of the third planetary gearset is a third planet carrier, the second gearset component of the fourth planetary gearset is a fourth planet carrier, the second gearset component of the fifth planetary gearset is a fifth planet carrier, the third gearset component of the first planetary gearset is a first ring gear, the third gearset component of the second planetary gearset is a second ring gear, the third gearset component of the third planetary gearset is a third ring gear, the third gearset component of the fourth planetary gearset is a fourth ring gear, and the third gearset component of the fifth planetary gearset is a fifth ring gear.

11. A transmission comprising:

at least one stationary member including a first housing having a first interior and second housing having a second interior, the second housing being removably coupled to the first housing;

an input member rotatable relative to the at least one stationary member;

a plurality of planetary gearsets operatively coupled to the input member, each of the plurality of planetary gearsets including a first gearset component, a second gearset component, and a third gearset component, the plurality of planetary gearsets including a first planetary gearset, a second planetary gearset, a third planetary gearset, a fourth planetary gearset, and a fifth planetary gearset, the input member is fixedly coupled to the first gearset component of the first planetary gearset, the first planetary gearset, the second planetary gearset, and the third planetary gearset being received in the first interior of the first housing and the fourth planetary gearset and the fifth planetary gearset being received in the second interior of the second housing;

an output member operatively coupled to the input member through the plurality of planetary gearsets and rotatable relative to the at least one stationary member, the output member is fixedly coupled to the second gearset component of the third planetary gearset, the first gearset component of the fourth planetary gearset, and the third gearset component of the fifth planetary gearset;

a first interconnector which fixedly couples the second gearset component of the second planetary gearset, the third gearset component of the third planetary gearset, and the second gearset component of the fourth planetary gearset together;

a second interconnector which fixedly couples the second gearset component of the first planetary gearset to the third gearset component of the second planetary gearset, the second interconnector being positioned in the first interior of the first housing;

a third interconnector which fixedly couples the first gearset component of the second planetary gearset to the first gearset component of the third planetary gearset, the third interconnector being positioned in the first interior of the first housing;

a fourth interconnector which fixedly couples the third gearset component of the fourth planetary gearset to the first gearset component of the fifth planetary gearset, the fourth interconnector being positioned in the second interior of the second housing; and a plurality of selective couplers, wherein the plurality of selective couplers include a first number of clutches and a second number of brakes, wherein the second number is more than twice the first number.

12. The transmission of claim 11, wherein the first number is two and the second number is five.

13. The transmission of claim 11, wherein the plurality of selective couplers includes:

a first selective coupler which, when engaged, fixedly couples the first gearset component of the first planetary gearset to the first gearset component of the second planetary gearset and the first gearset component of the third planetary gearset;

a second selective coupler which, when engaged, fixedly couples the first gearset component of the first planetary gearset to the second gearset component of the second planetary gearset, the third gearset component of the third planetary gearset and the second gearset component of the fourth planetary gearset;

a third selective coupler which, when engaged, fixedly couples the third gearset component of the first planetary gearset to the at least one stationary member;

a fourth selective coupler which, when engaged, fixedly couples the second gearset component of the first planetary gearset and the third gearset component of the second planetary gearset to the at least one stationary member;

a fifth selective coupler which, when engaged, fixedly couples the second gearset component of the second planetary gearset, the third gearset component of the third planetary gearset, and the second gearset component of the fourth planetary gearset to the at least one stationary member;

a sixth selective coupler which, when engaged, fixedly couples the third gearset component of the fourth planetary gearset and the first gearset component of the fifth planetary gearset to the at least one stationary member; and a seventh selective coupler which, when engaged, fixedly couples the second gearset component of the fifth planetary gearset to the at least one stationary member.

14. The transmission of claim 13, further comprising a retarder including a retarder housing, a rotor fixedly coupled to the second gearset component of the third planetary gearset, the first gearset component of the fourth planetary gearset, and the third gearset component of the fifth planetary gearset and positioned in the retarder housing, and a stator positioned in the retarder housing and fixedly coupled to the at least one stationary member.

15. The transmission of claim 14, further comprising a fluid control system in fluid communication with an interior of the retarder housing of the retarder to control an amount of fluid in the interior of the retarder housing.

16. The transmission of claim 15, wherein the fluid control system controls the amount of fluid in the interior of the retarder housing to a first amount in response to a first input from an accelerator input and to a second amount in response to a second input from a brake input, the second amount being more than the first amount.

17. The transmission of claim 11, wherein the second planetary gearset is positioned between the first planetary gearset and the third planetary gearset;

the third planetary gearset is positioned between the second planetary gearset and the fourth planetary gearset;

the fourth planetary gearset is positioned between the third planetary gearset and the fifth planetary gearset.

18. The transmission of claim 11, wherein each of the first planetary gearset, the second planetary gearset, the third planetary gearset, the fourth planetary gearset, and the fifth planetary gearset is a simple planetary gearset.

19. The transmission of claim 18, wherein the first gearset component of the first planetary gearset is a first sun gear, the first gearset component of the second planetary gearset is a second sun gear, the first gearset component of the third planetary gearset is a third sun gear, the first gearset component of the fourth planetary gearset is a fourth sun gear, the first gearset component of the fifth planetary gearset is a fifth sun gear, the second gearset component of the first planetary gearset is a first planet carrier, the second gearset component of the second planetary gearset is a second planet carrier, the second gearset component of the third planetary gearset is a third planet carrier, the second gearset component of the fourth planetary gearset is a fourth planet carrier, the second gearset component of the fifth planetary gearset is a fifth planet carrier, the third gearset component of the first planetary gearset is a first ring gear, the third gearset component of the second planetary gearset is a second ring gear, the third gearset component of the third planetary gearset is a third ring gear, the third gearset component of the fourth planetary gearset is a fourth ring gear, and the third gearset component of the fifth planetary gearset is a fifth ring gear.

* * * * *